United States Patent
Seki et al.

(10) Patent No.: US 11,320,051 B2
(45) Date of Patent: May 3, 2022

(54) SEAL RING

(71) Applicant: NOK CORPORATION, Tokyo (JP)

(72) Inventors: Masatoshi Seki, Ibaraki (JP); Hideya Watanabe, Ibaraki (JP)

(73) Assignee: NOK CORPORATION, Tokyo (JP)

( * ) Notice: Subject to any disclaimer, the term of this patent is extended or adjusted under 35 U.S.C. 154(b) by 134 days.

(21) Appl. No.: 16/825,152

(22) Filed: Mar. 20, 2020

(65) Prior Publication Data

US 2020/0217419 A1     Jul. 9, 2020

Related U.S. Application Data

(63) Continuation of application No. PCT/JP2018/035013, filed on Sep. 21, 2018.

(30) Foreign Application Priority Data

Sep. 21, 2017 (JP) .............................. JP2017-181572
Sep. 21, 2017 (JP) .............................. JP2017-181573

(Continued)

(51) Int. Cl.
*F16J 15/48*     (2006.01)
*F16J 15/3284*     (2016.01)

(52) U.S. Cl.
CPC ................................. *F16J 15/3284* (2013.01)

(58) Field of Classification Search
CPC .......... F16J 15/16; F16J 15/162; F16J 15/164; F16J 15/3284; F16J 15/441
See application file for complete search history.

(56) References Cited

U.S. PATENT DOCUMENTS 7,523,944 B2 * 4/2009 Hatori .................... F16J 15/441
                                                                   277/460
2008/0303218 A1    12/2008 Van Schoor et al.
(Continued)

FOREIGN PATENT DOCUMENTS

CN           103415730           11/2013
CN           104048062            9/2014
(Continued)

OTHER PUBLICATIONS

Foreign Office Action issued in DE Application No. DE11 2018 004 245.6, dated Jul. 29, 2021 and English language translation thereof.
(Continued)

*Primary Examiner* — Gilbert Y Lee
(74) *Attorney, Agent, or Firm* — Greenblum & Bernstein, P.L.C.

(57) ABSTRACT

A recessed part formed on a side surface includes a dynamic pressure part extending in the circumferential direction to converge on the side surface, and an introduction part extending from the dynamic pressure to open the dynamic pressure part toward the inner periphery side. One or two inner peripheral wall parts are provided for each of the recessed parts. The inner peripheral wall part is a portion defined on the inner periphery side of the corresponding recessed part by the dynamic pressure part and the introduction part. The inner peripheral wall part includes an inner peripheral wall surface. The inner peripheral wall surface extends toward the introduction part in the circumferential direction with inclining with respect to the side surface such that the inner peripheral wall surface is depressed from the side surface.

15 Claims, 64 Drawing Sheets

(30) Foreign Application Priority Data

| | | |
|---|---|---|
| Sep. 21, 2017 | (JP) | JP2017-181574 |
| Sep. 21, 2017 | (JP) | JP2017-181575 |
| Sep. 21, 2017 | (JP) | JP2017-181576 |
| Sep. 21, 2017 | (JP) | JP2017-181577 |

(56) References Cited

U.S. PATENT DOCUMENTS

| | | |
|---|---|---|
| 2012/0018957 A1 | 1/2012 | Watanabe |
| 2013/0127120 A1 | 5/2013 | Nagai et al. |
| 2014/0008876 A1 | 1/2014 | Nagai et al. |
| 2014/0264137 A1 | 9/2014 | Linser |
| 2016/0238134 A1 | 8/2016 | Ohya et al. |
| 2017/0009889 A1 | 1/2017 | Seki et al. |
| 2018/0051809 A1 | 2/2018 | Yoshida et al. |
| 2018/0058584 A1 | 3/2018 | Miyazaki et al. |

FOREIGN PATENT DOCUMENTS

| | | |
|---|---|---|
| CN | 104358878 | 2/2015 |
| EP | 2 765 339 | 8/2014 |
| JP | 2015-175474 A | 10/2015 |
| WO | 2011/105513 A | 9/2011 |
| WO | 2013/094657 A | 6/2013 |
| WO | 2015/111707 A | 7/2015 |
| WO | 2016/148006 A | 9/2016 |
| WO | 2016/148048 A | 9/2016 |

OTHER PUBLICATIONS

China Official Action received in CN application No. 201880061814.2, dated May 21, 2021, and English language translation thereof.
International Search Report and Written Opinion issued in International Patent Application No. PCT/JP2018/035013, dated Dec. 25, 2018, English translation of International Search Report.
International Preliminary Report on Patentability issued in International Patent Application No. PCT/JP2018/035013, dated Mar. 24, 2020, English translation.
Korean Office Action issued in corresponding KR application No. 10-2020-7009358, dated Jul. 26, 2021 and English language translation thereof.
China Official Action received in CN Application No. 201880061814.2, dated Oct. 21, 2021.
Korean Notice of Final Rejection received in KR application No. 10-2020-7009358, dated Jan. 21, 2022.

* cited by examiner

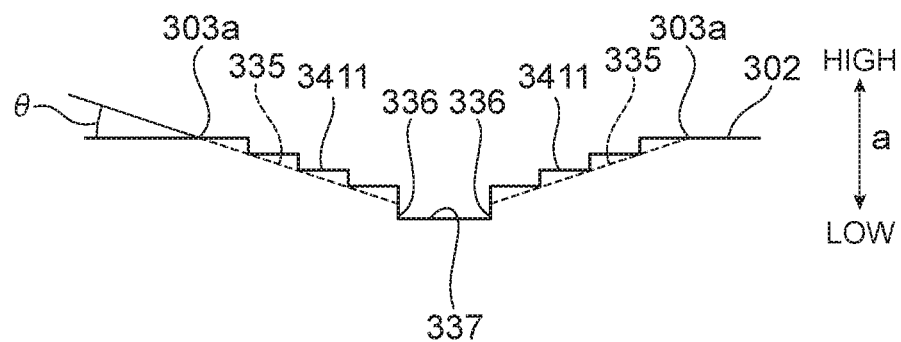
FIG.29
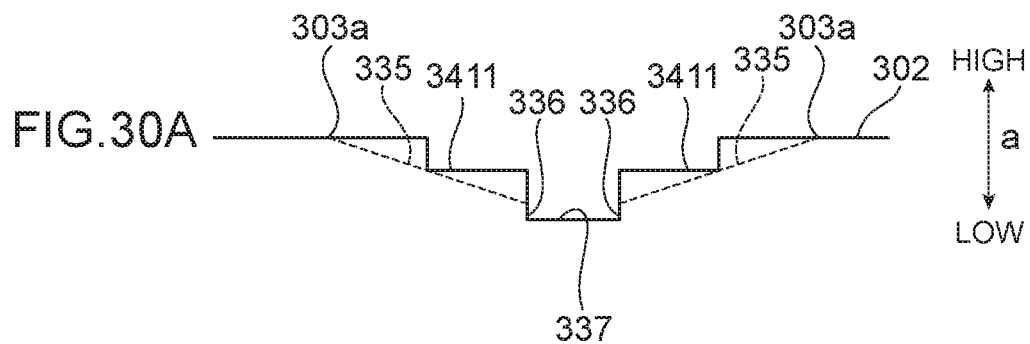
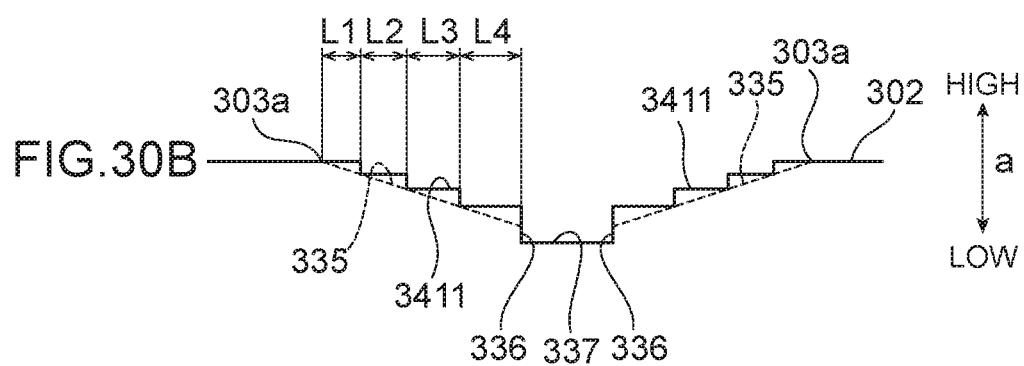

SEAL RING

CROSS REFERENCE TO RELATED APPLICATIONS

The present application is a continuation application of International Patent Application No. PCT/JP2018/035013 filed on Sep. 21, 2018, which claims the benefit of Japanese Patent Application No. 2017-181572, filed on Sep. 21, 2017, Japanese Patent Application No. 2017-181573, filed on Sep. 21, 2017, Japanese Patent Application No. 2017-181574, filed on Sep. 21, 2017, Japanese Patent Application No. 2017-181575, filed on Sep. 21, 2017, Japanese Patent Application No. 2017-181576, filed on Sep. 21, 2017 and Japanese Patent Application No. 2017-181577, filed on Sep. 21, 2017. The contents of these applications are incorporated herein by reference in their entirety.

BACKGROUND

Technical Field

The present disclosure relates to a seal ring for sealing between a shaft and a shaft hole into which the shaft is inserted.

Background

A sealing apparatus has been conventionally used in an automatic transmission (AT), a continuously variable transmission (CVT), or the like for an automobile to prevent leakage of operation oil used for hydraulic control. Such a sealing apparatus includes a seal ring therein, and the seal ring is used to seal between a shaft and a shaft hole into which the shaft is inserted. Specifically, the seal ring is attached to a groove formed in an outer peripheral surface of the shaft, and contacts a side surface of the groove and an inner peripheral surface of the shaft hole to thereby seal a space between the shaft and the shaft hole, such that the hydraulic pressure of the operation oil between the shaft and the shaft hole can be maintained.

When the shaft is rotatably driven, the side surface of the groove slides with respect to a side surface of the seal ring, whereby a sliding resistance is generated between the side surface of the seal ring and the side surface of the groove. This sliding resistance of the seal ring causes reduction in an output torque of the shaft. Then, a seal ring is provided in which to suppress the reduction in the output torque, a recessed part is provided in the side surface of the seal ring, and a very small amount of operation oil is supplied from the recessed part to between the sliding surfaces to utilize a dynamic pressure effect from the operation oil (for example, see International Publication No. WO 2011/105513 and International Publication No. WO 2015/111707).

SUMMARY

In such a conventional seal ring, the sliding resistance of the seal ring can be reduced by the dynamic pressure effect as described above. However, in recent years, in response to an increasing request for fuel efficiency of a vehicle or the like, it has been required to further reduce the sliding resistance of the seal ring. In this way, in the conventional seal ring, a structure which can further reduce the sliding resistance has been desired.

The present disclosure is related to provide a seal ring capable of further reducing a sliding resistance or a seal ring capable of further reducing a sliding resistance and improving durability.

In accordance with one aspect of the present disclosure, there is provided a seal ring for sealing an annular gap between a shaft and a shaft hole into which the shaft is inserted, the seal ring having an annular shape around an axis and the seal ring comprises at least one side surface that is a surface facing in a direction of the axis, a plurality of recessed parts that are formed on the side surface such that the plurality of recessed parts are separated from one another in a circumferential direction, and a plurality of inner peripheral wall parts that are formed corresponding to the plurality of recessed parts, respectively. The recessed part includes a dynamic pressure part that extends in the circumferential direction to converge on the side surface, and an introduction part that extends from the dynamic pressure part toward an inner periphery side to open the dynamic pressure part toward the inner periphery side. The number of the inner peripheral wall parts provided for each of the recessed parts is one or two, each of the inner peripheral wall parts is a portion defined on the inner periphery side of a corresponding one of the recessed parts by the dynamic pressure part and the introduction part of the corresponding recessed part, and includes an inner peripheral wall surface which is a surface continuing from the side surface. The inner peripheral wall surface extends toward the introduction part in the circumferential direction with inclining with respect to the side surface such that the inner peripheral wall surface is depressed from the side surface.

In the seal ring according to one aspect of the present disclosure, the inner peripheral wall surface is formed of at least one plane.

In the seal ring according to one aspect of the present disclosure, the inner peripheral wall surface is a curved surface.

In the seal ring according to one aspect of the present disclosure, the dynamic pressure part includes a bottom surface that is a surface facing toward a side toward which the side surface faces, the bottom surface includes an introduction surface connecting to the introduction part, and one or two dynamic pressure surfaces each extending between the introduction surface and the side surface, and the dynamic pressure surface extends toward the side surface in the circumferential direction with inclining with respect to the side surface such that the dynamic pressure surface rises from the introduction surface.

In the seal ring according to one aspect of the present disclosure, the dynamic pressure surface is inclined with respect to the side surface more largely than the inner peripheral wall surface.

In accordance with one aspect of the present disclosure, there is provided a seal ring for sealing an annular gap between a shaft and a shaft hole into which the shaft is inserted, the seal ring comprises at least one side surface that is a surface formed in an annular shape around an axis and facing in a direction of the axis, a plurality of recessed parts that are formed on the side surface such that the plurality of recessed parts are separated from one another in a circumferential direction, and a plurality of inner peripheral wall parts that are formed corresponding to the plurality of recessed parts, respectively. The recessed part includes a dynamic pressure part that extends in the circumferential direction to converge on the side surface, and an introduction part that extends from the dynamic pressure part toward an inner periphery side to open the dynamic pressure part toward the inner periphery side. The number of the inner peripheral wall parts provided for each of the recessed parts is one or two, each of the inner peripheral wall parts is a portion defined on the inner periphery side of a corresponding one of the recessed parts by the dynamic pressure part and the introduction part of the corresponding recessed part, and includes an inner peripheral wall surface which is a surface continuing from the side surface. The inner peripheral wall surface is depressed by a predetermined depth from the side surface, and extends toward the introduction part in the circumferential direction in a state parallel to the side surface.

In the seal ring according to one aspect of the present disclosure, the inner peripheral wall surface is a flat surface that is depressed by a predetermined depth from the side surface through a vertical surface.

In the seal ring according to one aspect of the present disclosure, the inner peripheral wall surface is a curved surface.

In the seal ring according to one aspect of the present disclosure, the dynamic pressure part includes a bottom surface that is a surface facing toward a side toward which the side surface faces, the bottom surface includes an introduction surface connecting to the introduction part, and one or two dynamic pressure surfaces each extending between the introduction surface and the side surface, and the dynamic pressure surface extends toward the side surface in the circumferential direction with inclining with respect to the side surface such that the dynamic pressure surface rises from the introduction surface.

In accordance with one aspect of the present disclosure, there is provided a seal ring for sealing an annular gap between a shaft and a shaft hole into which the shaft is inserted, the seal ring comprises at least one side surface that is a surface formed in an annular shape around an axis and facing in a direction of the axis, a plurality of recessed parts that are formed on the side surface such that the plurality of recessed parts are separated from one another in a circumferential direction, and a plurality of inner peripheral wall parts that are formed corresponding to the plurality of recessed parts, respectively. The recessed part includes a dynamic pressure part that extends in the circumferential direction to converge on the side surface, and an introduction part that extends from the dynamic pressure part toward an inner periphery side to open the dynamic pressure part toward the inner periphery side. The number of the inner peripheral wall parts provided for each of the recessed parts is one or two, each of the inner peripheral wall parts is a portion defined on the inner periphery side of a corresponding one of the recessed parts by the dynamic pressure part and the introduction part of the corresponding recessed part, and includes an inner peripheral wall surface which is a surface continuing from the side surface. The inner peripheral wall surface extends from the side surface toward the introduction part in the circumferential direction in a stepwise manner to be gradually depressed by a predetermined depth.

In the seal ring according to one aspect of the present disclosure, a lowest portion of the inner peripheral wall surface formed in the stepwise manner is higher than a dynamic pressure surface of the dynamic pressure part.

In the seal ring according to one aspect of the present disclosure, the dynamic pressure part includes a bottom surface that is a surface facing toward a side toward which the side surface faces, the bottom surface includes an introduction surface connecting to the introduction part, and one or two dynamic pressure surfaces each extending between the introduction surface and the side surface, and the dynamic pressure surface extends toward the side surface in the circumferential direction with inclining with respect to the side surface such that the dynamic pressure surface rises from the introduction surface.

In accordance with one aspect of the present disclosure, there is provided a seal ring for sealing an annular gap between a shaft and a shaft hole into which the shaft is inserted, the seal ring having an annular shape around an axis and the seal ring comprises a side surface that is a surface facing in a direction of the axis, a plurality of dynamic pressure parts that are formed on the side surface such that the plurality of dynamic pressure parts are separated from one another in a circumferential direction, an inner peripheral wall part that is an annular portion formed on an inner periphery side of the side surface and protruding beyond the side surface to a side toward which the side surface faces, and an outer peripheral wall part that is an annular portion formed on an outer periphery side of the side surface and protruding beyond the side surface to a side toward which the side surface faces. The dynamic pressure part is a recessed part that extends in the circumferential direction to converge on the side surface. The inner peripheral wall part includes an inner peripheral wall surface that is a surface facing in the direction of the axis, and an introduction part that is a recessed part formed in the inner peripheral wall surface and extending between the outer periphery side and the inner periphery side to open the dynamic pressure part toward the inner periphery side. The outer peripheral wall part includes an outer peripheral wall surface that is a surface facing in the direction of the axis.

In the seal ring according to one aspect of the present disclosure, the outer peripheral wall surface extends along a plane perpendicular to the axis.

In the seal ring according to one aspect of the present disclosure, the inner peripheral wall surface extends along a plane perpendicular to the axis.

In the seal ring according to one aspect of the present disclosure, the inner peripheral wall surface and the outer peripheral wall surface are positioned at a same position in the direction of the axis x.

In the seal ring according to one aspect of the present disclosure, the outer peripheral wall surface protrudes beyond the inner peripheral wall surface to a side which the side surface faces.

In the seal ring according to one aspect of the present disclosure, the dynamic pressure part includes a bottom surface that is a surface facing toward a side toward which the side surface faces, the bottom surface includes an introduction surface connecting to the introduction part, and one or two dynamic pressure surfaces each extending between the introduction surface and the side surface, and the dynamic pressure surface extends toward the side surface in the circumferential direction with inclining with respect to the side surface such that the dynamic pressure surface rises from the introduction surface.

In accordance with one aspect of the present disclosure, there is provided a seal ring for sealing an annular gap between a shaft and a shaft hole into which the shaft is inserted, the seal ring comprises at least one side surface that is a surface formed in an annular shape around an axis and facing in a direction of the axis, and a plurality of recessed parts that are formed on the side surface such that the plurality of recessed parts are separated from one another in a circumferential direction. The recessed part includes a dynamic pressure part that extends in the circumferential direction to converge on the side surface, and an introduction part that extends from the dynamic pressure part toward an inner periphery side to open the dynamic pressure part toward the inner periphery side. The plurality of recessed parts has a communicating groove that connects the recessed part and the recessed part being adjacent to each other.

In the seal ring according to one aspect of the present disclosure, the communicating groove connects the dynamic pressure part of the recessed part and the dynamic pressure part of the recessed part being adjacent to each other.

In the seal ring according to one aspect of the present disclosure, the communicating groove connects the dynamic pressure part of the recessed part and the introduction part of the recessed part being adjacent to each other.

In the seal ring according to one aspect of the present disclosure, the communicating groove is a slit recessed from the side surface toward an inner side with a predetermined depth.

In the seal ring according to one aspect of the present disclosure, the dynamic pressure part includes a bottom surface that is a surface facing toward a side toward which the side surface faces, the bottom surface includes an introduction surface connecting to the introduction part, and one or two dynamic pressure surfaces each extending between the introduction surface and the side surface, and the dynamic pressure surface extends toward the side surface in the circumferential direction with inclining with respect to the side surface such that the dynamic pressure surface rises from the introduction surface.

In accordance with one aspect of the present disclosure, there is provided a seal ring for sealing an annular gap between a shaft and a shaft hole into which the shaft is inserted, the seal ring having an annular shape around an axis and the seal ring comprises at least one side surface that is a surface facing in a direction of the axis, a plurality of recessed parts that are formed on the side surface such that the plurality of recessed parts are separated from one another in a circumferential direction, and a plurality of inner peripheral wall parts that are formed corresponding to the plurality of recessed parts, respectively. The recessed part includes a dynamic pressure part that extends in the circumferential direction to converge on the side surface, and an introduction part that extends from the dynamic pressure part toward an inner periphery side to open the dynamic pressure part toward the inner periphery side. The number of the inner peripheral wall parts provided for each of the recessed parts is one or two, each of the inner peripheral wall parts is a portion defined on the inner periphery side of a corresponding one of the recessed parts by the dynamic pressure part and the introduction part of the corresponding recessed part, and includes an inner peripheral wall surface which is a surface continuing from the side surface. One or more dent parts are formed in the inner peripheral wall surface such that the dent parts are separated from one another in the circumferential direction.

In the seal ring according to one aspect of the present disclosure, between an outer periphery side and the inner periphery side of the inner peripheral wall surface, the dent parts extend from the outer periphery side to a position located between the outer periphery side and the inner periphery side.

In the seal ring according to one aspect of the present disclosure, the dent part extends over an entire width between an outer periphery side and the inner periphery side of the inner peripheral wall surface.

In the seal ring according to one aspect of the present disclosure, the dent part is formed at a position located between an outer periphery side and the inner periphery side of the inner peripheral wall surface.

In the seal ring according to one aspect of the present disclosure, the inner peripheral wall surface is flush with the side surface.

In the seal ring according to one aspect of the present disclosure, the dynamic pressure part includes a bottom surface that is a surface facing toward a side toward which the side surface faces, the bottom surface includes an introduction surface connecting to the introduction part, and one or two dynamic pressure surfaces each extending between the introduction surface and the side surface, and the dynamic pressure surface extends toward the side surface in the circumferential direction with inclining with respect to the side surface such that the dynamic pressure surface rises from the introduction surface.

In the seal ring according to one aspect of the present disclosure, the introduction part is connected to the dynamic pressure parts between end portions in the circumferential direction of the dynamic pressure parts.

In the seal ring according to one aspect of the present disclosure, the introduction part is connected to the dynamic pressure part at one end portion in the circumferential direction of the dynamic pressure part.

According to a seal ring of the present disclosure, a sliding resistance can be further reduced, or a sliding resistance can be further reduced and a durability can be improved.

BRIEF DESCRIPTION OF DRAWINGS

FIG. 29 is a partially enlarged cross-sectional view of a cross-section taken along line B-B in FIG. 27.

FIGS. 30A and 30B are partially enlarged cross-sectional views of a cross-section taken along line B-B in FIG. 27 for illustrating a variant of an inner peripheral wall surface.

DESCRIPTION OF EMBODIMENTS

Hereinafter, embodiments of the present disclosure will be described with reference to the drawings.

Figure 1:
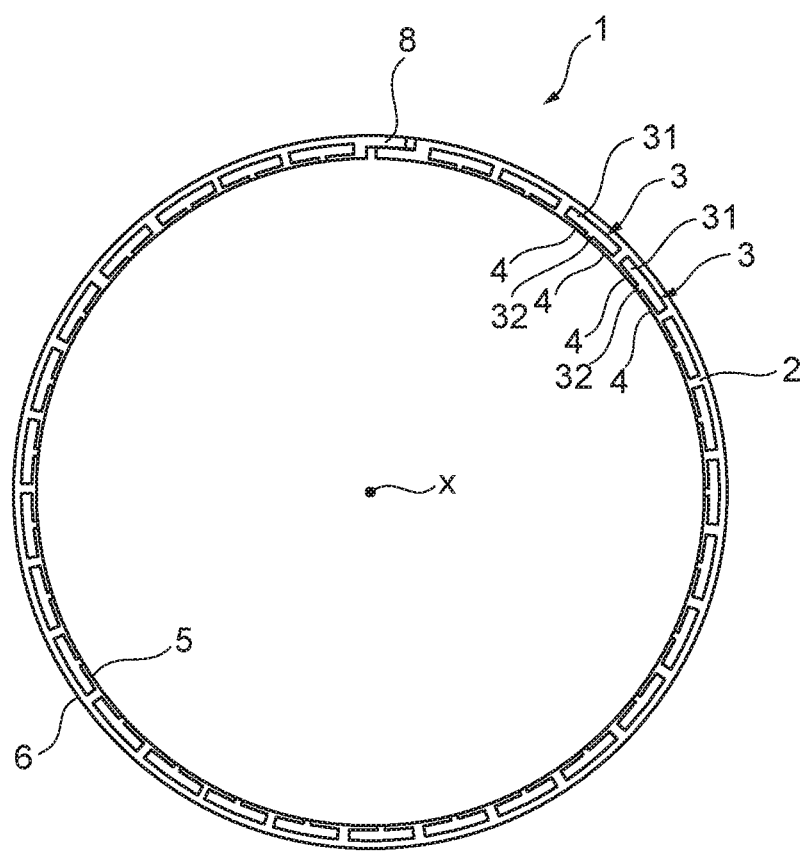
FIG. 1 is a side view on one side illustrating a schematic configuration of a seal ring according to a first embodiment of the present disclosure.
Figure 2:
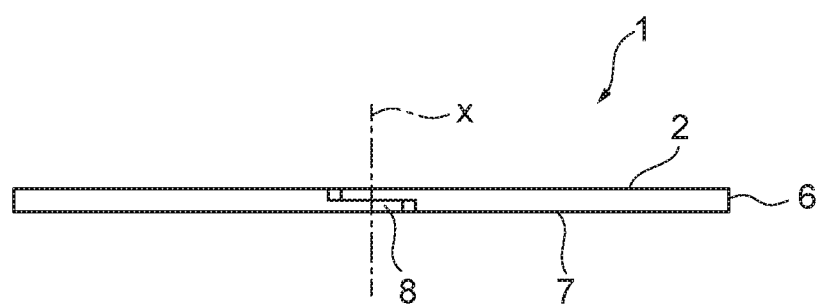
FIG. 2 is a front view illustrating a schematic configuration of the seal ring according to the first embodiment of the present disclosure.
Figure 3:
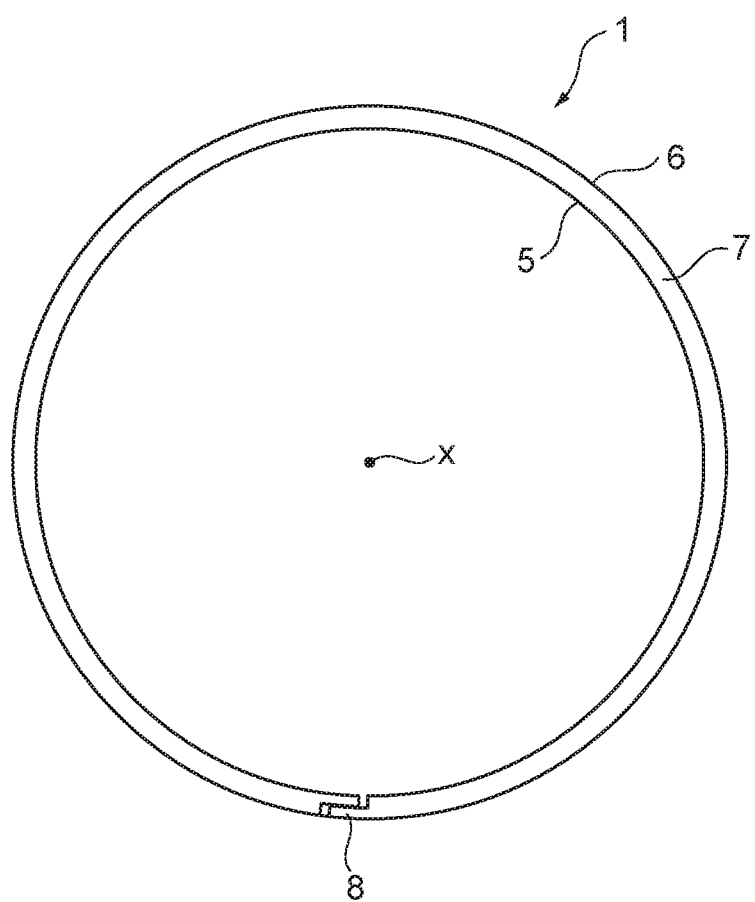
FIG. 3 is a side view on another side illustrating a schematic configuration of the seal ring according to the first embodiment of the present disclosure.
Figure 4:
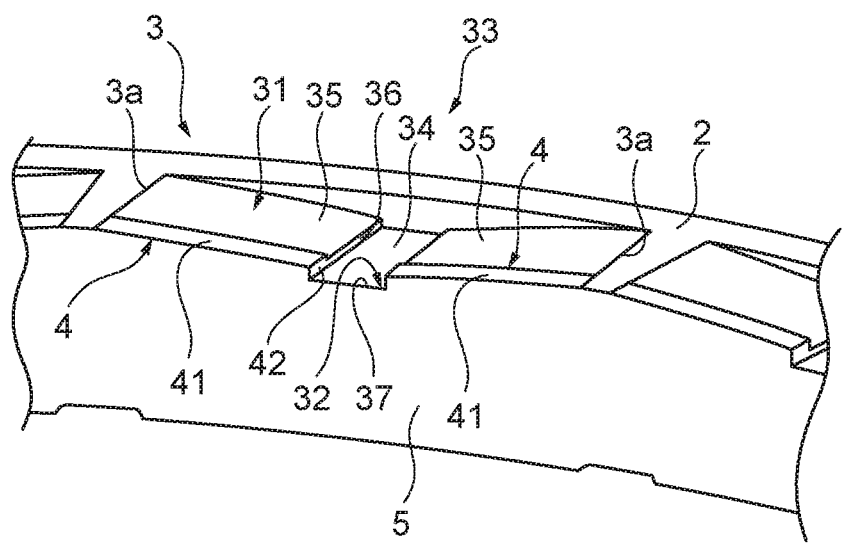
FIG. 4 is a partially enlarged perspective view illustrating a schematic configuration of the seal ring according to the first embodiment of the present disclosure.

FIG. 1 is a side view on one side illustrating a schematic configuration of a seal ring 1 according to a first embodiment of the present disclosure, FIG. 2 is a front view illustrating a schematic configuration of the seal ring 1, and FIG. 3 is a side view on another side illustrating a schematic configuration of the seal ring 1. In addition, FIG. 4 is a partially enlarged perspective view illustrating a schematic configuration of the seal ring 1.

The seal ring 1 according to the present embodiment is a sealing apparatus for sealing an annular gap between a shaft and a shaft hole into which the shaft is inserted, and in a vehicle or a general-purpose machine, the seal ring 1 is used for sealing between a shaft and a shaft hole into which the shaft is inserted, the shaft hole being formed in a housing or the like, the shaft and the housing or the like rotating relatively to each other. The seal ring 1 that is attached to a groove formed in an outer peripheral surface of a shaft to maintain a hydraulic pressure of an operation oil is used in, for example, an automatic transmission or a continuously variable transmission. Note that targets to which the seal ring 1 according to the embodiment of the present disclosure is applied are not limited to the above.

As illustrated in FIG. 1, the seal ring 1 has an annular shape around an axis x and includes at least one side surface 2 facing in a direction of the axis x, a plurality of recessed parts 3 that are formed on the side surface 2 such that the plurality of recessed parts 3 are separated from one another in a circumferential direction, and a plurality of inner peripheral wall parts 4 that are formed corresponding to the plurality of recessed parts 3, respectively. The recessed part 3 includes a dynamic pressure part 31 that extends in the circumferential direction to converge on the side surface 2, and an introduction part 32 that extends from the dynamic pressure part 31 toward an inner periphery side to open the dynamic pressure part 31 toward the inner periphery side. The number of inner peripheral wall parts 4 provided for each of the recessed parts 3 is one or two. Each of the inner peripheral wall parts 4 is a portion defined on the inner periphery side of the corresponding recessed part 3 by the dynamic pressure part 31 and the introduction part 32 of the corresponding recessed part 3, and includes an inner peripheral wall surface 41 which is a surface continuing from the side surface 2. The inner peripheral wall surface 41 extends toward the introduction part 32 in the circumferential direction with inclining with respect to the side surface 2 such that the inner peripheral wall surface 41 is depressed from the side surface 2.

Specifically, the side surface 2 is a side surface formed as a sliding surface that is pressed against a groove side surface of a groove formed in a shaft in a usage state described later. The seal ring 1 according to the present embodiment includes only one side surface 2 serving as the sliding surface, as illustrated in FIGS. 1 and 3. The seal ring 1 may include two side surfaces 2 serving as the sliding surfaces, that is, may also include the side surface 2 serving as the sliding surface on another side surface of the seal ring 1. In this case, the attachment direction of the seal ring 1 to the groove formed in the shaft is removed, and therefore the seal ring 1 can be easily attached.

As illustrated in FIGS. 1 to 3, in the seal ring 1, a cross-sectional shape in a surface along the axis x is a rectangular shape or a substantially rectangular shape. The seal ring 1 includes an inner peripheral surface 5 that is a surface facing toward the inner periphery side, an outer peripheral surface 6 facing toward the outer periphery side, a side surface 2, and a side surface 7 that is another side surface. The inner peripheral surface 5 is, for example, a cylindrical surface or a substantially cylindrical surface centered or substantially centered about the axis x. The outer peripheral surface 6 is a surface facing away from the inner peripheral surface 5, and is, for example, a cylindrical surface or a substantially cylindrical surface centered or substantially centered about the axis x. The side surface 2 is an annular surface along a plane or a substantial plane perpendicular or substantially perpendicular to the axis x, and expands between the inner peripheral surface 5 and the outer peripheral surface 6. The side surface 7 is a surface facing away from the side surface 2, is an annular surface along a plane or a substantial plane perpendicular or substantially perpendicular to the axis x, and expands between the inner peripheral surface 5 and the outer peripheral surface 6.

Figure 5:
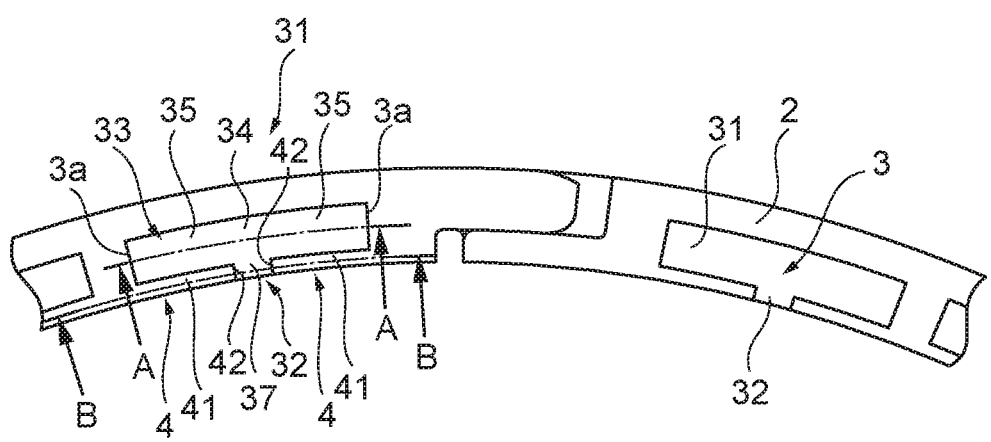
FIG. 5 is a partially enlarged view of the seal ring illustrated in FIG. 1.

As described above, the plurality of recessed parts 3 are formed on the side surface 2 serving as the sliding surface. The recessed parts 3 are formed at equal angular intervals or substantially equal angular intervals around the axis x. As illustrated in FIGS. 4 and 5, the recessed part 3 is a recessed part recessed from the side surface 2 toward the side surface 7 side, and is formed in a substantially T shape as viewed in the direction of the axis x. The recessed part 3 is provided on the inner peripheral surface 5 side in the side surface 2 such that the recessed part 3 does not appear on the outer periphery side from the side surface of the groove in the shaft in the usage state.

Specifically, as illustrated in FIGS. 4 and 5, the dynamic pressure part 31 of the recessed part 3 is separated in the radial direction from the outer peripheral surface 6 and the inner peripheral surface 5, and extends in the circumferential direction to have an arc shape or a substantially arc shape centered or substantially centered about the axis x. The dynamic pressure part 31 is provided on the inner peripheral surface 5 side in the radial direction. Specifically, the dynamic pressure part 31 includes a bottom surface 33 that is a surface facing toward a side toward which the side surface 2 faces. The bottom surface 33 includes an introduction surface 34 connected to the introduction part 32, and one or two dynamic pressure surfaces 35 each extending between the introduction surface 34 and the side surface 2. In the seal ring 1 according to the present embodiment, the bottom surface 33 includes two dynamic pressure surfaces 35.

Figure 6:
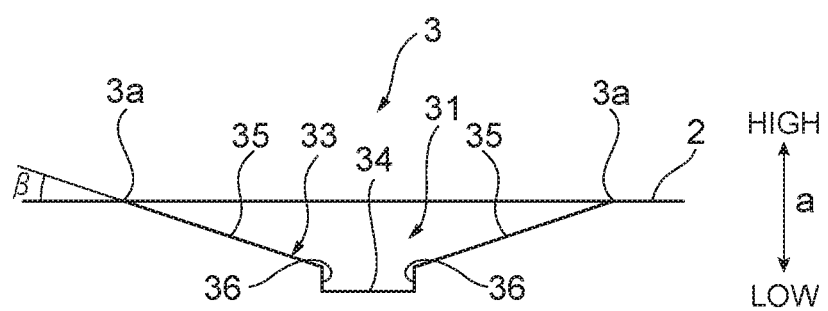
FIG. 6 is a partially enlarged cross-sectional view of a cross-section taken along line A-A in FIG. 5.

As illustrated in FIGS. 4 and 6, the introduction surface 34 is positioned on the lowest side in the dynamic pressure part 31, is formed in a plane or a substantial plane, and expands into a rectangular shape or a substantially rectangular shape. Note that in the recessed part 3, the direction of the axis x is also referred to as a height direction. In the height direction (a direction of an arrow a in FIGS. 6 and 7), an inner side of the seal ring 1 is assumed as a lower side, and the side surface 2 side is assumed as a higher side. The introduction surface 34 may be formed in a curved surface, and may not have to expand into the rectangular plane. In addition, the dynamic pressure surface 35 is inclined with respect to the side surface 2 upwardly from the introduction surface 34 and extends toward the side surface 2 in the circumferential direction. The dynamic pressure surface 35 is formed in a plane or a substantial plane and extends into a rectangular shape or a substantially rectangular shape. The dynamic pressure surface 35 extends between the introduction surface 34 and the side surface 2, and is smoothly connected to the side surface 2. The dynamic pressure surface 35 may be formed in a curved surface, and may not have to expand into the rectangular shape. For example, the dynamic pressure surface 35 may be formed in a trapezoidal shape widening or narrowing toward the side surface 2 side. In addition, the dynamic pressure surface 35 is connected to the introduction surface 34 through a stepped surface 36 forming a step depressed toward the side surface 7 side in the direction of the axis x. The recessed part 3 may not have to include the stepped surface 36 so that the dynamic pressure surface 35 is directly connected to the introduction surface 34.

As described above, the two dynamic pressure surfaces 35 are formed in the recessed part 3, and are formed to be symmetrical in the circumferential direction about the introduction surface 34 in the bottom surface 33. That is, one of the dynamic pressure surfaces 35 extends from one end in the circumferential direction of the introduction surface 34 to the side surface 2 in the one direction of the circumferential direction. Another dynamic pressure surface 35 extends from another end in the circumferential direction of the introduction surface 34 to the side surface 2 in the other direction of the circumferential direction. The dynamic pressure part 31 is formed to be positioned not to appear on the outer periphery side from the side surface, which the dynamic pressure part 31 contacts, of the groove in the shaft, in the usage state described later.

As illustrated in FIGS. 4 and 5, the introduction part 32 of the recessed part 3 forms a recess opening toward the side surface 2 side on the inner peripheral surface 5, and the introduction part 32 is connected to the dynamic pressure part 31 between end portions (end portions 3a) in the circumferential direction of the dynamic pressure part 31. Specifically, the introduction part 32 includes a bottom surface 37 that is connected to the introduction surface 34 and the stepped surfaces 36 of the dynamic pressure part 31, and is continued to the introduction surface 34. The bottom surface 37 is smoothly connected to the introduction surface 34 of the dynamic pressure part 31, and the bottom surface 37 is, for example, a surface that is positioned at the same height as the introduction surface 34. In the seal ring 1, a passage communicating from the inner peripheral surface 5 to the dynamic pressure part 31 is formed by the introduction part 32.

As described later, in the usage state in which the side surface 2 of the seal ring 1 contacts the side surface of the groove in the shaft, the recessed part 3 communicates with a space which the inner peripheral surface 5 contacts. More specifically, the dynamic pressure part 31 communicates, through the introduction part 32, with the space which the inner peripheral surface 5 contacts. In the usage state, the dynamic pressure part 31 forms a space extending in the circumferential direction between the dynamic pressure part 31 and the side surface of the groove in the shaft, and the dynamic pressure surface 35 forms a space in which a height (a width in the height direction) is gradually decreased from the introduction surface 34 side toward the side surface 2 side, the space extending in the circumferential direction between the dynamic pressure surface 35 and the side surface of the groove in the shaft.

As described above, the plurality of inner peripheral wall parts 4 are formed corresponding to the plurality of recessed parts 3, respectively. Specifically, as illustrated in FIGS. 4 and 5, the two inner peripheral wall parts 4 are formed with respect to each of the recessed parts 3. The inner peripheral wall part 4 is a portion defined by a portion in the circumferential direction in which one dynamic pressure surface 35 of the dynamic pressure part 31 extends, the introduction part 32, and the inner peripheral surface 5. The inner peripheral wall part 4 is adjacent to the dynamic pressure surface 35 of the dynamic pressure part 31 on the inner periphery side, and protrudes to a side higher than the dynamic pressure surface 35. The inner peripheral wall part 4 includes an inner peripheral wall surface 41, and an end surface 42 that is a surface formed by the introduction part 32 and extending along the axis x.

The inner peripheral wall surface 41 of the inner peripheral wall part 4 faces toward the side toward which the side surface 2 faces, and extends within the same range as or the substantially same range as the dynamic pressure surface 35 in the circumferential direction. Specifically, the inner peripheral wall surface 41 extends, in the circumferential direction, from the same position as the stepped surface 36 of the dynamic pressure part 31 up to the same position as the end portion 3a of the dynamic pressure part 31 or from the same position as the stepped surface 36 of the dynamic pressure part 31 up to the vicinity of the end portion 3a of the dynamic pressure part 31. That is, an end portion 41a, which is a portion to be connected to the side surface 2, of the inner peripheral wall surface 41 may be the same as the end portion 3a that is a portion where the dynamic pressure surface 35 contacts the side surface 2, or may be positioned in the vicinity of the end portion 3a, in the circumferential direction. In the seal ring 1 illustrated, the end portion 41a and the end portion 3a are formed at the same position in the circumferential direction. When the end portion 41a is positioned in the vicinity of the end portion 3a in the circumferential direction, it is preferable that in the circumferential direction, the end portion 41a of the inner peripheral wall surface 41 is positioned more on the introduction part 32 side (inner side) than the end portion 3a of the dynamic pressure surface 35.

Figure 7:
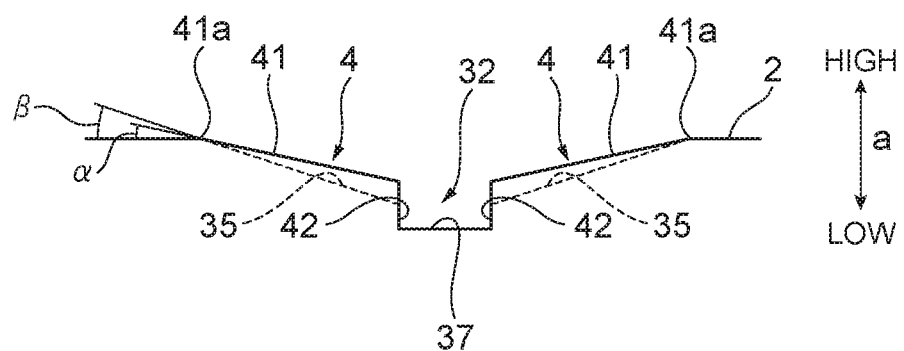
FIG. 7 is a partially enlarged cross-sectional view of a cross-section taken along line B-B in FIG. 5.
Figure 8:
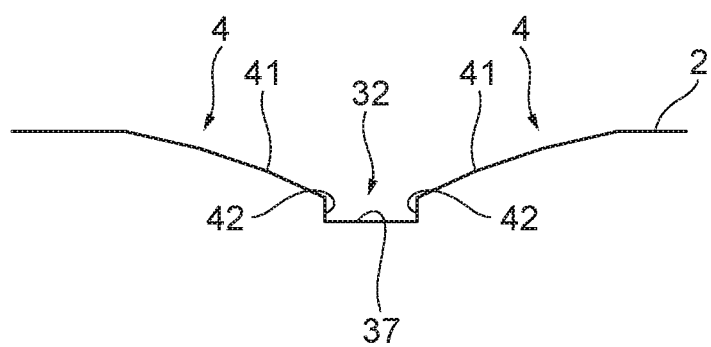
FIG. 8 is a partially enlarged cross-sectional view of a cross-section taken along line B-B in FIG. 5 for illustrating a variant of an inner peripheral wall surface.

As illustrated in FIGS. 4 and 7, the inner peripheral wall surface 41 is inclined with respect to the side surface 2 upwardly from a portion connected with the end surface 42 and extends toward the side surface 2 in the circumferential direction, and is smoothly connected to the side surface 2. The inner peripheral wall surface 41 is formed in a plane or a substantial plane and extends into a rectangular shape or a substantially rectangular shape. The inner peripheral wall surface 41 may be formed in a curved surface, and may not have to expand into the rectangular shape. For example, the inner peripheral wall surface 41 may be formed in a trapezoidal shape widening or narrowing toward the side surface 2 side. In addition, the inner peripheral wall surface 41 may be a surface formed by continuously connecting a plurality of planes or substantial planes, a plurality of curved surfaces or substantial planes, or a plurality of these combined surfaces. For example, as illustrated in FIG. 8, the inner peripheral wall surface 41 may be formed by connecting planes or substantial planes such that an inclination angle of the inner peripheral wall surface 41 with respect to the side surface 2 is gradually increased. The inclination angle α of the inner peripheral wall surface 41 with respect to the side surface 2 is smaller than an inclination angle β (see FIG. 6) of the dynamic pressure surface 35 with respect to the side surface 2 (see FIGS. 6 and 7).

As described above, the two inner peripheral wall parts 4 are formed to each of the recessed parts 3, and are formed to be symmetrical about the introduction part 32 in the circumferential direction. That is, one of the inner peripheral wall parts 4 extends from one end in the circumferential direction of the introduction part 32 to the side surface 2 in the one direction of the circumferential direction. Another inner peripheral wall part 4 extends from another end in the circumferential direction of the introduction part 32 to the side surface 2 in the other direction of the circumferential direction.

As described later, in the usage state in which the side surface 2 of the seal ring 1 contacts the side surface of the groove in the shaft, the inner peripheral wall surface 41 of the inner peripheral wall part 4 faces the side surface of the groove in the shaft. Since the inner peripheral wall surface 41 is inclined with respect to the side surface 2, the inner peripheral wall surface 41 does not contact the side surface of the groove, thereby forming a space between the inner peripheral wall surface 41 and the side surface of the groove. This space is formed in a wedge shape, and therefore the height of the space is gradually decreased from the end surface 42 side toward the end portion 41a side.

The seal ring 1 is formed of a resin material such as polyether ether ketone (PEEK), polyphenylene sulfide (PPS), and polytetrafluoroethylene (PTFE). A circumferential length of the outer peripheral surface 6 of the seal ring 1 is shorter than the circumferential length of the inner peripheral surface of the shaft hole into which the shaft is inserted, not to have an interference with respect to the shaft hole. Therefore, in a state in which the fluid pressure does not act on the seal ring 1 in the usage state, the outer peripheral surface 6 of the seal ring 1 is separated from the inner peripheral surface of the shaft hole.

The seal ring 1 is not endless, and as illustrated in FIGS. 1 to 3, the seal ring 1 includes an abutment joint 8 at one portion in the circumferential direction of the seal ring 1. The abutment joint 8 has a well-known structure capable of maintaining a stable sealing performance even when the circumferential length of the seal ring 1 varies due to thermal expansion or thermal contraction of the seal ring 1. Examples of the structure of the abutment joint 8 include a so-called special step cut structure in which the abutment joint 8 is cut off in a stepwise manner when seen from any of the side of the outer peripheral surface 6 and the sides of the both side surfaces 2 and 7, a straight cut structure, a bias cut structure, and a step cut structure. When a material (such as PTFE) having low elasticity is employed as the material of the seal ring 1, the seal ring 1 may be endless without having the abutment joint 8.

Next, action of the seal ring 1 having the above-described configuration will be described.

Figure 9:
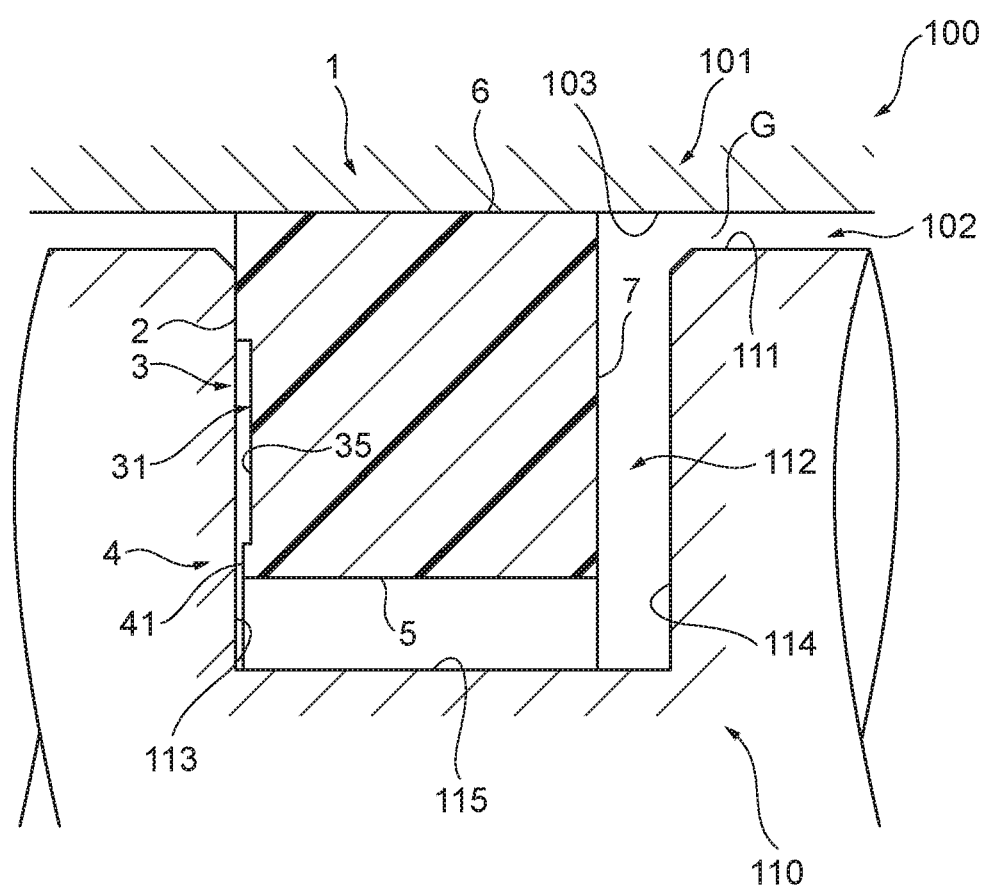
FIG. 9 is a partially enlarged cross-sectional view of the seal ring according to the first embodiment of the present disclosure in a usage state in which the seal ring is attached to a housing and a shaft inserted into a shaft hole that is a through-hole formed at the housing in a hydraulic apparatus as an attachment target.

FIG. 9 is a partially enlarged cross-sectional view of the seal ring 1 in a usage state in which the seal ring 1 is attached to a housing 101 and a shaft 110 inserted into a shaft hole 102 that is a through-hole formed at the housing 101 in a hydraulic apparatus 100 as an attachment target. The shaft 110 is relatively rotatable with respect to the housing 101, and an annular groove 112 recessed toward a center side is formed in an outer peripheral surface 111 of the shaft 110. The groove 112 has a cross section formed in a rectangular shape or a substantially rectangular shape, and is defined by side surfaces 113 and 114 having a planar shape and a bottom surface 115. In the hydraulic apparatus 100, an annular space is formed between an inner peripheral surface 103 of the shaft hole 102 and an outer peripheral surface 111 of the shaft 110, and a hydraulic channel in which operation oil (not illustrated) is to be filled is formed in the shaft 110 and the housing 101. The seal ring 1 is attached to the groove 112, and seals a gap G between the shaft 110 and the shaft hole 102 to prevent loss of hydraulic pressure of the operation oil in the hydraulic channel. In FIG. 9, a part of the groove 112 on the right side forms the hydraulic channel, and a side surface 113 on the left side of the groove 112 serves as a sliding side surface against which the seal ring 1 is pressed, whereby pressure on the right side of the groove 112 becomes high and pressure on the left side of the groove 112 becomes low. The seal ring 1 is attached to the groove 112 such that the side surface 2 faces the sliding side surface 113 of the groove 112.

When the operation oil is introduced into the hydraulic channel, the pressure in the hydraulic channel becomes high, whereby the outer peripheral surface 6 and the side surface 2 of the seal ring 1 are pressed against the inner peripheral surface 103 of the shaft hole 102 and the sliding side surface 113 of the groove 112, respectively. Thus, in the annular gap G, the hydraulic channel is sealed, to thereby maintain the hydraulic pressure. When the shaft 110 rotates, the shaft 110 rotates with respect to the seal ring 1, and the sliding side surface 113 of the groove 112 slides with respect to the side surface 2 of the seal ring 1. At this time, the operation oil intrudes into the recessed part 3 from the introduction part 32 of the seal ring 1, and is introduced to the dynamic pressure part 31, and the hydraulic pressure of the operation oil causes the operation oil to move to the end portion 3a in the circumferential direction along the dynamic pressure surface 35 in the dynamic pressure part 31. While the side surface 2 of the seal ring 1 contacts the sliding side surface 113 of the groove 112, the pressure on the end portion 3a side of the dynamic pressure part 31 is increased by this movement of the operation oil in the dynamic pressure part 31, and finally the pressure of the operation oil on the end portion 3a side is increased until the side surface 2 of the seal ring 1 is separated from the sliding side surface 113, resulting that the operation oil leaks out to the side surface 2 from the end portion 3a of the dynamic pressure part 31. This causes a thin lubricating film of the operation oil to be formed between the side surface 2 of the seal ring 1 and the sliding side surface 113 of the groove 112, thereby reducing a sliding resistance of the groove 112 with respect to the seal ring 1. Thus, in the usage state, the recessed part 3 uses the dynamic pressure effect to reduce the sliding resistance of the groove 112 with respect to the seal ring 1.

The inner peripheral wall surface 41 of the inner peripheral wall part 4 is inclined with respect to the side surface 2, and a space which has a wedge shape and becomes narrower in a moving direction of the operation oil in the dynamic pressure part 31 is formed between the inner peripheral wall surface 41 and the sliding side surface 113 of the groove 112. Therefore, the inner peripheral wall surface 41 can obtain the dynamic pressure effect by the operation oil similar to the above-described dynamic pressure effect of the recessed part 3, and the sliding resistance of the groove 112 with respect to the seal ring 1 can be also reduced by the inner peripheral wall surface 41. The inner peripheral wall surface 41 is inclined with respect to the side surface 2 whereby an abrasion amount of the inner peripheral wall surface 41 is small, therefore, a reduction in dynamic pressure effect can be suppressed.

A contact area of the seal ring 1 with respect to the sliding side surface 113 of the groove 112 can be reduced by the space formed between the inner peripheral wall surface 41 and the sliding side surface 113 of the groove 112, whereby the sliding resistance of the groove 112 with respect to the seal ring 1 can be also reduced.

The seal ring 1 can reduce the sliding resistance of the groove 112 to the seal ring 1 as described above. Therefore, heat generated in the sliding portion in use can be suppressed, and the seal ring 1 can be used under a higher PV condition. In addition, the seal ring 1 can be also used for the shaft 110 which is soft.

As described above, according to the seal ring 1 according to the first embodiment of the present disclosure, the sliding resistance can be further reduced.

Figure 10:
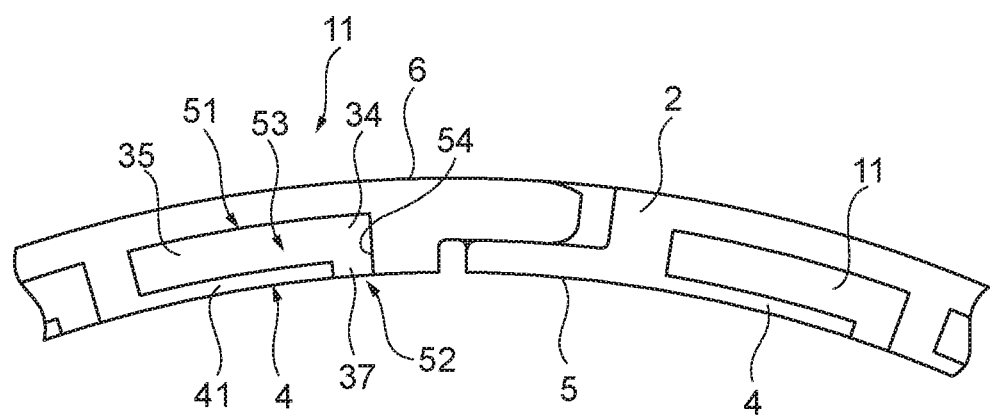
FIG. 10 is a partially enlarged side view enlargedly illustrating a portion of a side surface on one side of a seal ring according to a second embodiment of the present disclosure, the view illustrating a schematic configuration of the seal ring.
Figure 11:
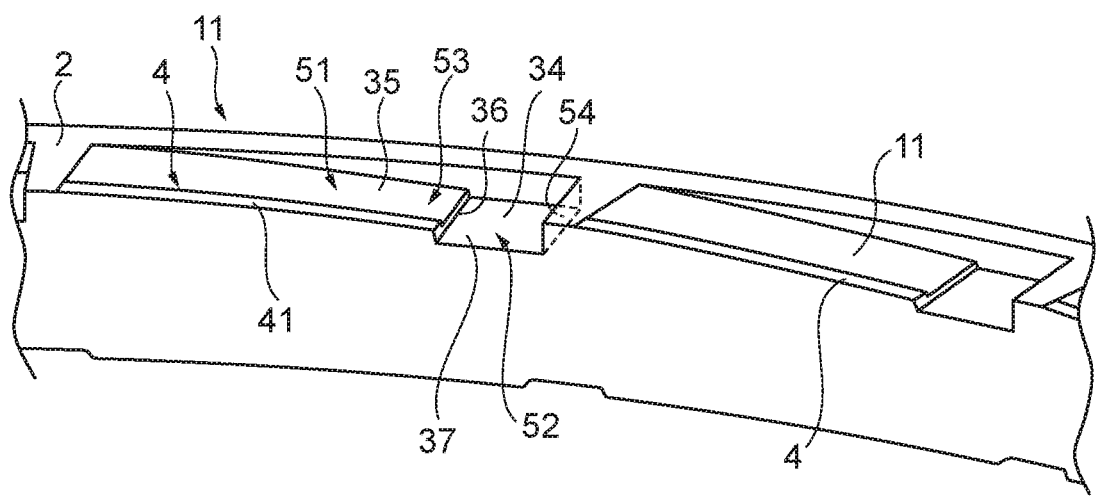
FIG. 11 is a partially enlarged perspective view illustrating a schematic configuration of the seal ring according to the second embodiment of the present disclosure.

Next, a seal ring 10 according to a second embodiment of the present disclosure will be described. FIG. 10 is a partially enlarged side view enlargedly illustrating a portion of a side surface on one side of the seal ring 10, the view illustrating a schematic configuration of the seal ring 10, and FIG. 11 is a partially enlarged perspective view illustrating a schematic configuration of the seal ring 10. The seal ring 10 according to the second embodiment of the present disclosure is different from the above-described seal ring 1 according to the first embodiment of the present disclosure in configurations of the recessed part and the inner peripheral wall part. Hereinafter, components of the seal ring 10 according to the second embodiment of the present disclosure that are the same as or have similar functions to those of the seal ring 1 according to the first embodiment of the present disclosure will be denoted by the same reference characters, the description thereof will be omitted, and different configurations will be described.

The seal ring 10 includes a recessed part 11 different from the recessed part 3 of the seal ring 1. As illustrated in FIGS. 10 and 11, the recessed part 11 includes a dynamic pressure part 51 and an introduction part 52, and the dynamic pressure part 51 includes only one dynamic pressure surface 35. Hereinafter, the description will be specifically made.

The dynamic pressure part 51 of the recessed part 11 is separated in the radial direction from the outer peripheral surface 6 and the inner peripheral surface 5, and extends in the circumferential direction to have an arc shape or a substantially arc shape centered or substantially centered about the axis x. The dynamic pressure part 51 is provided on the inner peripheral surface 5 side in the radial direction. Specifically, the dynamic pressure part 51 includes a bottom surface 53 that is a surface facing toward a side toward which the side surface 2 faces. The bottom surface 53 includes an introduction surface 34 connected to the introduction part 52, and one dynamic pressure surface 35 extending between the introduction surface 34 and the side surface 2. The dynamic pressure surface 35 is connected to the introduction surface 34 through a stepped surface 36. In addition, the dynamic pressure part 51 includes an end surface 54 that is a planar or a substantial planar surface extending along the axis x, on the opposite side of the dynamic pressure surface 35 in the circumferential direction with respect to the introduction surface 34. The end surface 54 extends up to the side surface 2 from an end portion on the opposite side in the circumferential direction of the end portion connected to the dynamic pressure surface 35 (the stepped surface 36) of the introduction surface 34. The dynamic pressure part 51 is formed to be positioned such that the dynamic pressure part 51 does not appear on the outer periphery side from the sliding side surface 113 of the groove 112 in the shaft 110 which the dynamic pressure part 51 contacts in the usage state.

As illustrated in FIGS. 10 and 11, the introduction part 52 of the recessed part 3 forms a recess opening toward the side surface 2 side on the inner peripheral surface 5, and the introduction part 52 is connected to the dynamic pressure part 51 at one end portion in the circumferential direction of the dynamic pressure part 51. Specifically, the introduction part 52 is connected to the introduction surface 34 of the dynamic pressure part 51, the stepped surface 36, and the end surface 54, and includes a bottom surface 37 continued to the introduction surface 34. In the seal ring 10, by the introduction part 52, a passage communicating from the inner peripheral surface 5 to the dynamic pressure part 51 is formed. Thus, the recessed part 11 of the seal ring 10 is formed in an L-shape.

The seal ring 10 includes only one inner peripheral wall part 4 for each of the recessed parts 11. As illustrated in FIGS. 10 and 11, the inner peripheral wall part 4 is not formed on the end surface 54 side in the circumferential direction with respect to the introduction part 52, and the inner peripheral wall part 4 is formed only on the dynamic pressure surface 35 side in the circumferential direction with respect to the introduction part 52.

Similar to the above-described seal ring 1, in the seal ring 10 according to the second embodiment of the present disclosure, a space having a wedge shape is also formed between the sliding side surface 113 of the groove 112 in the shaft 110 and the dynamic pressure surface 35 in the usage state. The height of this space having a wedge shape is gradually decreased from the introduction surface 34 side toward the side surface 2 side. Therefore, the seal ring 10 can provide effects similar to those provided by the above-described seal ring 1. In the seal ring 1, the two dynamic pressure surfaces 35 are provided, and the dynamic pressure surfaces 35 are provided in both directions of the circumferential direction with respect to the introduction surface 34 (the introduction part 32), respectively. Therefore, the seal ring 1 can provide the above-described effects in rotations in both rotation directions of the shaft 110. On the other hand, in the seal ring 10, the one dynamic pressure surface 35 is provided, and the dynamic pressure surface 35 is provided in one direction of the circumferential direction with respect to the introduction surface 34 (the introduction part 52). Therefore, the seal ring 10 can provide the above-described effects in rotation in one rotation direction of the shaft 110.

Figure 12:
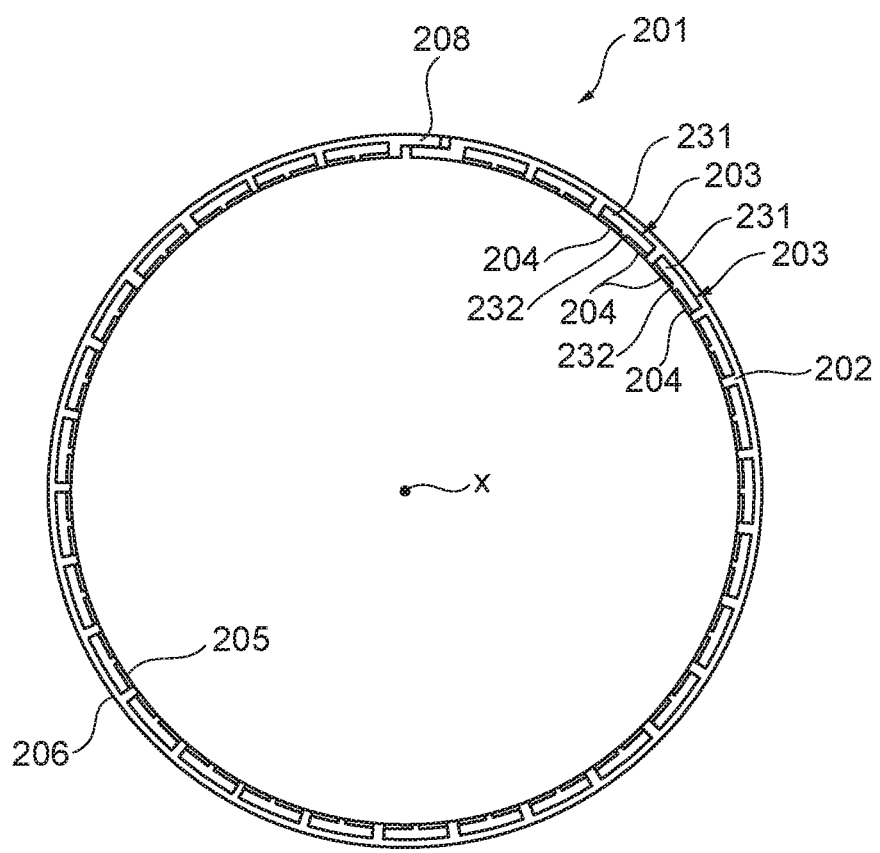
FIG. 12 is a side view on one side illustrating a schematic configuration of a seal ring according to a third embodiment of the present disclosure.
Figure 13:
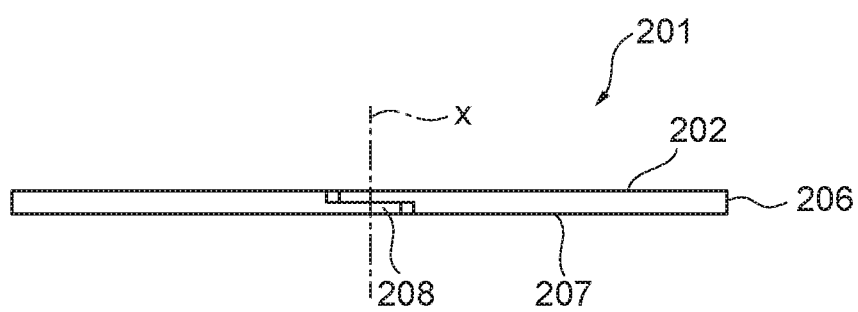
FIG. 13 is a front view illustrating a schematic configuration of the seal ring according to the third embodiment of the present disclosure.
Figure 14:
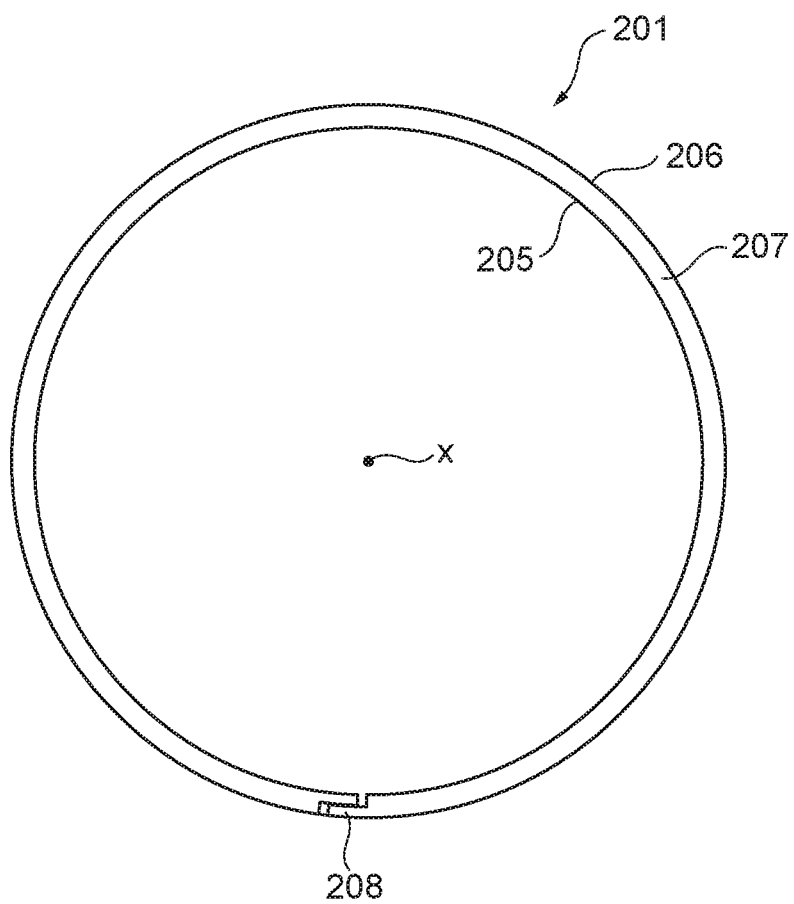
FIG. 14 is a side view on another side illustrating a schematic configuration of the seal ring according to the third embodiment of the present disclosure.
Figure 15:
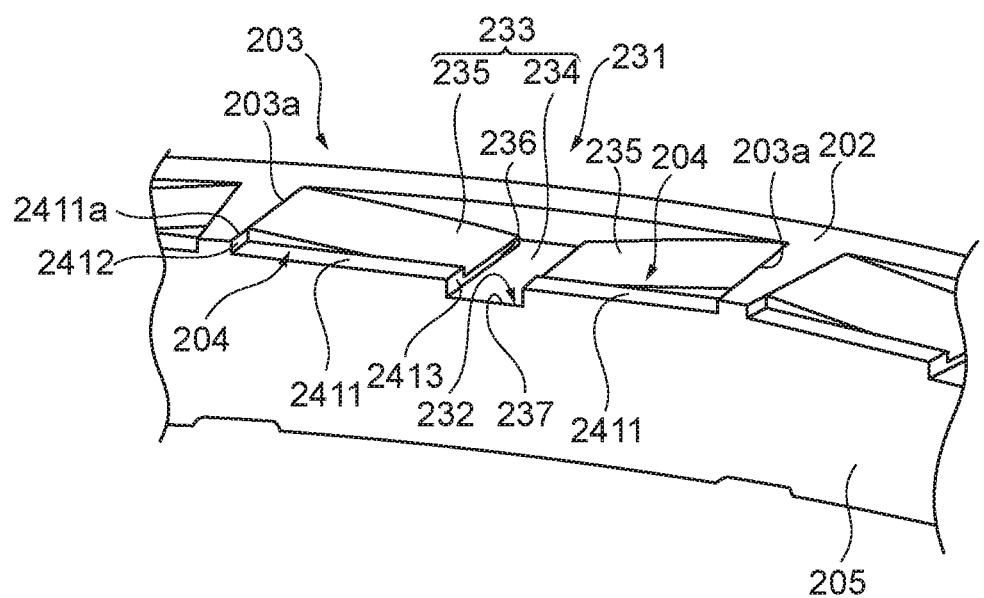
FIG. 15 is a partially enlarged perspective view illustrating a schematic configuration of the seal ring according to the third embodiment of the present disclosure.

Next, a seal ring 201 according to a third embodiment of the present disclosure will be described. FIG. 12 is a side view on one side illustrating a schematic configuration of the seal ring 201 according to a third embodiment of the present disclosure, FIG. 13 is a front view illustrating a schematic configuration of the seal ring 201, and FIG. 14 is a side view on another side illustrating a schematic configuration of the seal ring 201. In addition, FIG. 15 is a partially enlarged perspective view illustrating a schematic configuration of the seal ring 201.

The seal ring 201 according to the third present embodiment is a sealing apparatus for sealing an annular gap between a shaft and a shaft hole into which the shaft is inserted, and in a vehicle or a general-purpose machine, the seal ring 201 is used for sealing between a shaft and a shaft hole into which the shaft is inserted, the shaft hole being formed in a housing or the like, the shaft and the housing or the like rotating relatively to each other. The seal ring 201 that is attached to a groove formed in an outer peripheral surface of a shaft to maintain a hydraulic pressure of an operation oil is used in, for example, an automatic transmission or a continuously variable transmission. Note that targets to which the seal ring 201 according to the third embodiment of the present disclosure is applied are not limited to the above.

As illustrated in FIG. 12, the seal ring 201 has an annular shape around an axis x and includes at least one side surface 202 facing in a direction of the axis x, a plurality of recessed parts 203 that are formed such that the plurality of recessed parts 203 are separated from one another in a circumferential direction of the side surface 202, and a plurality of inner peripheral wall parts 204 that are formed corresponding to the plurality of recessed parts 203, respectively. The recessed part 203 includes a dynamic pressure part 231 that extends in the circumferential direction to converge on the side surface 202, and an introduction part 232 that extends toward an inner periphery side from the dynamic pressure part 231 to open the dynamic pressure part 231 toward the inner periphery side.

The number of inner peripheral wall parts 204 provided for each of the recessed parts 203 is one or two. Each of the inner peripheral wall parts 204 is a portion defined on the inner periphery side of the corresponding recessed part 203 by the dynamic pressure part 231 and the introduction part 232 of the corresponding recessed part 203, and includes an inner peripheral wall surface 2411 which is a surface continuing from the side surface 202. The inner peripheral wall surface 2411 is depressed by a predetermined depth from the side surface 202, and extends toward the introduction part 232 in the circumferential direction in a state parallel to the side surface 202. More specifically, the inner peripheral wall surface 2411 is a flat stepped surface that is depressed by a predetermined depth from the side surface 202 through a vertical surface 2412.

Specifically, the side surface 202 is a surface formed as a sliding surface that is pressed against a side surface of a groove formed in a shaft in a usage state described later. The seal ring 201 according to the third embodiment includes only one side surface 202 serving as the sliding surface, as illustrated in FIGS. 12 and 14. Note that the seal ring 201 may include two side surfaces 202 serving as the sliding surfaces, that is, may also include a side surface 202 serving as the sliding surface on another side surface of the seal ring 201. In this case, the attachment direction of the seal ring 201 to the groove formed in the shaft is not limited, and therefore the seal ring 201 can be easily attached.

As illustrated in FIGS. 12 to 14, in the seal ring 201, a cross-sectional shape in a surface along the axis x is a rectangular shape or a substantially rectangular shape. The seal ring 201 includes an inner peripheral surface 205 that is a surface facing toward the inner periphery side, an outer peripheral surface 206 facing toward the outer periphery side, a side surface 202, and a side surface 207 that is another side surface. The inner peripheral surface 205 is, for example, a cylindrical surface or a substantially cylindrical surface centered or substantially centered about the axis x. The outer peripheral surface 206 is a surface facing away from the inner peripheral surface 205, and is, for example, a cylindrical surface or a substantially cylindrical surface centered or substantially centered about the axis x. The side surface 202 is an annular surface along a plane or a substantial plane perpendicular or substantially perpendicular to the axis x, and expands between the inner peripheral surface 205 and the outer peripheral surface 206. The side surface 207 is a surface facing away from the side surface 202, is an annular surface along a plane or a substantial plane perpendicular or substantially perpendicular to the axis x, and expands between the inner peripheral surface 205 and the outer peripheral surface 206.

Figure 16:
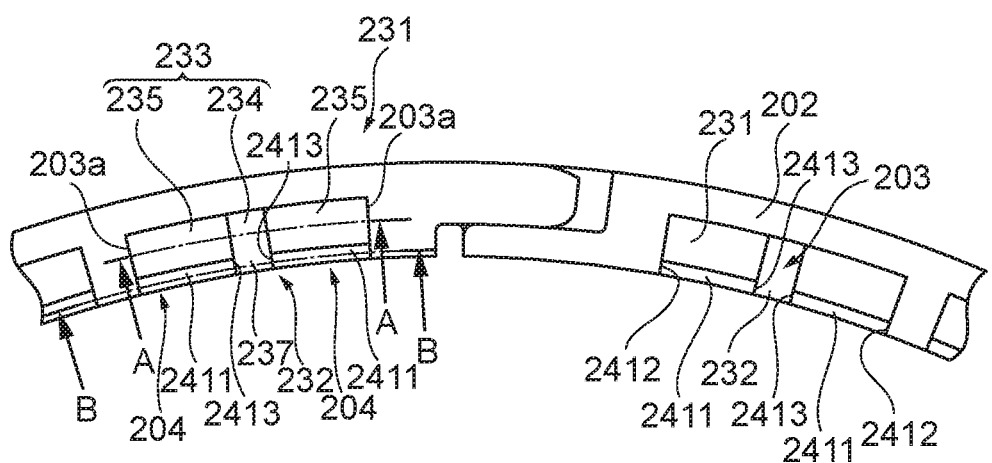
FIG. 16 is a partially enlarged view of the seal ring illustrated in FIG. 12.

As described above, the plurality of recessed parts 203 are formed on the side surface 202 serving as the sliding surface. The recessed parts 203 are formed at equal angular intervals or substantially equal angular intervals around the axis x. As illustrated in FIGS. 15 and 16, the recessed part 203 is a recessed part recessed from the side surface 202 toward the side surface 207 side, and is formed in a substantially T shape as viewed in the direction of the axis x. The recessed part 203 is provided on the inner peripheral surface 205 side in the side surface 202 such that the recessed part 203 does not appear on the outer periphery side from the side surface of the groove in the shaft in the usage state.

Specifically, as illustrated in FIGS. 15 and 16, the dynamic pressure part 231 of the recessed part 203 is separated in the radial direction from the outer peripheral surface 206 and the inner peripheral surface 205, and extends in the circumferential direction to have an arc shape or a substantially arc shape centered or substantially centered about the axis x. The dynamic pressure part 231 is provided on the inner peripheral surface 205 side in the radial direction. Specifically, the dynamic pressure part 231 includes a bottom surface 233 that is a surface facing toward a side toward which the side surface 202 faces. The bottom surface 233 includes an introduction surface 234 connected to the introduction part 232, and one or two dynamic pressure surfaces 235 each extending between the introduction surface 234 and the side surface 202. In the seal ring 201 according to the present embodiment, the bottom surface 233 includes two dynamic pressure surfaces 235.

Figure 17:
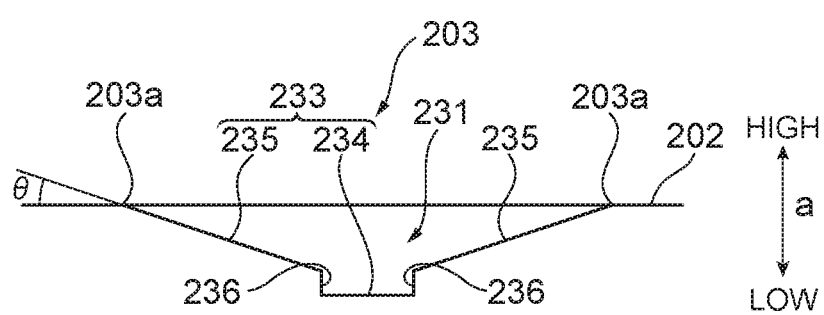
FIG. 17 is a partially enlarged cross-sectional view of a cross-section taken along line A-A in FIG. 16.

As illustrated in FIGS. 15 and 17, the introduction surface 234 is positioned on the lowest side in the dynamic pressure part 231, is formed in a plane or a substantial plane, and expands into a rectangular shape or a substantially rectangular shape. Note that in the recessed part 203, the direction of the axis x is also referred to as a height direction. In the height direction (a direction of an arrow a in FIGS. 17 and 18), an inner side of the seal ring 201 is assumed as a lower side, and the side surface 202 side is assumed as a higher side. The introduction surface 234 may be formed in a curved surface, and may not have to expand into the rectangular shape.

In addition, the dynamic pressure surface 235 is a planar or a substantial planar surface that is inclined with respect to the side surface 202 upwardly from the introduction surface 234 and extend into a rectangular shape or a substantially rectangular shape toward the side surface 202 in the circumferential direction. The dynamic pressure surface 235 extends between the introduction surface 234 and the side surface 202, and is smoothly connected to the side surface 202. Here, an inclination angle of the dynamic pressure surface 235 with respect to the side surface 202 is an inclination angle θ, and can be set to any angle according to a length in the circumferential direction of the recessed part 203.

Note that the dynamic pressure surface 235 is a planar or a substantial planar surface as described above, but is not limited thereto. The dynamic pressure surface 235 may be a curved surface, and may not have to expand into the rectangular shape. For example, the dynamic pressure surface 235 may be formed in a trapezoidal shape widening or narrowing toward the side surface 202 side. In addition, the dynamic pressure surface 235 is connected to the introduction surface 234 through a stepped surface 236 forming a step depressed toward the side surface 207 side in the direction of the axis x. Note that the recessed part 203 may not have to include the stepped surface 236 so that the dynamic pressure surface 235 is directly connected to the introduction surface 234.

As described above, the two dynamic pressure surfaces 235 are formed in the recessed part 203, and are formed to be symmetrical in the circumferential direction about the introduction surface 234 in the bottom surface 233. That is, one of the dynamic pressure surfaces 235 extends from one end in the circumferential direction of the introduction surface 234 to the side surface 202 in the one direction of the circumferential direction. Another dynamic pressure surface 235 extends from another end in the circumferential direction of the introduction surface 234 to the side surface 202 in another direction of the circumferential direction. The dynamic pressure part 231 is formed to be positioned not to appear on the outer periphery side from the side surface which the dynamic pressure part 231 contacts, of the groove in the shaft, in the usage state described later.

As illustrated in FIGS. 15 and 16, in the introduction part 232 of the recessed part 203, a substantially U shape recess is formed on the inner peripheral surface 205, the recess opening toward the side surface 207 side, and the introduction part 232 is connected to the dynamic pressure part 231 between the end portions (end portions 203a) in the circumferential direction of the dynamic pressure part 231. Specifically, the introduction part 232 includes a bottom surface 237 that is connected to the introduction surface 234 and the stepped surfaces 236 of the dynamic pressure part 231, and is continued to the introduction surface 234. The bottom surface 237 is smoothly connected to the introduction surface 234 of the dynamic pressure part 231, and the bottom surface 237 is, for example, a surface that is positioned at the same height as the introduction surface 234. In the seal ring 201, a passage communicating from the inner peripheral surface 205 to the dynamic pressure part 231 is formed by the introduction part 232.

As described later, in the usage state in which the side surface 202 of the seal ring 201 contacts the side surface of the groove in the shaft, the recessed part 203 communicates with a space which the inner peripheral surface 205 contacts. More specifically, the dynamic pressure part 231 communicates, through the introduction part 232, with the space which the inner peripheral surface 205 contacts. In the usage state, the dynamic pressure part 231 forms a space extending in the circumferential direction between the dynamic pressure part 231 and the side surface of the groove in the shaft, and the dynamic pressure surface 235 forms a space in which a height (a width in the height direction) is gradually decreased from the introduction surface 234 side toward the side surface 202 side, the space extending in the circumferential direction between the dynamic pressure surface 235 and the side surface of the groove in the shaft.

As described above, the plurality of inner peripheral wall parts 204 are formed corresponding to the plurality of recessed parts 203, respectively. Specifically, as illustrated in FIGS. 15 and 16, with respect to each of the recessed parts 203, the two inner peripheral wall parts 204 are formed more on the inner peripheral surface 205 side than the dynamic pressure surfaces 235 of the dynamic pressure part 231.

The inner peripheral wall part 204 is a portion defined by a portion in the circumferential direction in which one dynamic pressure surface 235 of the dynamic pressure part 231 extends, the introduction part 232, and the inner peripheral surface 205. The inner peripheral wall part 204 includes the inner peripheral wall surface 2411 that is adjacent to the dynamic pressure surface 235 of the dynamic pressure part 231 on the inner periphery side, has a portion that is depressed at a lower position than the dynamic pressure surface 235 in the height direction (a direction of the arrow a) to be lower than the dynamic pressure surface 235, and has a portion that protrudes at a higher position than the dynamic pressure surface 235 in the height direction (the direction of the arrow a) to be higher than the dynamic pressure surface 235. The inner peripheral wall part 204 includes the inner peripheral wall surface 2411, a vertical surface 2412 that is a surface vertical to the side surface 202 and extending along the axis x from the end portion 203a toward the inner side of the side surface 202, and a vertical surface 2413 that is a surface formed by the introduction part 232 and extending along the axis x.

The inner peripheral wall surface 2411 of the inner peripheral wall part 204 faces toward the side toward which the side surface 202 faces, and extends within the same range as or the substantially same range as the dynamic pressure surface 235 in the circumferential direction. Specifically, the inner peripheral wall surface 2411 extends, in the circumferential direction, from the same position as the stepped surface 236 of the dynamic pressure part 231 up to the same position as the end portion 203a of the dynamic pressure part 231 or from the same position as the stepped surface 236 of the dynamic pressure part 231 up to the vicinity of the end portion 203a of the dynamic pressure part 231. That is, an end portion 2411a, which is a portion to be connected to the side surface 202 of the inner peripheral wall surface 2411 may be the same as the end portion 203a that is a portion where the dynamic pressure surface 235 contacts the side surface 202, or may be positioned in the vicinity of the end portion 203a, in the circumferential direction. In the seal ring 201 illustrated, the end portion 2411a and the end portion 203a are formed at the same position in the circumferential direction. When the end portion 2411a is positioned in the vicinity of the end portion 203a in the circumferential direction, it is preferable that in the circumferential direction, the end portion 2411a of the inner peripheral wall surface 2411 is positioned more on the introduction part 232 side (inner side) than the end portion 203a of the dynamic pressure surface 235.

Figure 18:
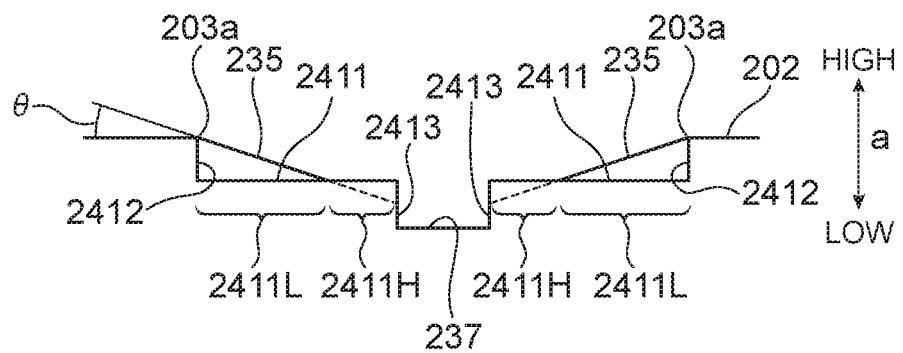
FIG. 18 is a partially enlarged cross-sectional view of a cross-section taken along line B-B in FIG. 16.

As illustrated in FIGS. 15 and 18, the inner peripheral wall surface 2411 extends into a planar shape in the circumferential direction and parallel to the side surface 202 from the vertical surface 2412 toward the vertical surface 2413, and is connected to the introduction part 232 through the vertical surface 2413. The inner peripheral wall surface 2411 includes a lower wall surface portion 2411L that is a portion lower than the dynamic pressure surface 235 and a higher wall surface portion 2411H that is a portion higher than the dynamic pressure surface 235, as viewed in the direction of the axis x. However, a height of the inner peripheral wall surface 2411 is always lower than that of the side surface 202. Note that the inner peripheral wall surface 2411 includes the lower wall surface portion 2411L and the higher wall surface portion 2411H, but not limiter thereto, and may include only the lower wall surface portion 2411L that is lower than the dynamic pressure surface 235 in whole.

Incidentally, the inner peripheral wall surface 2411 is formed in a plane or a substantial plane, and extends into a rectangular shape or a substantially rectangular shape in a plan view. The inner peripheral wall surface 2411 may be a curved surface, and may not have to expand into the rectangular shape in a plan view. For example, the inner peripheral wall surface 2411 may be formed in a trapezoidal shape in a plan view widening or narrowing toward the side surface 202 side. In addition, the inner peripheral wall surface 2411 may be a surface formed by continuously connecting a plurality of planes or substantial planes, a plurality of curved surfaces or substantial planes, or a plurality of these combined surfaces.

Figure 19A:
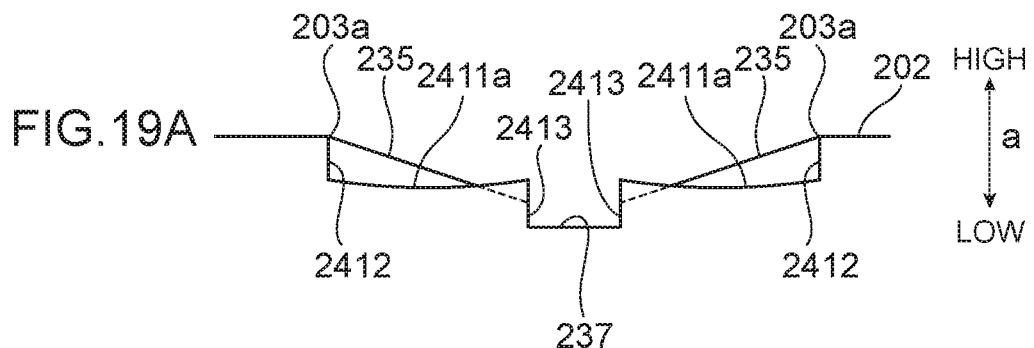
FIGS. 19A to C are partially enlarged cross-sectional views of a cross-section taken along line B-B in FIG. 16 for illustrating a variant of an inner peripheral wall surface.
Figure 19B:
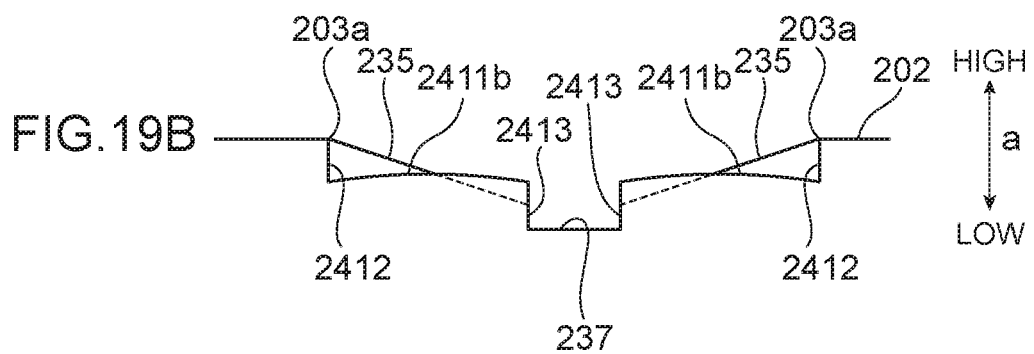
Figure 19C:
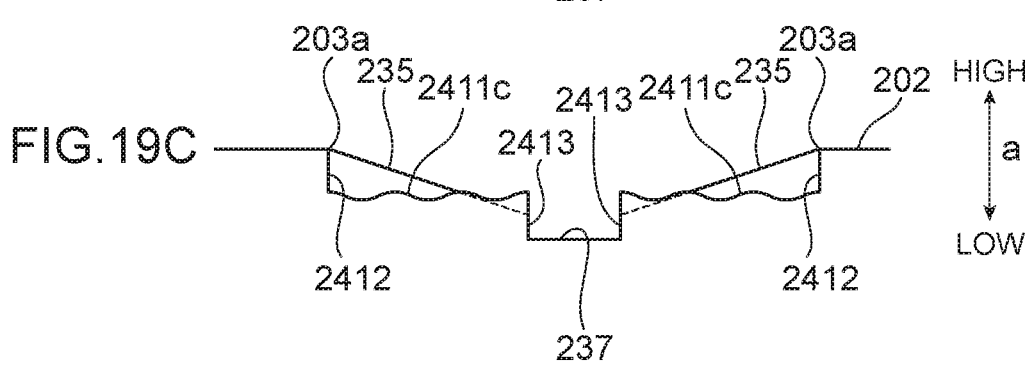

For example, as illustrated in FIG. 19A, the inner peripheral wall surface 2411 may be formed by a curved surface that is slightly curved to be depressed in a recessed shape from the vertical surface 2412 toward the vertical surface 2413. As illustrated in FIG. 19B, an inner peripheral wall surface 2411b may be formed by a curved surface that is slightly curved to be protruded in a protruding shape from the vertical surface 2412 toward the vertical surface 2413. In this case, the inner peripheral wall surface 2411b has a height not to protrude from the side surface 202 in the height direction (the direction of the arrow a). Furthermore, as illustrated in FIG. 19C, the inner peripheral wall surface 2411c may be formed by a curved surface that is curved in a wave shape from the vertical surface 2412 toward the vertical surface 2413.

As described above, the two inner peripheral wall parts 204 are formed to each of the recessed parts 203, and are formed to be symmetrical about the introduction part 232 in the circumferential direction. That is, one of the inner peripheral wall parts 204 extends from one end in the circumferential direction of the introduction part 232 to the side surface 202 in the one direction of the circumferential direction. Another inner peripheral wall part 204 extends from another end in the circumferential direction of the introduction part 232 to the side surface 202 in the other direction of the circumferential direction.

As described later, in the usage state in which the side surface 202 of the seal ring 201 contacts the side surface of the groove in the shaft, the inner peripheral wall surface 2411 of the inner peripheral wall part 204 faces the side surface of the groove in the shaft. Since the inner peripheral wall surface 2411 is parallel to the side surface 202, the inner peripheral wall surface 2411 does not contact the side surface of the groove, thereby forming a space having a rectangular cross section between the inner peripheral wall surface 2411 and the side surface of the groove.

The seal ring 201 is formed of a resin material such as polyether ether ketone (PEEK), polyphenylene sulfide (PPS), and polytetrafluoroethylene (PTFE). A circumferential length of the outer peripheral surface 206 of the seal ring 201 is shorter than the circumferential length of the inner peripheral surface of the shaft hole into which the shaft is inserted, not to have an interference with respect to the shaft hole. Therefore, in a state in which the fluid pressure does not act on the seal ring 201 in the usage state, the outer peripheral surface 206 of the seal ring 201 is separated from the inner peripheral surface of the shaft hole.

The seal ring 201 is not endless, and as illustrated in FIGS. 12 to 14, the seal ring 201 includes an abutment joint 208 at one portion in the circumferential direction of the seal ring 201. The abutment joint 208 has a well-known structure capable of maintaining a stable sealing performance even when the circumferential length of the seal ring 201 varies due to thermal expansion or thermal contraction of the seal ring 201. Examples of the structure of the abutment joint 208 include a so-called special step cut structure in which the abutment joint 208 is cut off in a stepwise manner when seen from any of the side of the outer peripheral surface 206 and the sides of the both side surfaces 202 and 207, a straight cut structure, a bias cut structure, and a step cut structure. When a material (such as PTFE) having low elasticity is employed as the material of the seal ring 201, the seal ring 201 may be endless without having the abutment joint 208.

Next, action of the seal ring 201 having the above-described configuration will be described.

Figure 20:
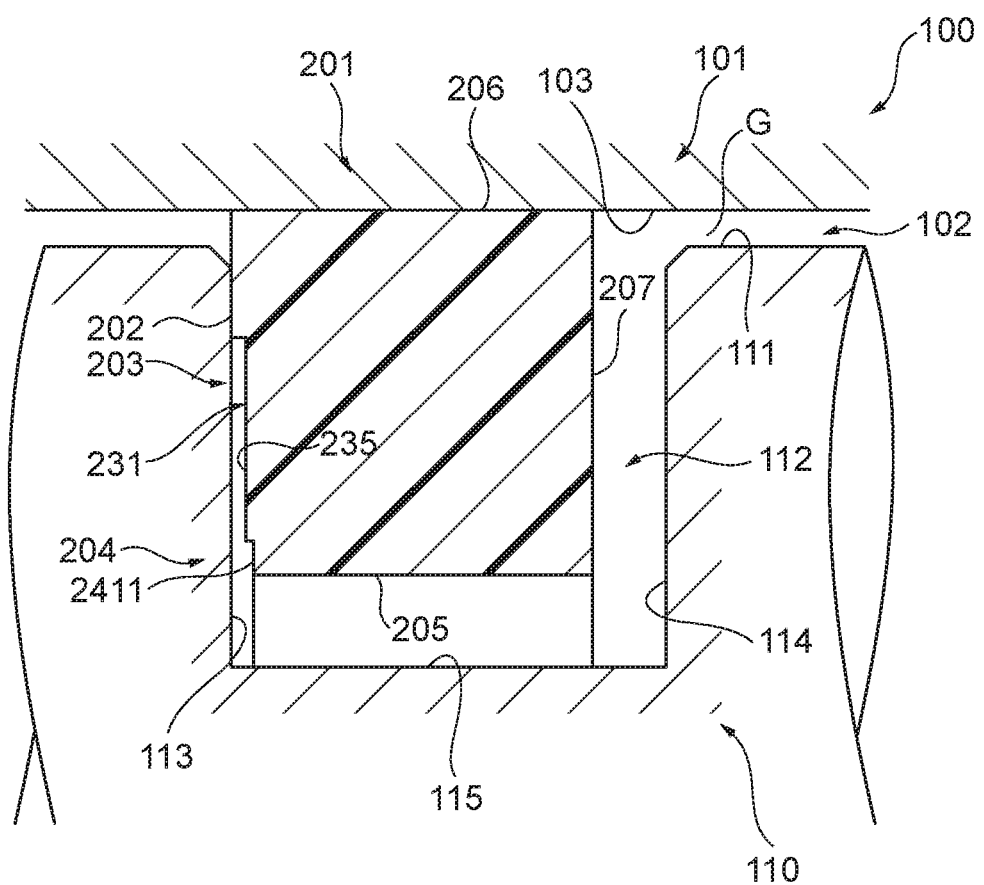
FIG. 20 is a partially enlarged cross-sectional view of the seal ring according to the third embodiment of the present disclosure in a usage state in which the seal ring is attached to a housing and a shaft inserted into a shaft hole that is a through-hole formed at the housing in a hydraulic apparatus as an attachment target.

FIG. 20 is a partially enlarged cross-sectional view of the seal ring 201 in a usage state in which the seal ring 201 is attached to a housing 101 and a shaft 110 inserted into a shaft hole 102 that is a through-hole formed at the housing 101 in a hydraulic apparatus 100 as an attachment target. The shaft 110 is relatively rotatable with respect to the housing 101, and an annular groove 112 recessed toward a center side is formed in an outer peripheral surface 111 of the shaft 110. The groove 112 has a cross section formed in a rectangular shape or a substantially rectangular shape, and is defined by side surfaces 113 and 114 having a planar shape and a bottom surface 115. In the hydraulic apparatus 100, an annular space is formed between an inner peripheral surface 103 of the shaft hole 102 and an outer peripheral surface 111 of the shaft 110, and a hydraulic channel in which operation oil (not illustrated) is to be filled is formed in the shaft 110 and the housing 101. The seal ring 201 is attached to the groove 112, and seals a gap G between the shaft 110 and the shaft hole 102 to prevent loss of hydraulic pressure of the operation oil in the hydraulic channel. In FIG. 20, a part of the groove 12 on the right side forms the hydraulic channel, and a side surface 113 on the left side of the groove 112 serves as a sliding side surface against which the seal ring 1 is pressed, whereby pressure on the right side of the groove 112 becomes high and pressure on the left side of the groove 112 becomes low. The seal ring 201 is attached to the groove 112 such that the side surface 202 faces the sliding side surface 113 of the groove 112.

When the operation oil is introduced into the hydraulic channel, the pressure in the hydraulic channel becomes high, whereby the outer peripheral surface 206 and the side surface 202 of the seal ring 201 are pressed against the inner peripheral surface 103 of the shaft hole 102 and the sliding side surface 113 of the groove 112, respectively. Thus, in the annular gap G, the hydraulic channel is sealed, to thereby maintain the hydraulic pressure. When the shaft 110 rotates, the shaft 110 rotates with respect to the seal ring 201, and the sliding side surface 113 of the groove 112 slides with respect to the side surface 202 of the seal ring 201. At this time, the operation oil intrudes into the recessed part 203 from the introduction part 232 of the seal ring 201, and is introduced to the dynamic pressure part 231, and the hydraulic pressure of the operation oil causes the operation oil to move to the end portion 203a in the circumferential direction along the dynamic pressure surface 235 in the dynamic pressure part 231. While the side surface 202 of the seal ring 201 contacts the sliding side surface 113 of the groove 112, the pressure on the end portion 203a side of the dynamic pressure part 231 is increased by this movement of the operation oil in the dynamic pressure part 231, and finally the pressure of the operation oil on the end portion 203a side is increased until the side surface 202 of the seal ring 201 is separated from the sliding side surface 113, resulting that the operation oil leaks out to the side surface 202 from the end portion 203a of the dynamic pressure part 231. This causes a thin lubricating film of the operation oil to be formed between the side surface 202 of the seal ring 201 and the sliding side surface 113 of the groove 112, thereby reducing a sliding resistance of the groove 112 with respect to the seal ring 201. Thus, in the usage state, the recessed part 203 uses the dynamic pressure effect to reduce the sliding resistance of the groove 112 with respect to the seal ring 201.

The inner peripheral wall surface 2411 of the inner peripheral wall part 204 is provided parallel to and evenly with the side surface 202 in a state in which the inner peripheral wall surface 2411 is recessed from the side surface 202, thereby forming a space having a rectangular cross section between the inner peripheral wall surface 2411 and the sliding side surface 113 of the groove 112. Therefore, the inner peripheral wall surface 2411 can obtain the dynamic pressure effect by the operation oil similar to the above-described dynamic pressure effect of the recessed part 203, and the sliding resistance of the groove 112 with respect to the seal ring 201 can be also reduced by the inner peripheral wall surface 2411.

Since the inner peripheral wall surface 2411 is recessed from the side surface 202 through the vertical surface 2412 with parallel to the side surface 202, the operation oil in the recessed part 203 can be released to the space, thereby providing a cooling effect. Furthermore, since the inner peripheral wall surface 2411 is recessed from the side surface 202 through the vertical surface 2412 with parallel to the side surface 202, an abrasion amount is smaller than that when the inner peripheral wall surface 2411 has a flat shape even when the side surface 202 of the seal ring 201 is abraded, whereby the reduction in dynamic pressure effect can be suppressed.

A contact area of the seal ring 201 with respect to the sliding side surface 113 of the groove 112 can be reduced by the space having a rectangular cross section that is formed between the inner peripheral wall surface 2411 and the sliding side surface 113 of the groove 112, whereby the sliding resistance of the groove 112 with respect to the seal ring 201 can be also reduced.

The seal ring 201 can reduce the sliding resistance of the groove 112 to the seal ring 201 as described above. Therefore, heat generated in the sliding portion in use can be suppressed, and the seal ring 201 can be used under a higher P (pressure) and V (velocity) condition, the PV condition being used as an index for confirming the durability. In addition, the seal ring 201 can be also used for the shaft 110 which is soft.

As described above, according to the seal ring 201 according to the third embodiment of the present disclosure, the sliding resistance can be further reduced.

Figure 21:
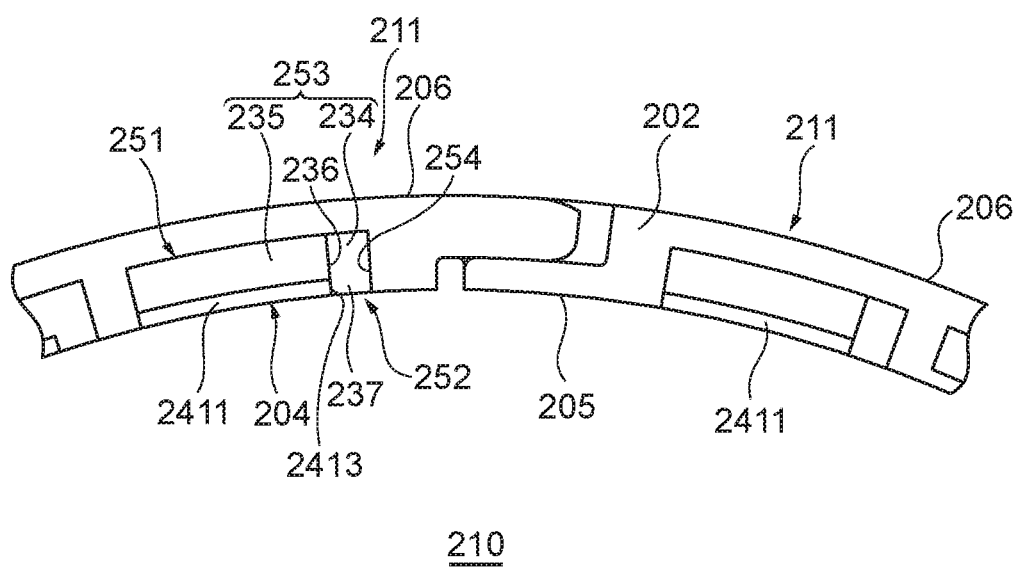
FIG. 21 is a partially enlarged side view enlargedly illustrating a portion of a side surface on one side of a seal ring according to a fourth embodiment of the present disclosure, the view illustrating a schematic configuration of the seal ring.
Figure 22:
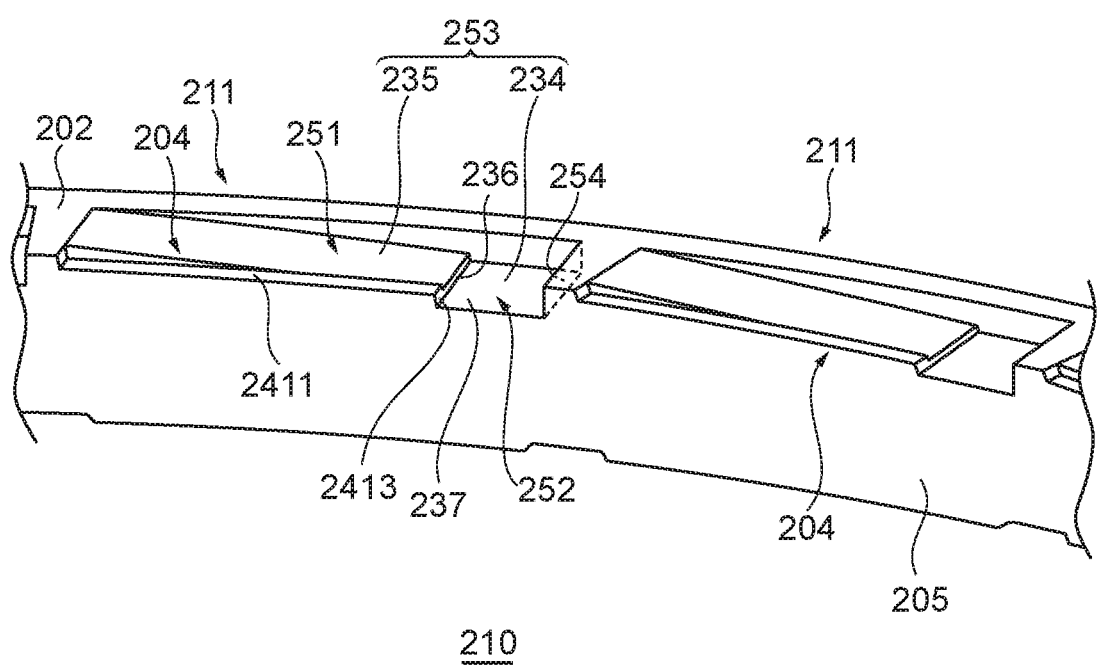
FIG. 22 is a partially enlarged perspective view illustrating a schematic configuration of the seal ring according to the fourth embodiment of the present disclosure.

Next, a seal ring 210 according to a fourth embodiment of the present disclosure will be described. FIG. 21 is a partially enlarged side view enlargedly illustrating a portion of a side surface on one side of the seal ring 210, the view illustrating a schematic configuration of the seal ring 210, and FIG. 22 is a partially enlarged perspective view illustrating a schematic configuration of the seal ring 210. The seal ring 210 according to the fourth embodiment of the present disclosure is different from the above-described seal ring 201 according to the third embodiment of the present disclosure in configurations of the recessed part and the inner peripheral wall part. Hereinafter, components of the seal ring 210 according to the fourth embodiment of the present disclosure that are the same or have similar functions to those of the seal ring 201 according to the third embodiment of the present disclosure will be denoted by the same reference characters, the description thereof will be omitted, and different configurations will be described.

The seal ring 210 includes a recessed part 211 different from the recessed part 203 of the seal ring 201. As illustrated in FIGS. 21 and 22, the recessed part 211 includes a dynamic pressure part 251 and an introduction part 252, and the dynamic pressure part 251 includes only one dynamic pressure surface 235. Hereinafter, the description will be specifically made.

The dynamic pressure part 251 of the recessed part 211 is separated in the radial direction from the outer peripheral surface 206 and the inner peripheral surface 205, and extends in the circumferential direction to have an arc shape or a substantially arc shape centered or substantially centered about the axis x. The dynamic pressure part 251 is provided on the inner peripheral surface 205 side in the radial direction. Specifically, the dynamic pressure part 251 includes a bottom surface 253 that is a surface facing toward a side toward which the side surface 202 faces. The bottom surface 253 includes an introduction surface 234 connected to the introduction part 252, and one dynamic pressure surface 235 extending between the introduction surface 234 and the side surface 202.

The dynamic pressure surface 235 is connected to the introduction surface 234 through a stepped surface 236. In addition, the dynamic pressure part 251 includes an end surface 254 that is a planar or a substantial planar surface extending along the axis x, on the opposite side of the dynamic pressure surface 235 in the circumferential direction with respect to the introduction surface 234. The end surface 254 extends up to the side surface 202 from an end portion on the opposite side in the circumferential direction of the end portion connected to the dynamic pressure surface 235 of the introduction surface 234. The dynamic pressure part 251 is formed such that the dynamic pressure part 251 does not appear on the outer periphery side from the sliding side surface 113 of the groove 112 in the shaft 110 which the dynamic pressure part 251 contacts in the usage state.

As illustrated in FIGS. 21 and 22, the introduction part 252 of the recessed part 211 forms a substantially U shape recess in the inner peripheral surface 205, the recess opening toward the side surface 202 side, and the introduction part 252 is connected to the dynamic pressure part 251 at one end portion in the circumferential direction of the dynamic pressure part 251. Specifically, the introduction part 252 is connected to the introduction surface 234 of the dynamic pressure part 251, the stepped surface 236, and the end surface 254, and includes a bottom surface 237 continued to the introduction surface 234. In the seal ring 210, by the introduction part 252 a passage communicating from the inner peripheral surface 205 to the dynamic pressure part 251 is formed. Thus, the recessed part 211 of the seal ring 210 is formed in an L-shape.

The seal ring 210 includes, for each of the recessed parts 211, only one inner peripheral wall part 204 in which the inner peripheral wall surface 2411 is formed. As illustrated in FIGS. 21 and 22, the inner peripheral wall part 204 is not formed on the end surface 254 side in the circumferential direction with respect to the introduction part 252, and the inner peripheral wall part 204 is formed only on the dynamic pressure surface 235 side in the circumferential direction with respect to the introduction part 252.

Similar to the above-described seal ring 201, also in the seal ring 210 according to the fourth embodiment of the present disclosure, a space having a wedge shape is also formed between the sliding side surface 113 of the groove 112 in the shaft 110 and the dynamic pressure surface 235 in the usage state. The height of this space having a wedge shape is gradually decreased from the introduction surface 234 side toward the side surface 202 side. Therefore, the seal ring 210 can provide effects similar to those provided by the above-described seal ring 201.

In the seal ring 201, the two dynamic pressure surfaces 235 are provided, and the dynamic pressure surfaces 235 are provided in both directions of the circumferential direction with respect to the introduction surface 234 (the introduction part 232), respectively. Therefore, the seal ring 201 can provide the above-described effects in rotations in both rotation directions of the shaft 110.

On the other hand, in the seal ring 210, the one dynamic pressure surface 235 is provided, and the dynamic pressure surface 235 is provided in one direction of the circumferential direction with respect to the introduction surface 234 (the introduction part 252). Therefore, the seal ring 210 can provide the above-described effects for rotation in one rotation direction of the shaft 110.

Since the inner peripheral wall surface 2411 of the inner peripheral wall part 204 has the space having a rectangular cross section formed between the inner peripheral wall surface 2411 and the sliding side surface 113 of the groove 112, the inner peripheral wall surface 2411 can obtain the dynamic pressure effect by the operation oil similar to the above-described dynamic pressure effect of the recessed part 203, and the sliding resistance of the groove 112 with respect to the seal ring 201 can be also reduced by the inner peripheral wall surface 2411.

Since the inner peripheral wall surface 2411 is recessed from the side surface 202 through the vertical surface 2412 with parallel to the side surface 202, a pressure receiving area of the side surface 202 is reduced when the hydraulic pressure is generated, and the operation oil in the recessed part 203 can be released, thereby providing a cooling effect. Furthermore, since the inner peripheral wall surface 2411 is recessed from the side surface 202 through the vertical surface 2412 with parallel to the side surface 202, the reduction in dynamic pressure effect can be suppressed even when the side surface 202 of the seal ring 201 is abraded.

The contact area of the seal ring 201 with respect to the sliding side surface 113 of the groove 112 can be reduced by the space having a rectangular cross section that is formed between the inner peripheral wall surface 2411 and the sliding side surface 113 of the groove 112, also by this, the sliding resistance of the groove 112 with respect to the seal ring 201 can be also reduced.

Figure 23:
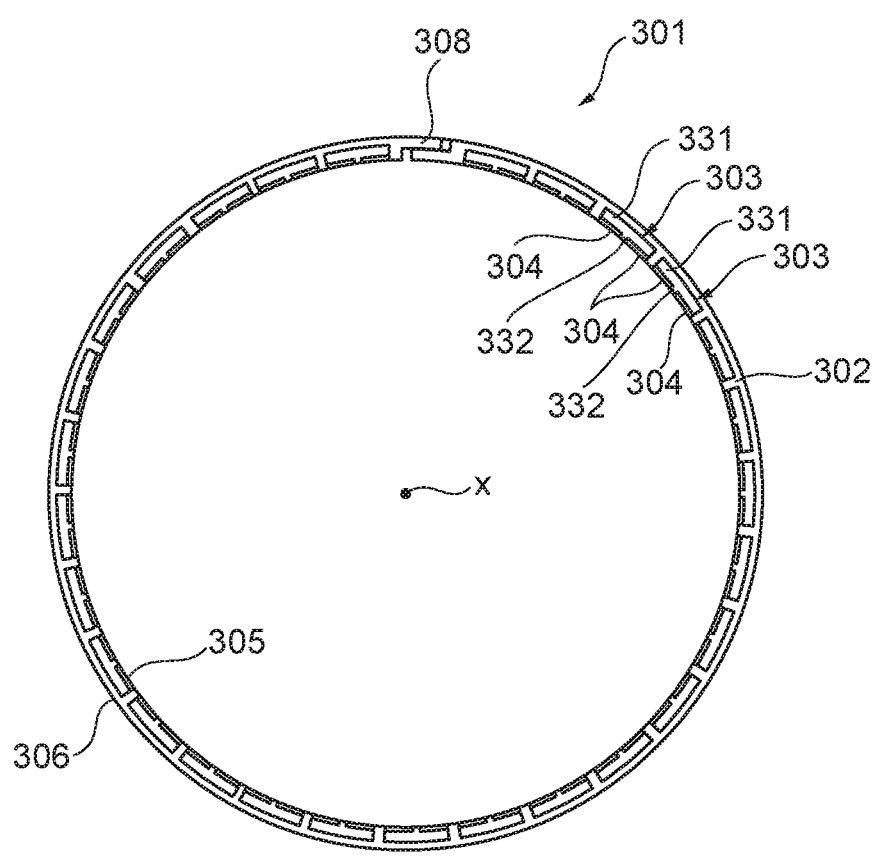
FIG. 23 is a side view on one side illustrating a schematic configuration of a seal ring according to a fifth embodiment of the present disclosure.
Figure 24:
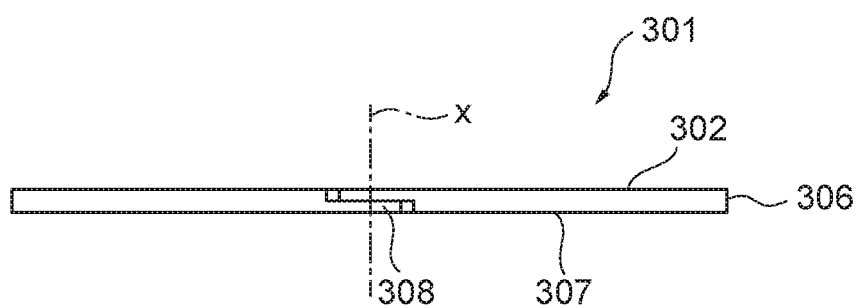
FIG. 24 is a front view illustrating a schematic configuration of the seal ring according to the fifth embodiment of the present disclosure.
Figure 25:
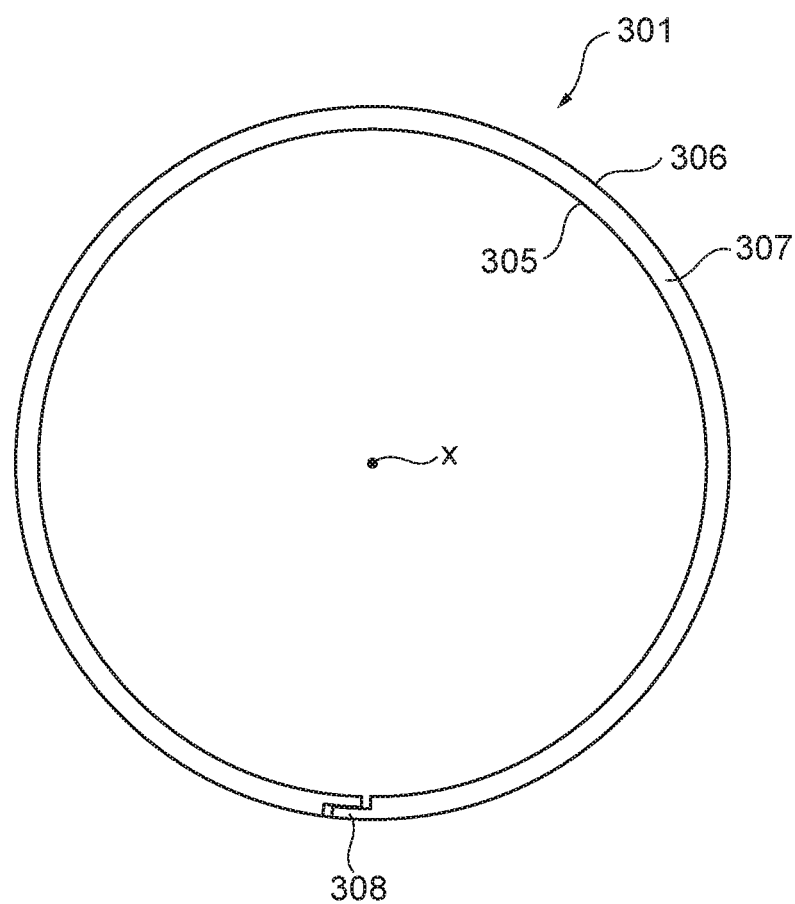
FIG. 25 is a side view on another side illustrating a schematic configuration of the seal ring according to the fifth embodiment of the present disclosure.
Figure 26:
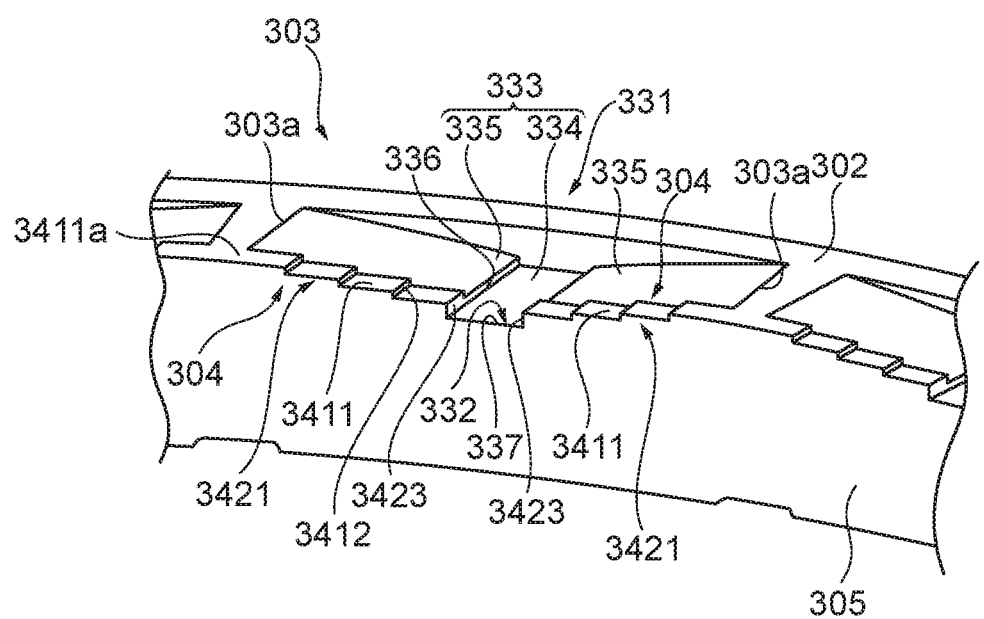
FIG. 26 is a partially enlarged perspective view illustrating a schematic configuration of the seal ring according to the fifth embodiment of the present disclosure.

Next, a seal ring 301 according to a fifth embodiment of the present disclosure will be described. FIG. 23 is side view on one side illustrating a schematic configuration of the seal ring 301 according to the fifth embodiment of the present disclosure, FIG. 24 is a front view illustrating a schematic configuration of the seal ring 301, and FIG. 25 is a side view on another side illustrating a schematic configuration of the seal ring 301. In addition, FIG. 26 is a partially enlarged perspective view illustrating a schematic configuration of the seal ring 301.

The seal ring 301 according to the fifth embodiment is a sealing apparatus for sealing an annular gap between a shaft and a shaft hole into which the shaft is inserted, and in a vehicle or a general-purpose machine, the seal ring 301 is used for sealing between a shaft and a shaft hole into which the shaft is inserted, the shaft hole being formed in a housing or the like, the shaft and the housing or the like rotating relatively to each other. The seal ring 301 that is attached to a groove formed in an outer peripheral surface of a shaft to maintain a hydraulic pressure of an operation oil is used in, for example, an automatic transmission or a continuously variable transmission. Note that targets to which the seal ring 301 according to the fifth embodiment of the present disclosure is applied are not limited to the above.

As illustrated in FIG. 23, the seal ring 301 has an annular shape around an axis x and includes at least one side surface 302 facing in a direction of the axis x, a plurality of recessed parts 303 that are formed such that the plurality of recessed parts 303 are separated from one another in a circumferential direction of the side surface 302, and a plurality of inner peripheral wall parts 304 that are formed corresponding to the plurality of recessed parts 303, respectively. The recessed part 303 includes a dynamic pressure part 331 that extends in the circumferential direction to converge on the side surface 302, and an introduction part 332 that extends toward an inner periphery side from the dynamic pressure part 331 to open the dynamic pressure part 331 toward the inner periphery side.

The number of inner peripheral wall parts 304 provided for each of the recessed parts 303 is one or two. Each of the inner peripheral wall parts 304 is a portion defined on the inner periphery side of the corresponding recessed part 303 by the dynamic pressure part 331 and the introduction part 332 of the corresponding recessed part 303, and includes an inner peripheral wall surface 3421 which is a surface continuing from the side surface 302. The inner peripheral wall surface 3421 is depressed by a predetermined depth from the side surface 302, and extends in a stepwise manner toward the introduction part 332 in the circumferential direction in a state parallel to the side surface 302. More specifically, the inner peripheral wall surface 3421 is a flat stepped surface that is formed in a stepwise manner by a predetermined depth from the side surface 302 through a vertical surface 3412.

Specifically, the side surface 302 is a surface formed as a sliding surface that is pressed against a side surface of a groove formed in the shaft in a usage state described later. The seal ring 301 according to the fifth embodiment includes only one side surface 302 serving as the sliding surface, as illustrated in FIGS. 23 and 25. Note that the seal ring 301 may include two side surfaces 302 serving as the sliding surfaces, that is, may also include the side surface 302 serving as the sliding surface on another side surface of the seal ring 301. In this case, the attachment direction of the seal ring 301 to the groove formed in the shaft is not limited, and therefore the seal ring 301 can be easily attached.

As illustrated in FIGS. 23 to 25, in the seal ring 301, a cross-sectional shape in a surface along the axis x is a rectangular shape or a substantially rectangular shape. The seal ring 301 includes an inner peripheral surface 305 that is a surface facing toward the inner periphery side, an outer peripheral surface 306 facing toward the outer periphery side, a side surface 302, and a side surface 307 that is another side surface. The inner peripheral surface 305 is, for example, a cylindrical surface or a substantially cylindrical surface centered or substantially centered about the axis x. The outer peripheral surface 306 is a surface facing away from the inner peripheral surface 305, and is, for example, a cylindrical surface or a substantially cylindrical surface centered or substantially centered about the axis x. The side surface 302 is an annular surface along a plane or a substantial plane perpendicular or substantially perpendicular to the axis x, and expands between the inner peripheral surface 305 and the outer peripheral surface 306. The side surface 307 is a surface facing away from the side surface 302, is an annular surface along a plane or a substantial plane perpendicular or substantially perpendicular to the axis x, and expands between the inner peripheral surface 305 and the outer peripheral surface 306.

Figure 27:
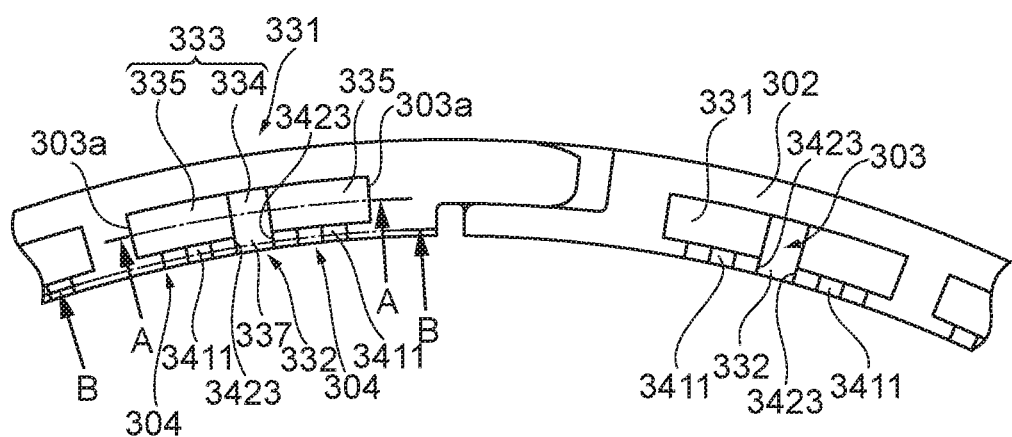
FIG. 27 is a partially enlarged view of the seal ring illustrated in FIG. 23.

As described above, the plurality of recessed parts 303 are formed on the side surface 302 serving as the sliding surface. The recessed parts 303 are formed at equal angular intervals or substantially equal angular intervals around the axis x. As illustrated in FIGS. 26 and 27, the recessed part 303 is a recessed part recessed from the side surface 302 toward the side surface 307 side, and is formed in a substantially T shape as viewed in the direction of the axis x. The recessed part 303 is provided on the inner peripheral surface 305 side in the side surface 302 such that the recessed part 3 does not appear on the outer periphery side from the side surface of the groove in the shaft in the usage state.

Specifically, as illustrated in FIGS. 26 and 27, the dynamic pressure part 331 of the recessed part 303 is separated in the radial direction from the outer peripheral surface 306 and the inner peripheral surface 305, and extends in the circumferential direction to have an arc shape or a substantially arc shape centered or substantially centered about the axis x. The dynamic pressure part 331 is provided on the inner peripheral surface 305 side in the radial direction. Specifically, the dynamic pressure part 331 includes a bottom surface 333 that is a surface facing toward a side toward which the side surface 302 faces. The bottom surface 333 includes an introduction surface 334 connected to the introduction part 332, and one or two dynamic pressure surfaces 335 each extending between the introduction surface 334 and the side surface 302. In the seal ring 301 according to the present embodiment, the bottom surface 333 includes two dynamic pressure surfaces 335.

Figure 28:
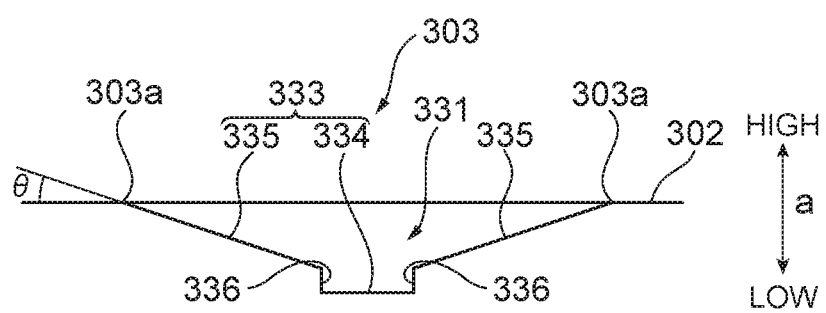
FIG. 28 is a partially enlarged cross-sectional view of a cross-section taken along line A-A in FIG. 27.

As illustrated in FIGS. 26 and 28, the introduction surface 334 is positioned on the lowest side in the dynamic pressure part 331, is formed in a plane or a substantial plane, and expands into a rectangular shape or a substantially rectangular shape. Note that in the recessed part 303, the direction of the axis x is also referred to as a height direction. In the height direction (a direction of an arrow a in FIGS. 28 and 29), an inner side of the seal ring 301 is assumed as a lower side, and the side surface 302 side is assumed as a higher side. The introduction surface 334 may be formed in a curved surface, and may not have to expand into the rectangular shape.

In addition, the dynamic pressure surface 335 is a planar or a substantial planar surface that is inclined with respect to the side surface 302 upwardly from the introduction surface 334 and extends into a rectangular shape or a substantially rectangular shape toward the side surface 302 in the circumferential direction. The dynamic pressure surface 335 extends between the introduction surface 334 and the side surface 302, and is smoothly connected to the side surface 302. Here, an inclination angle of the dynamic pressure surface 335 with respect to the side surface 302 is an inclination angle θ, and can be set to any angle according to a length in the circumferential direction of the recessed part 303.

Note that the dynamic pressure surface 335 is a planar or a substantial planar surface as described above, but is not limited thereto. The dynamic pressure surface 335 may be a curved surface, and may not have to expand into the rectangular shape. For example, the dynamic pressure surface 335 may be formed in a trapezoidal shape widening or narrowing toward the side surface 302 side. In addition, the dynamic pressure surface 335 is connected to the introduction surface 334 through a stepped surface 336 forming a step depressed toward the side surface 307 side in the direction of the axis x. Note that the recessed part 303 may not have to include the stepped surface 336 so that the dynamic pressure surface 335 is directly connected to the introduction surface 334.

As described above, the two dynamic pressure surfaces 335 are formed in the recessed part 303, and are formed to be symmetrical in the circumferential direction about the introduction surface 334 in the bottom surface 333. That is, one of the dynamic pressure surfaces 335 extends from one end in the circumferential direction of the introduction surface 334 to the side surface 302 in the one direction of the circumferential direction. Another dynamic pressure surface 335 extends from another end in the circumferential direction of the introduction surface 334 to the side surface 302 in the other direction of the circumferential direction. The dynamic pressure part 331 is formed to be positioned not to appear on the outer periphery side from the side surface which the dynamic pressure part 331 contacts, of the groove in the shaft, in the usage state described later.

As illustrated in FIGS. 26 and 27, in the introduction part 332 of the recessed part 303, a substantially U shape recess is formed in the inner peripheral surface 305, the recess opening toward the side surface 307 side, and the introduction part 332 is connected to the dynamic pressure part 331 between the end portions (end portions 303a) in the circumferential direction of the dynamic pressure part 331. Specifically, the introduction part 332 includes a bottom surface 337 that is connected to the introduction surface 334 and the stepped surfaces 336 of the dynamic pressure part 331, and is continued to the introduction surface 334. The bottom surface 337 is smoothly connected to the introduction surface 334 of the dynamic pressure part 331, and the bottom surface 337 is, for example, a surface that is positioned at the same height as the introduction surface 334. In the seal ring 301, a passage communicating from the inner peripheral surface 305 to the dynamic pressure part 331 is formed by the introduction part 332.

As described later, in the usage state in which the side surface 302 of the seal ring 301 contacts the side surface of the groove in the shaft, the recessed part 303 communicates with a space which the inner peripheral surface 305 contacts. More specifically, the dynamic pressure part 331 communicates, through the introduction part 332, with the space which the inner peripheral surface 305 contacts. In the usage state, the dynamic pressure part 331 forms a space extending in the circumferential direction between the dynamic pressure part 331 and the side surface of the groove in the shaft, and the dynamic pressure surface 335 forms a space in which a height (a width in the height direction) is gradually decreased from the introduction surface 334 side toward the side surface 302 side, the space extending in the circumferential direction between the dynamic pressure surface 335 and the side surface of the groove in the shaft.

As described above, the plurality of inner peripheral wall parts 304 are formed corresponding to the plurality of recessed parts 303, respectively. Specifically, as illustrated in FIGS. 26 and 27, in each of the recessed parts 303, the two inner peripheral wall parts 304 are formed more on the inner peripheral surface 305 side than the dynamic pressure surfaces 335 of the dynamic pressure part 331.

The inner peripheral wall part 304 is a portion defined by a portion in the circumferential direction in which one dynamic pressure surface 335 of the dynamic pressure part 331 extends, the introduction part 332, and the inner peripheral surface 305. The inner peripheral wall part 304 includes the inner peripheral wall surface 3421 that is a stepped surface adjacent to the dynamic pressure surface 335 of the dynamic pressure part 331 on the inner periphery side, and extending from the side surface 302 toward the introduction part 332 in the circumferential direction in a stepwise manner to be gradually depressed by a predetermined depth such that the inner peripheral wall part 304 is lower than the side surface 302 but higher than the dynamic pressure surface 335. The inner peripheral wall part 304 includes the inner peripheral wall surface 3421, and a vertical surface 3412 that is a surface vertical to the side surface 302 and extending along the axis x from the end portion of the inner peripheral wall surface 3421 on the introduction part 332 side toward the inner side of the side surface 302.

The inner peripheral wall surface 3421 of the inner peripheral wall part 304 faces toward the side toward which the side surface 302 faces, and extends within the same range as or the substantially same range as the dynamic pressure surface 335 in the circumferential direction. Specifically, the inner peripheral wall surface 3421 extends, in the circumferential direction, from the same position as the stepped surface 336 of the dynamic pressure part 331 up to the same position as the end portion 303a of the dynamic pressure part 331 or from the same position as the stepped surface 336 of the dynamic pressure part 331 up to the vicinity of the end portion 303a of the dynamic pressure part 331, while having steps in a stepwise manner.

As illustrated in FIGS. 26 and 29, the inner peripheral wall surface 3421 extends from the side surface 302 to be parallel to the side surface 302, while providing steps in the stepwise manner in the circumferential direction, and is connected to the introduction part 332 through the vertical surface 3412.

Incidentally, the inner peripheral wall surface 3421 is formed in a plane or a substantial plane, and extends into a rectangular shape or a substantially rectangular shape in a plan view, but is not limited thereto. The inner peripheral wall surface 3421 may be a curved surface in a plan view, and may not have to expand into the rectangular shape in a plan view. For example, the inner peripheral wall surface 3421 may be formed in a trapezoidal shape in a plan view widening or narrowing toward the side surface 302 side.

Although the inner peripheral wall surface 3421 is formed in a stepwise manner including four steps, the number of steps is not limited to this. As illustrated in FIG. 30A, the number of steps may be any number including three or five or more if the number of steps is at least two or more. Moreover, as illustrated in FIG. 30B, in the inner peripheral wall surface 3421, lengths L1 to L4 extending toward the introduction part 332 in the circumferential direction are not equal to one another, and may be sequentially increased or may be sequentially decreased. Furthermore, in the inner peripheral wall surface 3421, the heights of the steps in a stepwise manner may be not only equal to one another, but also different in each step.

As described above, the two inner peripheral wall parts 304 are formed in each of the recessed parts 303, and are formed to be symmetrical about the introduction part 332 in the circumferential direction. That is, one of the inner peripheral wall parts 304 extends from one end in the circumferential direction of the introduction part 332 to the side surface 302 in one direction of the circumferential direction. Another inner peripheral wall part 304 extends from another end in the circumferential direction of the introduction part 332 to the side surface 302 in the other direction of the circumferential direction.

As described later, in the usage state in which the side surface 302 of the seal ring 301 contacts the side surface of the groove in the shaft, the inner peripheral wall surface 3421 of the inner peripheral wall part 304 faces the side surface of the groove in the shaft. The inner peripheral wall surface 3421 is parallel to the side surface 302 and in a stepwise manner. Therefore, the inner peripheral wall surface 3421 does not contact the side surface of the groove and therefore forms a stepwise space between the inner peripheral wall surface 3421 and the side surface of the groove, the stepwise space being continuously formed of a plurality of spaces having rectangular cross sections different in size. This space has a shape in which the height is gradually decreased from the introduction part 332 side toward the side surface 302 side.

The seal ring 301 is formed of a resin material such as polyether ether ketone (PEEK), polyphenylene sulfide (PPS), and polytetrafluoroethylene (PTFE). A circumferential length of the outer peripheral surface 306 of the seal ring 301 is shorter than the circumferential length of the inner peripheral surface of the shaft hole into which the shaft is inserted, not to have an interference with respect to the shaft hole. Therefore, in a state in which the fluid pressure does not act on the seal ring 301 in the usage state, the outer peripheral surface 306 of the seal ring 301 is separated from the inner peripheral surface of the shaft hole.

The seal ring 301 is not endless, and as illustrated in FIGS. 23 to 25, the seal ring 301 includes an abutment joint 308 at one portion in the circumferential direction of the seal ring 301. The abutment joint 308 has a well-known structure capable of maintaining a stable sealing performance even when the circumferential length of the seal ring 301 varies due to thermal expansion or thermal contraction of the seal ring 301. Examples of the structure of the abutment joint 308 include a so-called special step cut structure in which the abutment joint 308 is cut off in a stepwise manner when seen from any of the side of the outer peripheral surface 306 and the sides of the both side surfaces 302 and 307, a straight cut structure, a bias cut structure, and a step cut structure. When a material (such as PTFE) having low elasticity is employed as the material of the seal ring 301, the seal ring 301 may be endless without having the abutment joint 308.

Next, action of the seal ring 301 having the above-described configuration will be described.

Figure 31:
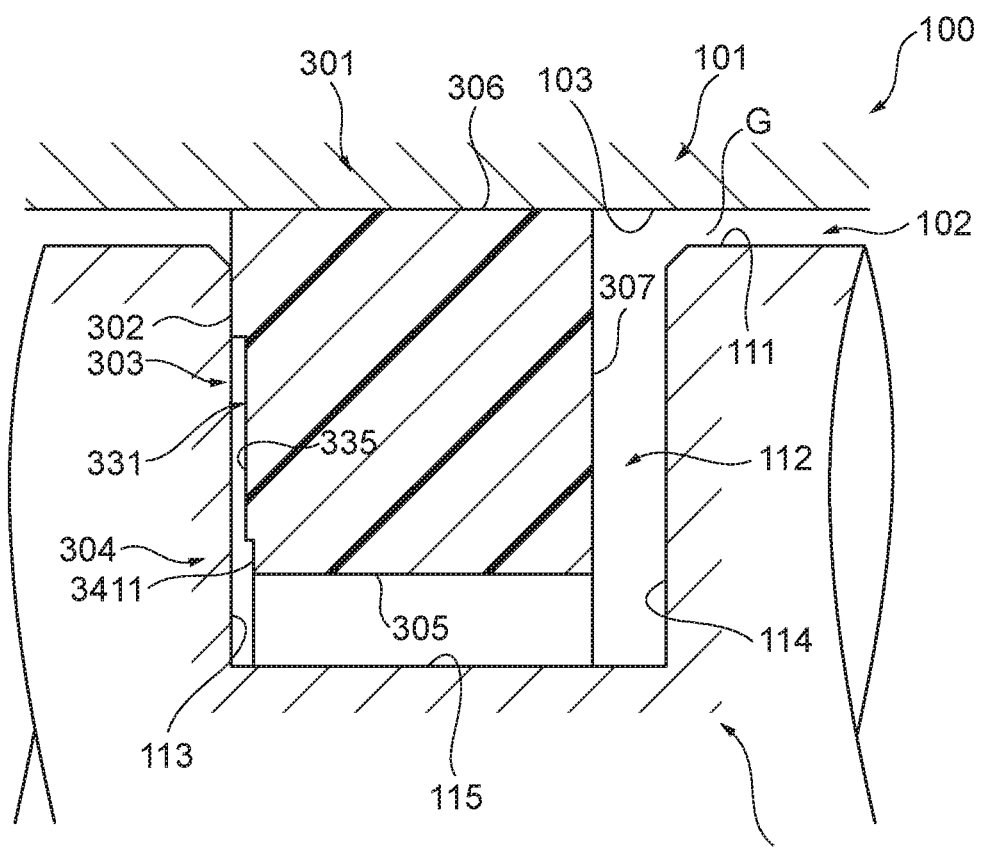
FIG. 31 is a partially enlarged cross-sectional view of the seal ring according to the fifth embodiment of the present disclosure in a usage state in which the seal ring is attached to a housing of and a shaft inserted into a shaft hole that is a through-hole formed at the housing in a hydraulic apparatus as an attachment target.

FIG. 31 is a partially enlarged cross-sectional view of the seal ring 301 in a usage state in which the seal ring 301 is attached to a housing 101 and a shaft 110 inserted into a shaft hole 102 that is a through-hole formed at the housing 101 in a hydraulic apparatus 100 as an attachment target. The shaft 110 is relatively rotatable with respect to the housing 101, and an annular groove 112 recessed toward a center side is formed in an outer peripheral surface 111 of the shaft 110. The groove 112 has a cross section formed in a rectangular shape or a substantially rectangular shape, and is defined by side surfaces 113 and 114 having a planar shape and a bottom surface 115.

In the hydraulic apparatus 100, an annular space is formed between an inner peripheral surface 103 of the shaft hole 102 and an outer peripheral surface 111 of the shaft 110, and a hydraulic channel in which operation oil (not illustrated) is to be filled is formed in the shaft 110 and the housing 101. The seal ring 301 is attached to the groove 112, and seals a gap G between the shaft 110 and the shaft hole 102 to prevent loss of hydraulic pressure of the operation oil in the hydraulic channel.

In FIG. 31, a part of the groove 112 on the right side forms the hydraulic channel, and a side surface 113 on the left side of the groove 112 serves as a sliding side surface against which the seal ring 301 is pressed, whereby pressure on the right side of the groove 112 becomes high and pressure on the left side of the groove 112 becomes low. The seal ring 301 is attached to the groove 112 such that the side surface 302 faces the sliding side surface 113 of the groove 112.

When the operation oil is introduced into the hydraulic channel, the pressure in the hydraulic channel becomes high, whereby the outer peripheral surface 306 and the side surface 302 of the seal ring 301 are pressed against the inner peripheral surface 103 of the shaft hole 102 and the sliding side surface 113 of the groove 112, respectively. Thus, in the annular gap G, the hydraulic channel is sealed, to thereby maintain the hydraulic pressure. When the shaft 110 rotates, the shaft 110 rotates with respect to the seal ring 301, and the sliding side surface 113 of the groove 112 slides with respect to the side surface 302 of the seal ring 301. At this time, the operation oil intrudes into the recessed part 303 from the introduction part 332 of the seal ring 301, and is introduced to the dynamic pressure part 331, and the hydraulic pressure of the operation oil causes the operation oil to move to the end portion 303a in the circumferential direction along the dynamic pressure surface 335 in the dynamic pressure part 331. While the side surface 302 of the seal ring 301 contacts the sliding side surface 113 of the groove 112, the pressure on the end portion 303a side of the dynamic pressure part 331 is increased by this movement of the operation oil in the dynamic pressure part 331, and finally the pressure of the operation oil on the end portion 303a side is increased until the side surface 302 of the seal ring 301 is separated from the sliding side surface 113, resulting that the operation oil leaks out to the side surface 302 from the end portion 303a of the dynamic pressure part 331. This causes a thin lubricating film of the operation oil to be formed between the side surface 302 of the seal ring 301 and the sliding side surface 113 of the groove 112, thereby reducing a sliding resistance of the groove 112 with respect to the seal ring 301. Thus, in the usage state, the recessed part 303 uses the dynamic pressure effect to reduce the sliding resistance of the groove 112 with respect to the seal ring 301.

The inner peripheral wall surface 3421 of the inner peripheral wall part 304 is provided parallel to and evenly with the side surface 302 in a stepwise manner to be gradually recessed from the side surface 302, and a stepwise space is formed between the inner peripheral wall surface 3421 and the sliding side surface 113 of the groove 112. Therefore, the inner peripheral wall surface 3421 can obtain the dynamic pressure effect by the operation oil similar to the above-described dynamic pressure effect of the recessed part 303, and the sliding resistance of the groove 112 with respect to the seal ring 301 can be also reduced by the inner peripheral wall surface 3421.

Since the inner peripheral wall surface 3421 is parallel to the side surface 302 and is gradually recessed from the side surface 302 so that the height of the inner peripheral wall surface 3421 varies, the operation oil in the recessed part 303 can be easily released from the introduction part 332, thereby providing a high cooling effect. Furthermore, since the inner peripheral wall surface 3421 is parallel to the side surface 302 and is gradually recessed from the side surface 302 through the vertical surface 3412, an abrasion amount is smaller than that when the inner peripheral wall surface 3421 has a flat shape even when the side surface 302 of the seal ring 301 is abraded, whereby the reduction in dynamic pressure effect can be suppressed.

The contact area of the seal ring 301 with respect to the sliding side surface 113 of the groove 112 can be reduced by the stepwise space that is formed between the inner peripheral wall surface 3421 and the sliding side surface 113 of the groove 112, whereby the sliding resistance of the groove 112 with respect to the seal ring 301 can be also reduced.

The seal ring 301 can reduce the sliding resistance of the groove 112 with respect to the seal ring 301 as described above. Therefore, the heat generated in the sliding portion in use can be suppressed, and the seal ring 301 can be used under a higher P (pressure) and V (velocity) condition, the PV condition being used as an index for confirming the durability. In addition, the seal ring 301 can be also used for the shaft 110 which is soft.

As described above, according to the seal ring 301 according to the fifth embodiment of the present disclosure, the sliding resistance can be further reduced.

Figure 32:
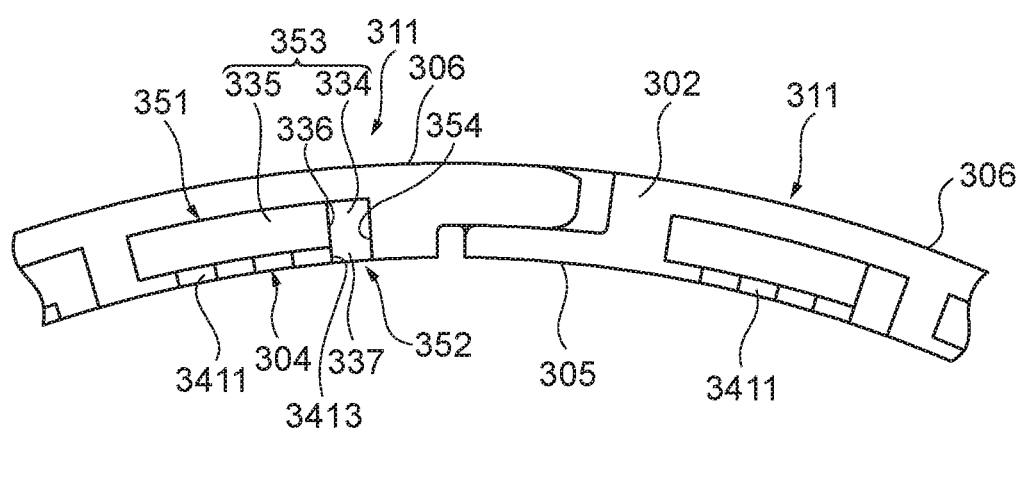
FIG. 32 is a partially enlarged side view enlargedly illustrating a portion of a side surface on one side of a seal ring according to a sixth embodiment of the present disclosure, the view illustrating a schematic configuration of the seal ring.
Figure 33:
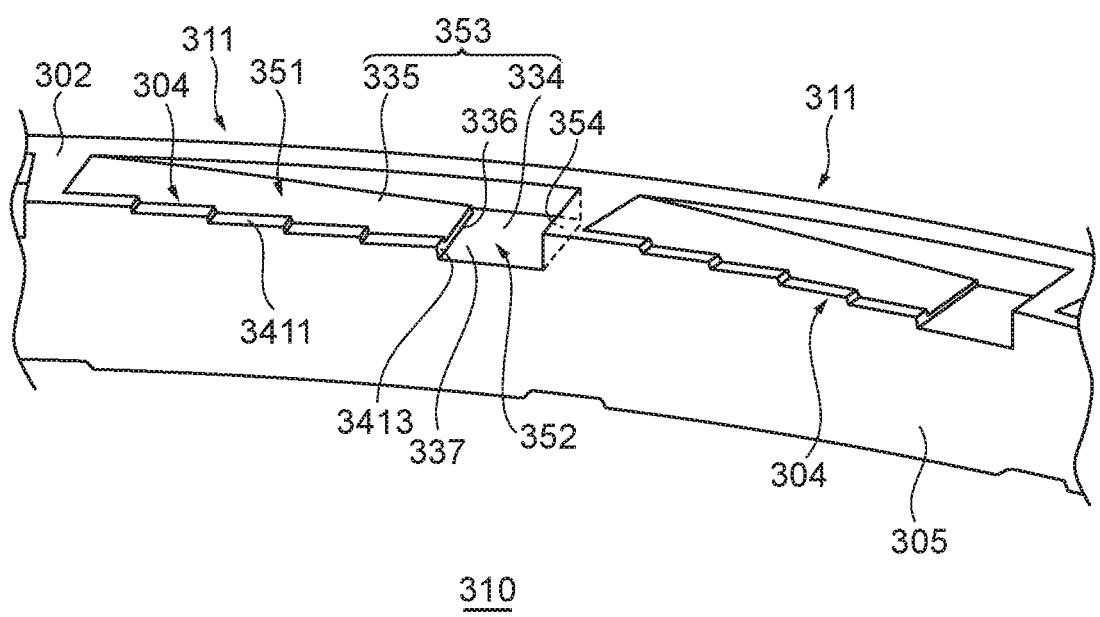
FIG. 33 is a partially enlarged perspective view illustrating a schematic configuration of the seal ring according to the sixth embodiment of the present disclosure.

Next, a seal ring 310 according to a sixth embodiment of the present disclosure will be described. FIG. 32 is a partially enlarged side view enlargedly illustrating a portion of a side surface on one side of the seal ring 310, the view illustrating a schematic configuration of the seal ring 310. FIG. 33 is a partially enlarged perspective view illustrating a schematic configuration of the seal ring 310. The seal ring 310 according to the sixth embodiment of the present disclosure is different from the above-described seal ring 301 according to the fifth embodiment of the present disclosure in configurations of the recessed part and the inner peripheral wall part. Hereinafter, components of the seal ring 310 according to the sixth embodiment of the present disclosure that have functions the same as or similar to those of the seal ring 301 according to the fifth embodiment of the present disclosure will be denoted by the same reference characters, the description thereof will be omitted, and different configurations will be described.

The seal ring 310 includes a recessed part 311 different from the recessed part 303 of the seal ring 301. As illustrated in FIGS. 32 and 33, the recessed part 311 includes a dynamic pressure part 351 and an introduction part 352, and the dynamic pressure part 351 includes only one dynamic pressure surface 335. Hereinafter, the description will be specifically made.

The dynamic pressure part 351 of the recessed part 311 is separated in the radial direction from the outer peripheral surface 306 and the inner peripheral surface 305, and extends in the circumferential direction to have an arc shape or a substantially arc shape centered or substantially centered about the axis x. The dynamic pressure part 351 is provided on the inner peripheral surface 305 side in the radial direction. Specifically, the dynamic pressure part 351 includes a bottom surface 353 that is a surface facing toward a side toward which the side surface 302 faces. The bottom surface 353 includes an introduction surface 334 connected to the introduction part 352, and one dynamic pressure surface 335 extending between the introduction surface 334 and the side surface 302.

The dynamic pressure surface 335 is connected to the introduction surface 334 through a stepped surface 336. In addition, the dynamic pressure part 351 includes an end surface 354 that is a planar or a substantial planar surface extending along the axis x, on the opposite side of the dynamic pressure surface 335 in the circumferential direction with respect to the introduction surface 334. The end surface 354 extends up to the side surface 302 from an end portion on the opposite side in the circumferential direction of the end portion connected to the dynamic pressure surface 335 of the introduction surface 334. The dynamic pressure part 351 is formed to be positioned such that the dynamic pressure part 351 does not appear on the outer periphery side from the sliding side surface 113 of the groove 112 in the shaft 110 which the dynamic pressure part 351 contacts in the usage state.

As illustrated in FIGS. 32 and 33, the introduction part 352 of the recessed part 311 forms a substantially U shape recess in the inner peripheral surface 305, the recess opening toward the side surface 302 side, and the introduction part 352 is connected to the dynamic pressure part 351 at one end portion in the circumferential direction of the dynamic pressure part 351. Specifically, the introduction part 352 is connected to the introduction surface 334 of the dynamic pressure part 351, the stepped surface 336, and the end surface 354, and includes a bottom surface 337 continued to the introduction surface 334. In the seal ring 310, by the introduction part 352, a passage communicating from the inner peripheral surface 305 to the dynamic pressure part 351 is formed. Thus, the recessed part 311 of the seal ring 310 is formed in an L-shape.

The seal ring 310 includes, for each of the recessed parts 311, only one inner peripheral wall part 304 having the inner peripheral wall surface 3421 formed therein. As illustrated in FIGS. 32 and 33, the inner peripheral wall part 304 is not formed on the end surface 354 side in the circumferential direction with respect to the introduction part 352, and the inner peripheral wall part 304 is formed only on the dynamic pressure surface 335 side in the circumferential direction with respect to the introduction part 352.

Similar to the above-described seal ring 301, also in the seal ring 310 according to the sixth embodiment, a space having a wedge shape is also formed between the sliding side surface 113 of the groove 112 in the shaft 110 and the dynamic pressure surface 335 in the usage state. The height of this space having a wedge shape is gradually decreased from the introduction surface 334 side toward the side surface 302 side. Therefore, the seal ring 310 can provide effects similar to those provided by the above-described seal ring 301.

In the seal ring 301, the two dynamic pressure surfaces 335 are provided, and the dynamic pressure surfaces 335 are provided in both directions of the circumferential direction with respect to the introduction surface 334 (the introduction part 332), respectively. Therefore, the seal ring 301 can provide the above-described effects for rotations in both rotation directions of the shaft 110. On the other hand, in the seal ring 310, the one dynamic pressure surface 335 is provided, and the dynamic pressure surface 335 is provided in one direction of the circumferential direction with respect to the introduction surface 334 (the introduction part 352). Therefore, the seal ring 310 can provide the above-described effects for rotation in one rotation direction of the shaft 110.

Since the inner peripheral wall surface 3421 of the inner peripheral wall part 304 forms the stepwise space between the inner peripheral wall surface 3421 of the inner peripheral wall part 304 and the sliding side surface 113 of the groove 112, the inner peripheral wall surface 3421 can obtain the dynamic pressure effect by the operation oil similar to the above-described dynamic pressure effect of the recessed part 303, and the sliding resistance of the groove 112 with respect to the seal ring 301 can be reduced also by the inner peripheral wall surface 3421. In addition, the inner peripheral wall surface 3421 is gradually recessed from the side surface 302 to be parallel to the side surface 302, a pressure receiving area of the side surface 302 is reduced when the hydraulic pressure is generated, and the operation oil in the recessed part 303 can be easily released, thereby providing a high cooling effect. Furthermore, since the inner peripheral wall surface 3421 is gradually recessed from the side surface 302 to be parallel to the side surface 302, the reduction in dynamic pressure effect can be suppressed even when the side surface 302 of the seal ring 301 is abraded.

The contact area of the seal ring 301 with respect to the sliding side surface 113 of the groove 112 can be reduced by the stepwise space that is formed between the inner peripheral wall surface 3421 and the sliding side surface 113 of the groove 112, also by this, the sliding resistance of the groove 112 with respect to the seal ring 301 can be reduced.

Figure 34:
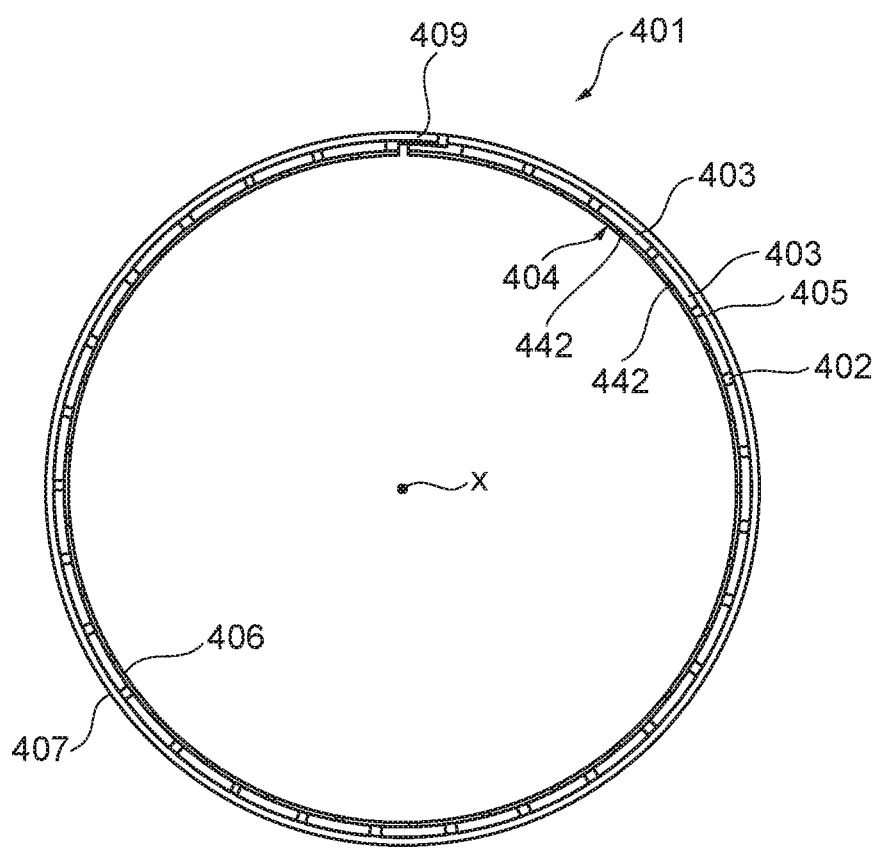
FIG. 34 is a side view on one side illustrating a schematic configuration of a seal ring according to a seventh embodiment of the present disclosure.
Figure 35:
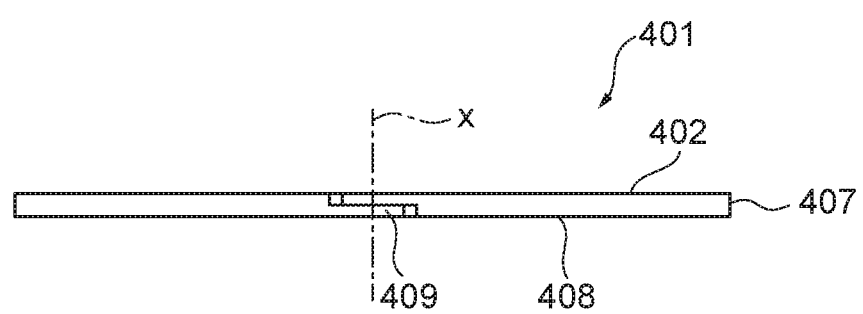
FIG. 35 is a front view illustrating a schematic configuration of the seal ring according to the seventh embodiment of the present disclosure.
Figure 36:
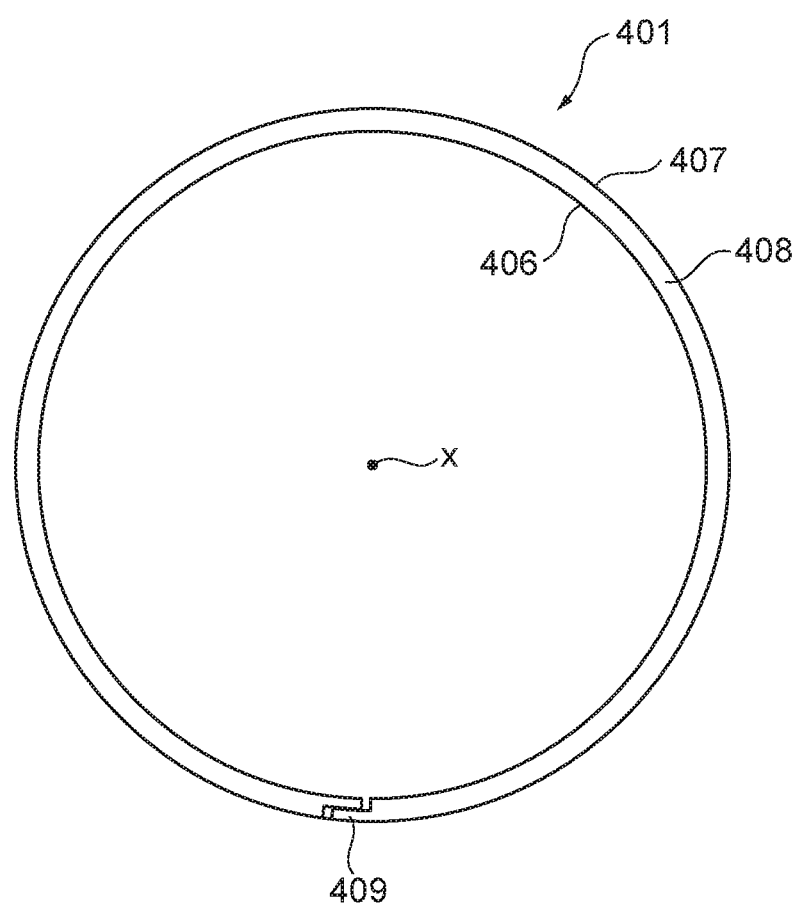
FIG. 36 is a side view on another side illustrating a schematic configuration of the seal ring according to the seventh embodiment of the present disclosure.
Figure 37:
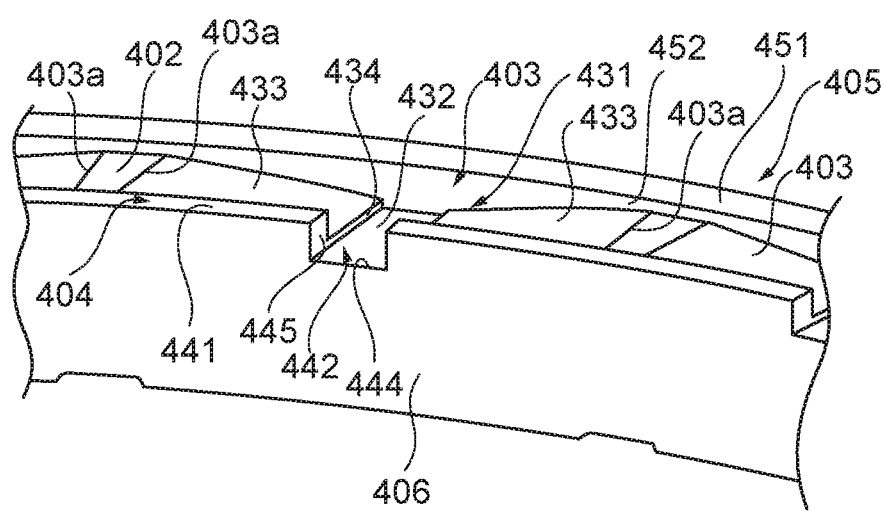
FIG. 37 is a partially enlarged perspective view illustrating a schematic configuration of the seal ring according to the seventh embodiment of the present disclosure.

Next, a seal ring 401 according to a seventh embodiment of the present disclosure will be described. FIG. 34 is a side view on one side illustrating a schematic configuration of the seal ring 401 according to the seventh embodiment of the present disclosure, FIG. 35 is a front view illustrating a schematic configuration of the seal ring 401, and FIG. 36 is a side view on another side illustrating a schematic configuration of the seal ring 401. In addition, FIG. 37 is a partially enlarged perspective view illustrating a schematic configuration of the seal ring 401.

The seal ring 401 according to the present embodiment is a sealing apparatus for sealing an annular gap between a shaft and a shaft hole into which the shaft is inserted, and in a vehicle or a general-purpose machine, the seal ring 401 is used for sealing between a shaft and a shaft hole into which the shaft is inserted, the shaft hole being formed in a housing or the like, the shaft and the housing or the like rotating relatively to each other. The seal ring 401 that is attached to a groove formed in an outer peripheral surface of a shaft to maintain a hydraulic pressure of an operation oil is used in, for example, an automatic transmission or a continuously variable transmission. Note that targets to which the seal ring 401 according to the embodiment of the present disclosure is applied are not limited to the above.

As illustrated in FIG. 34, the seal ring 401 has an annular shape around an axis x and includes a side surface 402 that is a surface facing in a direction of the axis x, a plurality of dynamic pressure parts 403 that are formed on the side surface 402 such that the plurality of recessed parts 403 are separated from one another in a circumferential direction of the side surface 402, an inner peripheral wall part 404 formed on an inner periphery side of the side surface 402, and an outer peripheral wall part 405 that is formed on an outer periphery side of the side surface 402. The inner peripheral wall part 404 is an annular portion that protrudes from the side surface 402 to a side toward which the side surface 402 faces (hereinafter, also referred to as a sliding surface side), and the outer peripheral wall part 405 is an annular portion that protrudes from the side surface 402 to the side toward which the side surface 402 faces. The dynamic pressure part 403 is a recessed part that extends in the circumferential direction to converge on the side surface 402. The inner peripheral wall part 404 includes an inner peripheral wall surface 441 that is a surface facing in the direction of the axis x, and an introduction part 442 that is a recessed part formed in the inner peripheral wall surface 441 and extending between the outer periphery side and the inner periphery side to open the dynamic pressure part 403 toward the inner periphery side. The outer peripheral wall part 405 includes an outer peripheral wall surface 451 that is a surface facing in the direction of the axis x.

As illustrated in FIGS. 34 to 36, in the seal ring 401, a cross-sectional shape in a surface along the axis x is a rectangular shape or a substantially rectangular shape. The seal ring 401 includes an inner peripheral surface 406 that is a surface facing toward the inner periphery side, an outer peripheral surface 407 facing toward the outer periphery side, a surface on a sliding surface side, and a side surface 408 that is another side surface. The inner peripheral surface 406 is, for example, a cylindrical surface or a substantially cylindrical surface centered or substantially centered about the axis x. The outer peripheral surface 407 is a surface facing away from the inner peripheral surface 406, and is, for example, a cylindrical surface or a substantially cylindrical surface centered or substantially centered about the axis x. The side surface 402 is an annular surface along a plane or a substantial plane perpendicular or substantially perpendicular to the axis x, and expands between the inner peripheral surface 406 and the outer peripheral surface 407. The side surface 408 is a surface facing away from the surface on the sliding surface side, is an annular surface along a plane or a substantial plane perpendicular or substantially perpendicular to the axis x, and expands between the inner peripheral surface 406 and the outer peripheral surface 407.

Figure 38:
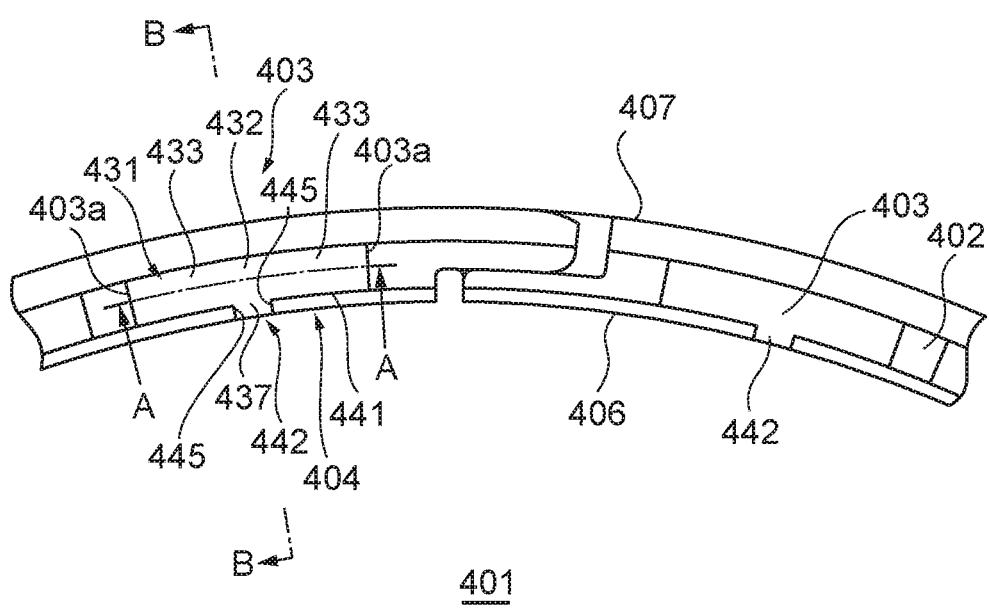
FIG. 38 is a partially enlarged view of the seal ring illustrated in FIG. 34.

As described above, the plurality of dynamic pressure parts 403 are formed on the side surface 402. The dynamic pressure parts 403 are formed at equal angular intervals or substantially equal angular intervals around the axis x. As illustrated in FIGS. 37 and 38, the dynamic pressure part 403 is a recessed part recessed from the side surface 402 toward the side surface 408 side, has a width the same as that of the side surface 402 in the radial direction, and the dynamic pressure part 403 is formed such that the dynamic pressure part 403 does not appear on the outer periphery side from the side surface of the groove in the shaft in the usage state. The width in the radial direction of the dynamic pressure part 403 may be smaller than the width in the radial direction of the side surface 402.

Specifically, as illustrated in FIGS. 37 and 38, the dynamic pressure part 403 is separated in the radial direction from the outer peripheral surface 407 and the inner peripheral surface 406, and extends in the circumferential direction to have an arc shape or a substantially arc shape centered or substantially centered about the axis x. The dynamic pressure part 403 is provided on the inner peripheral surface 406 side in the radial direction. Specifically, the dynamic pressure part 403 includes a bottom surface 431 that is a surface facing toward a side toward which the side surface 402 faces. The bottom surface 431 includes an introduction surface 432 connected to the introduction part 442, and one or two dynamic pressure surfaces 433 each extending between the introduction surface 432 and the side surface 402. In the seal ring 401 according to the present embodiment, the bottom surface 431 includes two dynamic pressure surfaces 433.

Figure 39:
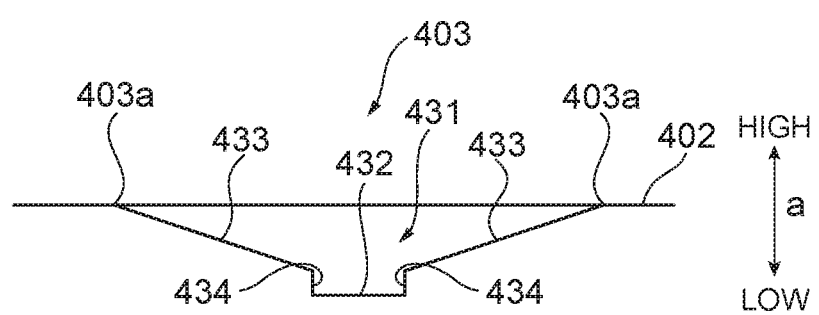
FIG. 39 is a partially enlarged cross-sectional view of a cross-section taken along line A-A in FIG. 38.

As illustrated in FIGS. 37 and 38, the introduction surface 432 is positioned on the lowest side in the dynamic pressure part 403, is formed in a plane or a substantial plane, and expands into a rectangular shape or a substantially rectangular shape. Note that in the dynamic pressure part 403, the direction of the axis x is also referred to as a height direction. In the height direction (a direction of an arrow a in FIGS. 39 and 40), an inner side of the seal ring 401 is assumed as a lower side, and the side surface 402 side is assumed as a higher side. The introduction surface 432 may be formed in a curved surface, and may not have to expand into the rectangular shape. In addition, the dynamic pressure surface 433 is inclined with respect to the side surface 402 upwardly from the introduction surface 432 and extends toward the side surface 402 in the circumferential direction. The dynamic pressure surface 433 is formed in a plane or a substantial plane and extends into a rectangular shape or a substantially rectangular shape. The dynamic pressure surface 433 extends between the introduction surface 432 and the side surface 402, and is smoothly connected to the side surface 402. The dynamic pressure surface 433 may be formed in a curved surface, and may not have to expand into the rectangular shape. For example, the dynamic pressure surface 433 may be formed in a trapezoidal shape widening or narrowing toward the side surface 402 side. In addition, the dynamic pressure surface 433 is connected to the introduction surface 432 through a stepped surface 434 forming a step depressed toward the side surface 408 side in the direction of the axis x. The dynamic pressure part 403 may not have to include the stepped surface 434 so that the dynamic pressure surface 433 is directly connected to the introduction surface 432.

As described above, the two dynamic pressure surfaces 433 are formed in the dynamic pressure part 403, and are formed to be symmetrical in the circumferential direction about the introduction surface 432 in the bottom surface 431. That is, one of the dynamic pressure surfaces 433 extends from one end in the circumferential direction of the introduction surface 432 to the side surface 402 in the one direction of the circumferential direction. Another dynamic pressure surface 433 extends from another end in the circumferential direction of the introduction surface 432 to the side surface 402 in the other direction of the circumferential direction. The dynamic pressure part 403 or the side surface 402 is formed to be positioned not to appear on the outer periphery side from the side surface which the dynamic pressure part 403 or the side surface 402 contacts, of the groove in the shaft, in the usage state described later.

Figure 40:
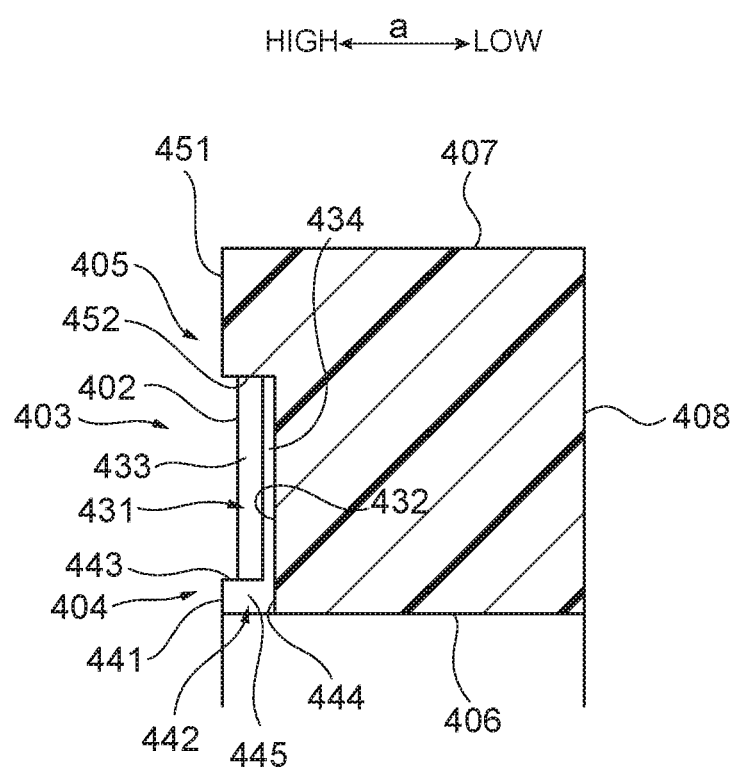
FIG. 40 is a cross-sectional view of a cross-section taken along line B-B in FIG. 38.

As described above, the annular inner peripheral wall part 404 protruding to the sliding surface side is formed on the inner periphery side of the side surface 402. Specifically, as illustrated in FIGS. 38 and 40, the inner peripheral wall part 404 is defined by a portion on the sliding surface side of the inner peripheral surface 406, the inner peripheral wall surface 441, and an outer peripheral surface 443 that is an annular surface extending from an edge on the inner periphery side of the side surface 402 up to the inner peripheral wall surface 441 on the sliding surface side. The inner peripheral wall surface 441 is a planar or a substantial planar surface extending along a plane perpendicular to the axis x. The inner peripheral wall surface 441 is positioned at a position where the inner peripheral wall surface 441 contacts the side surface of the groove in the shaft in the usage state of the seal ring 401 described later. Note that the inner peripheral wall surface 441 may be formed in a curved surface, but in this case, it is preferable that the inner peripheral wall surface 441 is formed such that the inner peripheral wall surface 441 annually contacts a planar surface (over the entire circumference).

As described above, the introduction part 442 is formed in the inner peripheral wall part 404, the introduction part 442 extending in the radial direction to communicate with the dynamic pressure part 403 through the inner peripheral wall part 404. As illustrated in FIGS. 37 and 38, the introduction part 442 divides the inner peripheral wall surface 441 and is opened toward the sliding surface side. One introduction part 442 is provided corresponding to each of the dynamic pressure parts 403, and the introduction part 442 is connected to the dynamic pressure part 403 between the end portions (end portions 403*a*) in the circumferential direction of the dynamic pressure part 403. Specifically, as illustrated in FIGS. 38 and 40, the introduction part 442 is defined by a bottom surface 444 and a pair of end surfaces 445 facing each other, the bottom surface 444 is connected to the introduction surface 432 of the dynamic pressure part 403, and the end surface 445 is connected to the stepped surface 434 of the dynamic pressure part 403. The bottom surface 444 is smoothly connected to the introduction surface 432, and is, for example, flush with the introduction surface 432. The end surface 445 is smoothly connected to the stepped surface 434, and is, for example, flush with the introduction surface 432. In the seal ring 401, a passage communicating from the inner peripheral surface 406 to the dynamic pressure part 403 is formed by the introduction part 442. As illustrated in FIG. 38, the recessed part formed by the dynamic pressure part 403 and the introduction part 442 is formed in a T shape as viewed from the sliding surface side. Note that when the dynamic pressure part 403 is not formed over the full width in the radial direction of the side surface 402, the introduction surface 432 and the stepped surface 434 of the dynamic pressure part 403 extend up to the introduction part 442 beyond the side surface 402.

As described above, the annular outer peripheral wall part 405 protruding to the sliding surface side is formed on the outer periphery side of the side surface 402. Specifically, as illustrated in FIGS. 38 and 40, the outer peripheral wall part 405 is defined by a portion on the sliding surface side of the outer peripheral surface 407, the outer peripheral wall surface 451, and an inner peripheral surface 452 that is an annular surface extending from an edge on the outer periphery side of the side surface 402 up to the outer peripheral wall surface 451 on the sliding surface side. The outer peripheral wall surface 451 is a planar or a substantial planar surface extending along a plane perpendicular to the axis x. The outer peripheral wall surface 451 is positioned at a position where the outer peripheral wall surface 451 contacts the side surface of the groove in the shaft in the usage state of the seal ring 401 described later. Specifically, the outer peripheral wall part 405 protrudes to the same height (position) as the inner peripheral wall part 404 in the height direction (a direction of an arrow a in FIG. 40), and the outer peripheral wall surface 451 and the inner peripheral wall surface 441 are positioned on the same plane perpendicular to the direction of the axis x (height direction). In addition, the outer peripheral wall surface 451 is formed at a position in the radial direction where at least a portion on the inner periphery side contacts the side surface of the groove in the shaft in the usage state described later. Note that the outer peripheral wall surface 451 may be formed in a curved surface, but in this case, it is preferable that the outer peripheral wall surface 451 is formed such that the outer peripheral wall surface 451 annually contacts a planar surface.

As described later, in the usage state of the seal ring 401, the outer peripheral wall surface 451 of the outer peripheral wall part 405 and the inner peripheral wall surface 441 of the inner peripheral wall part 404 contact the side surface of the groove in the shaft, and the dynamic pressure part 403 communicates, through the introduction part 442, with a space which the inner peripheral surface 406 contacts. Then, in the usage state, the dynamic pressure part 403 forms a space extending in the circumferential direction between the dynamic pressure part 403 and the side surface of the groove in the shaft, and the dynamic pressure surface 433 forms a space having a wedge shape and extending in the circumferential direction between the dynamic pressure surface 433 and the side surface of the groove in the shaft such that the height (width in the height direction) of the space is gradually decreased from the introduction surface 432 side toward the side surface 402 side.

The seal ring 401 is formed of a resin material such as polyether ether ketone (PEEK), polyphenylene sulfide (PPS), and polytetrafluoroethylene (PTFE). A circumferential length of the outer peripheral surface 407 of the seal ring 401 is shorter than the circumferential length of the inner peripheral surface of the shaft hole into which the shaft is inserted, not to have an interference with respect to the shaft hole. Therefore, in a state in which the fluid pressure does not act on the seal ring 401 in the usage state, the outer peripheral surface 407 of the seal ring 401 is separated from the inner peripheral surface of the shaft hole.

The seal ring 401 is not endless, and as illustrated in FIGS. 34 to 36, the seal ring 401 includes an abutment joint 409 at one portion in the circumferential direction of the seal ring 401. The abutment joint 409 has a well-known structure capable of maintaining a stable sealing performance even when the circumferential length of the seal ring 401 varies due to thermal expansion or thermal contraction of the seal ring 401. Examples of the structure of the abutment joint 409 include a so-called special step cut structure in which the abutment joint 409 is cut off in a stepwise manner when seen from any of the side of the outer peripheral surface 407, the side of the sliding surface, and the side of the side surface 408, a straight cut structure, a bias cut structure, and a step cut structure. When a material (such as PTFE) having low elasticity is employed as the material of the seal ring 401, the seal ring 401 may be endless without having the abutment joint 409.

Next, action of the seal ring 401 having the above-described configuration will be described.

Figure 41:
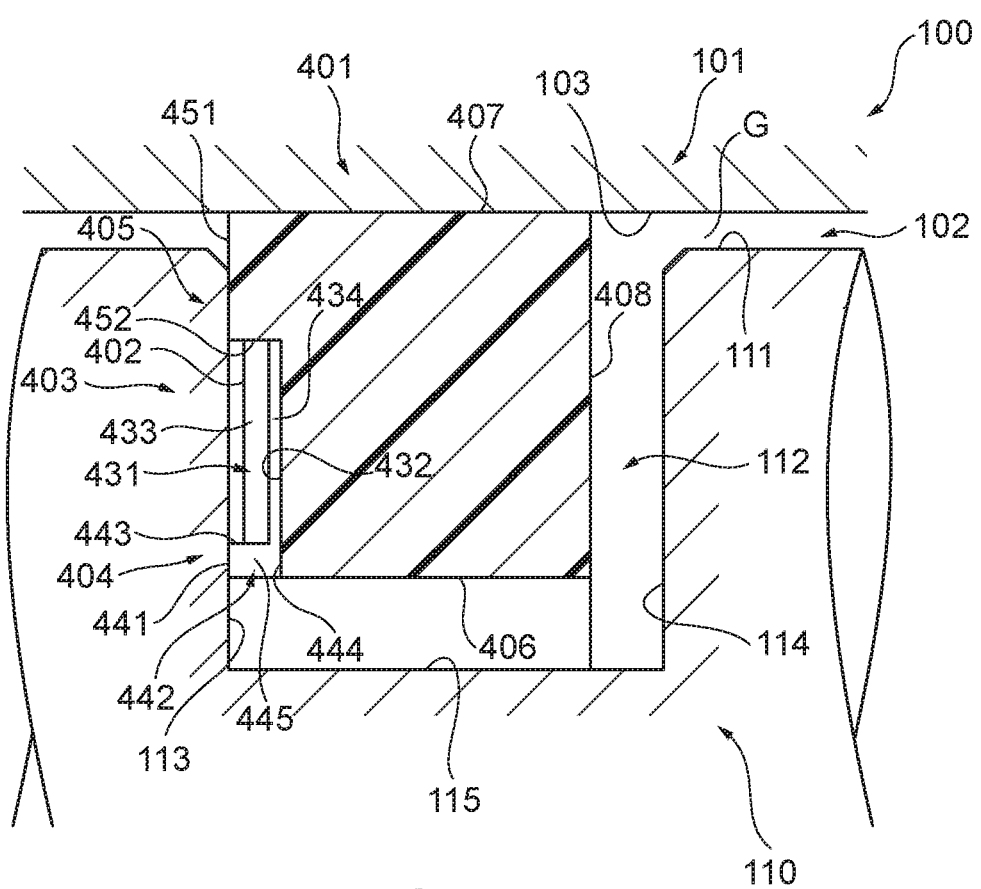
FIG. 41 is a partially enlarged cross-sectional view of the seal ring according to the seventh embodiment of the present disclosure in a usage state in which the seal ring is attached to a housing and a shaft inserted into a shaft hole that is a through-hole formed at the housing in a hydraulic apparatus as an attachment target.

FIG. 41 is a partially enlarged cross-sectional view of the seal ring 401 in a usage state in which the seal ring 401 is attached to a housing 101 and a shaft 110 inserted into a shaft hole 102 that is a through-hole formed at the housing 101 in a hydraulic apparatus 100 as an attachment target. The shaft 110 is relatively rotatable with respect to the housing 101, and an annular groove 112 recessed toward a center side is formed in an outer peripheral surface 111 of the shaft 110. The groove 112 has a cross section formed in a rectangular shape or a substantially rectangular shape, and is defined by side surfaces 113 and 114 having a planar shape and a bottom surface 115. In the hydraulic apparatus 100, an annular space is formed between an inner peripheral surface 103 of the shaft hole 102 and an outer peripheral surface 111 of the shaft 110, and a hydraulic channel in which operation oil (not illustrated) is to be filled is formed in the shaft 110 and the housing 101. The seal ring 401 is attached to the groove 112, and seals a gap G between the shaft 110 and the shaft hole 102 to prevent loss of hydraulic pressure of the operation oil in the hydraulic channel. In FIG. 41, a part of the groove 112 on the right side forms the hydraulic channel, and a side surface 113 on the left side of the groove 112 serves as a sliding side surface against which the seal ring 401 is pressed, whereby pressure on the right side of the groove 112 becomes high and pressure on the left side of the groove 112 becomes low. The seal ring 401 is attached to the groove 112 such that the sliding surface side (the dynamic pressure part 403) faces the sliding side surface 113 of the groove 112.

When the operation oil is introduced into the hydraulic channel, the pressure in the hydraulic channel becomes high, whereby the outer peripheral surface 407, and the outer peripheral wall surface 451 and the inner peripheral wall surface 441 of the seal ring 401 are pressed against the inner peripheral surface 103 of the shaft hole 102 and the sliding side surface 113 of the groove 112, respectively. Thus, in the annular gap G, the hydraulic channel is sealed, to thereby maintain the hydraulic pressure. When the shaft 110 rotates, the shaft 110 rotates with respect to the seal ring 401, and the sliding side surface 113 of the groove 112 slides with respect to the outer peripheral wall surface 451 and the inner peripheral wall surface 441 of the seal ring 401. At this time, the operation oil intrudes into the dynamic pressure part 403 from the introduction part 442 of the seal ring 401, and is introduced to the dynamic pressure part 403, and the hydraulic pressure of the operation oil causes the operation oil to move to the end portion 403a in the circumferential direction along the dynamic pressure surface 433 in the dynamic pressure part 403. Although a minute space is formed between the side surface 402 of the seal ring 401 and the sliding side surface 113 of the groove 112, the minute space is sealed by the outer peripheral wall part 405 and the inner peripheral wall part 404. The pressure on the end portion 403a side of the dynamic pressure part 403 is increased by this movement of the operation oil in the dynamic pressure part 403, and finally the pressure of the operation oil on the end portion 403a side is increased until the outer peripheral wall surface 451 and the inner peripheral wall surface 441 of the seal ring 401 is separated from the sliding side surface 113. This causes a thin lubricating film of the operation oil to be formed between the outer peripheral wall surface 451 and the inner peripheral wall surface 441 of the seal ring 401 and the sliding side surface 113 of the groove 112, thereby reducing a sliding resistance of the groove 112 with respect to the seal ring 401. Thus, in the usage state, the dynamic pressure part 403 uses the dynamic pressure effect to reduce the sliding resistance of the groove 112 with respect to the seal ring 401.

The contact area of the seal ring 401 with respect to the sliding side surface 113 of the groove 112 can be reduced by the space that is formed between the side surface 402 and the sliding side surface 113 of the groove 112, also by this, the sliding resistance of the groove 112 with respect to the seal ring 401 can be also reduced.

The seal ring 401 can reduce the sliding resistance of the groove 112 with respect to the seal ring 401 as described above. Therefore, heat generated in the sliding portion in use can be suppressed, and the seal ring 401 can be used under a higher PV condition. In addition, the seal ring 401 can be also used for the shaft 110 which is soft.

As described above, according to the seal ring 401 according to the seventh embodiment of the present disclosure, the sliding resistance can be further reduced.

Figure 42:
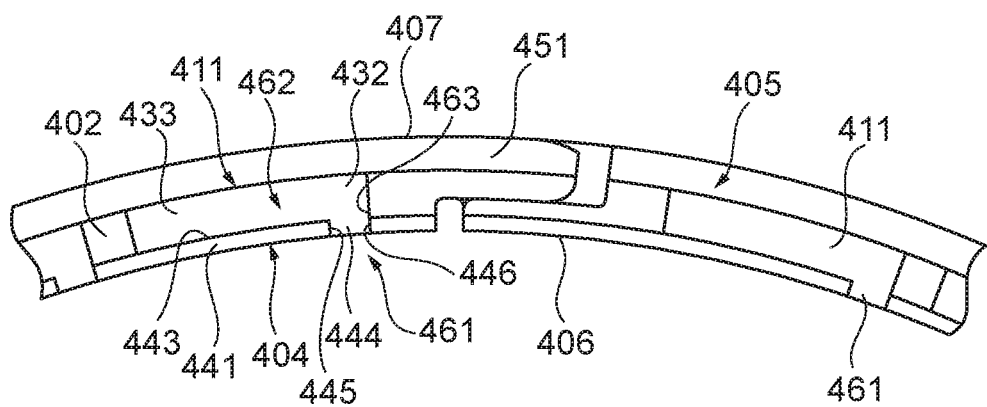
FIG. 42 is a partially enlarged side view enlargedly illustrating a portion of a side surface on one side of a seal ring according to an eighth embodiment of the present disclosure, the view illustrating a schematic configuration of the seal ring.
Figure 43:
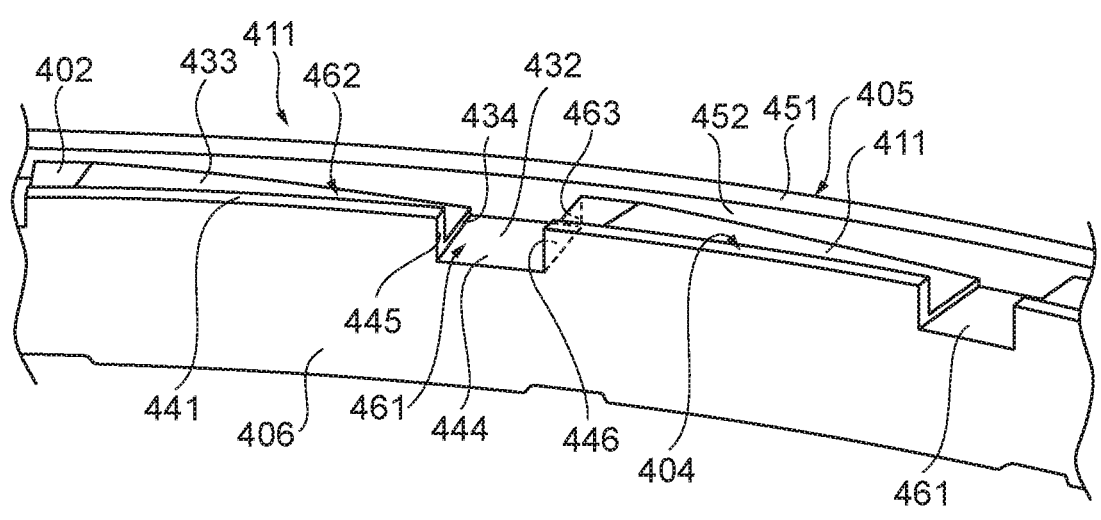
FIG. 43 is a partially enlarged perspective view illustrating a schematic configuration of the seal ring according to the eighth embodiment of the present disclosure.

Next, a seal ring 410 according to an eighth embodiment of the present disclosure will be described. FIG. 42 is a partially enlarged side view enlargedly illustrating a portion of a side surface on one side of the seal ring 410, the view illustrating a schematic configuration of the seal ring 410, and FIG. 43 is a partially enlarged perspective view illustrating a schematic configuration of the seal ring 410. The seal ring 410 according to the eighth embodiment of the present disclosure is different from the above-described seal ring 401 according to the seventh embodiment of the present disclosure in configurations of the dynamic pressure part and the inner peripheral wall part. Hereinafter, components of the seal ring 410 according to the eighth embodiment of the present disclosure that are the same as or have similar functions to those of the seal ring 401 according to the seventh embodiment of the present disclosure will be denoted by the same reference characters, the description thereof will be omitted, and different configurations will be described.

The seal ring 410 includes a dynamic pressure part 411 and an introduction part 461 that are different from the dynamic pressure part 403 and the introduction part 442 of the seal ring 401, respectively. As illustrated in FIGS. 42 and 43, the dynamic pressure part 411 includes a bottom surface 462, and the bottom surface 462 includes only one dynamic pressure surface 433. Hereinafter, the description will be specifically made.

The dynamic pressure parts 411 are formed at equal angular intervals or substantially equal angular intervals around the axis x in the side surface 402, and extend in the circumferential direction to have an arc shape or a substantially arc shape centered or substantially centered about the axis x. Specifically, the dynamic pressure part 411 includes a bottom surface 462 that is a surface facing toward the side toward which the side surface 402 faces. The bottom surface 462 includes an introduction surface 432 connected to the introduction part 461, and one dynamic pressure surfaces 433 extending between the introduction surface 432 and the side surface 402. The dynamic pressure surface 433 is connected to the introduction surface 432 through the stepped surface 434. In addition, the dynamic pressure part 411 includes an end surface 463 that is a planar or a substantial planar surface extending along the axis x, on the opposite side of the dynamic pressure surface 433 in the circumferential direction with respect to the introduction surface 432. The end surface 463 extends up to the side surface 402 from an end portion on the opposite side in the circumferential direction of the end portion connected to the dynamic pressure surface 433 (the stepped surface 434) of the introduction surface 432, and the end surface 463 faces the stepped surface 434. The dynamic pressure part 411 or the side surface 402 is formed to be positioned not to appear on the outer periphery side from the sliding side surface 113 of the groove 112 in the shaft 110 which the dynamic pressure part 411 or the side surface 402 contacts in the usage state. That is, similar to the above described seal ring 401, the outer peripheral wall surface 451 of the outer peripheral wall part 405 is formed at a position in the radial direction where at least a portion on the inner periphery side contacts the sliding side surface 113 in the usage state.

As illustrated in FIGS. 42 and 43, the introduction part 461 of the inner peripheral wall part 404 extends in the radial direction to communicate with the dynamic pressure part 411 through the inner peripheral wall part 404, divides the inner peripheral wall surface 441 and is opened toward the sliding surface side. One introduction part 461 is provided corresponding to each of the dynamic pressure parts 411, and the introduction part 461 is connected to the dynamic pressure part 411 at one end portion in the circumferential direction of the dynamic pressure part 411. Specifically, the introduction part 461 is connected to the introduction surface 432, the stepped surface 434, and the end surface 463 of the dynamic pressure part 411. More specifically, the introduction part 461 is defined by the bottom surface 444, the end surface 445, and an end surface 446 facing the end surface 445, similar to the introduction part 442 of the seal ring 401, and the bottom surface 444, the end surface 445, and the end surface 446 are connected to the introduction surface 432, the stepped surface 434, and the end surface 463, respectively. In the seal ring 410, a passage communicating from the inner peripheral surface 406 to the dynamic pressure part 411 is formed by the introduction part 461. Thus, in the seal ring 410, as illustrated in FIG. 43, the recessed part formed by the dynamic pressure part 411 and the introduction part 461 is formed in an L shape as viewed from the sliding surface side. In the above-described seal ring 401, the inner peripheral wall part 404 extends in two regions for each dynamic pressure part 403, whereas in the seal ring 410, the inner peripheral wall part 404 extends in one region for each dynamic pressure part 411.

Similar to the above-described seal ring 401, also in the seal ring 410 according to the present embodiment, a space having a wedge shape is also formed between the sliding side surface 113 of the groove 112 in the shaft 110 and the dynamic pressure surface 433 in the usage state. The height of this space having a wedge shape is gradually decreased from the introduction surface 432 side toward the side surface 402 side. Therefore, the seal ring 410 can provide effects similar to those provided by the above-described seal ring 401. In the seal ring 401, the two dynamic pressure surfaces 433 are provided, and the dynamic pressure surfaces 433 are provided in both directions of the circumferential direction with respect to the introduction surface 432, respectively. Therefore, the seal ring 401 can provide the above-described effects in rotations in both rotation directions of the shaft 110. On the other hand, in the seal ring 410, the one dynamic pressure surface 433 is provided, and the dynamic pressure surfaces 433 are provided in one direction of the circumferential direction with respect to the introduction surface 432. Therefore, the seal ring 410 can provide the above-described effects in rotation in one rotation direction of the shaft 110.

In the above-described seventh embodiment, the outer peripheral wall part 405 protrudes from the side surface 402 to the same height (position) as the inner peripheral wall part 404 in the height direction (the direction of the arrow a in FIG. 40), and the outer peripheral wall surface 451 and the inner peripheral wall surface 441 are positioned on the same plane perpendicular to the direction of the axis x. However, the positional relationship in the direction of the axis x between the outer peripheral wall surface 451 and the inner peripheral wall surface 441 is not limited thereto. The outer peripheral wall surface 451 may be positioned on the sliding surface side of the inner peripheral wall surface 441 in the direction of the axis x, and the outer peripheral wall part 405 may protrude to the sliding surface side of the inner peripheral wall part 404. In this case, the inner peripheral wall surface 441 does not contact the sliding side surface 113 of the groove 112 in the usage state, thereby forming a space between the inner peripheral wall surface 441 and the sliding side surface 113. Therefore, the contact area of the seal ring 401 and 410 with respect to the sliding side surface 113 of the groove 112 can be reduced, also by this, the sliding resistance of the groove 112 with respect to the seal ring 401 and 410 can be reduced.

Figure 44:
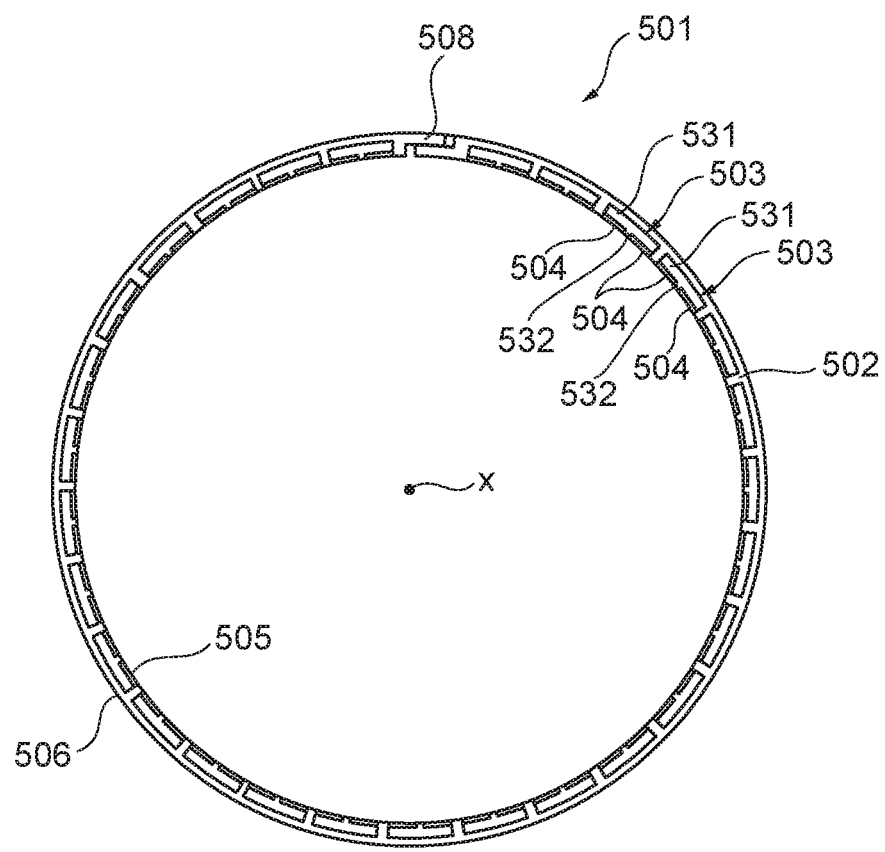
FIG. 44 is a side view on one side illustrating a schematic configuration of a seal ring according to a ninth embodiment of the present disclosure.
Figure 45:
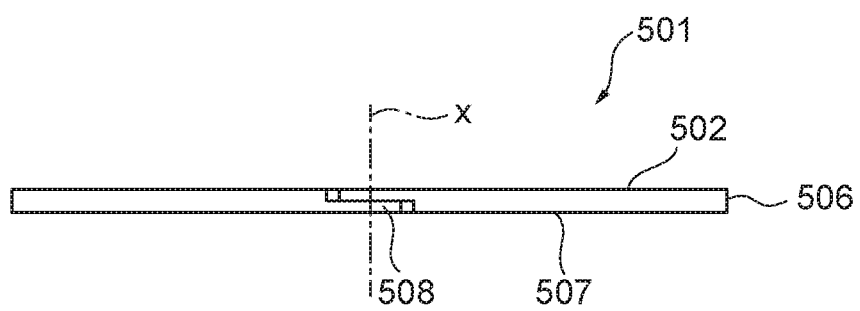
FIG. 45 is a front view illustrating a schematic configuration of the seal ring according to the ninth embodiment of the present disclosure.
Figure 46:
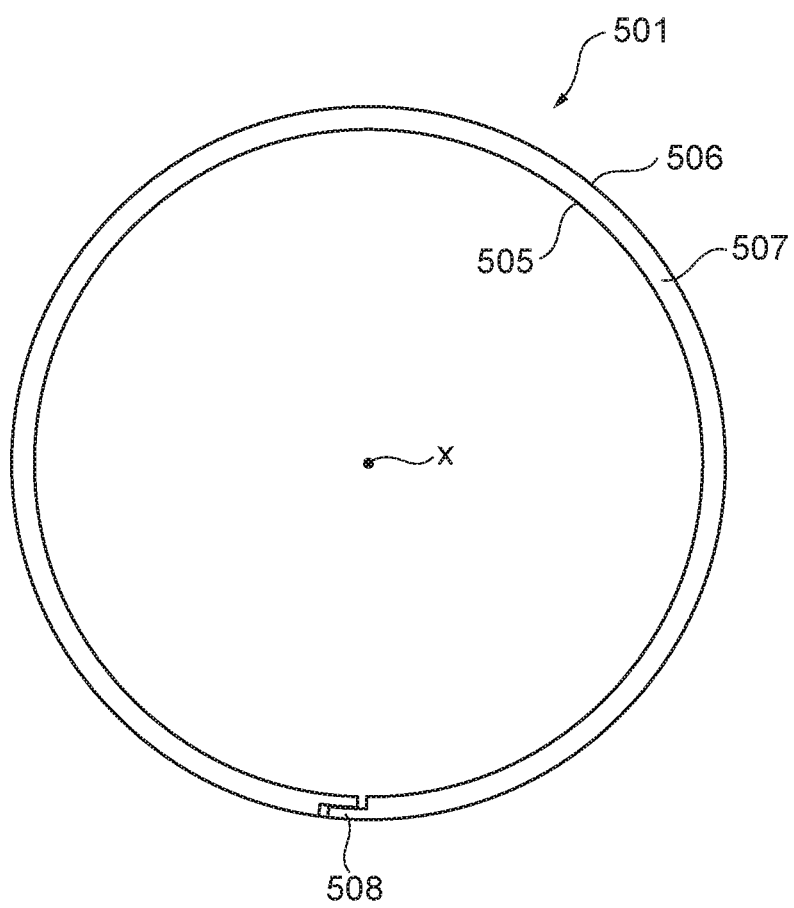
FIG. 46 is a side view on another side illustrating a schematic configuration of the seal ring according to the ninth embodiment of the present disclosure.
Figure 47:
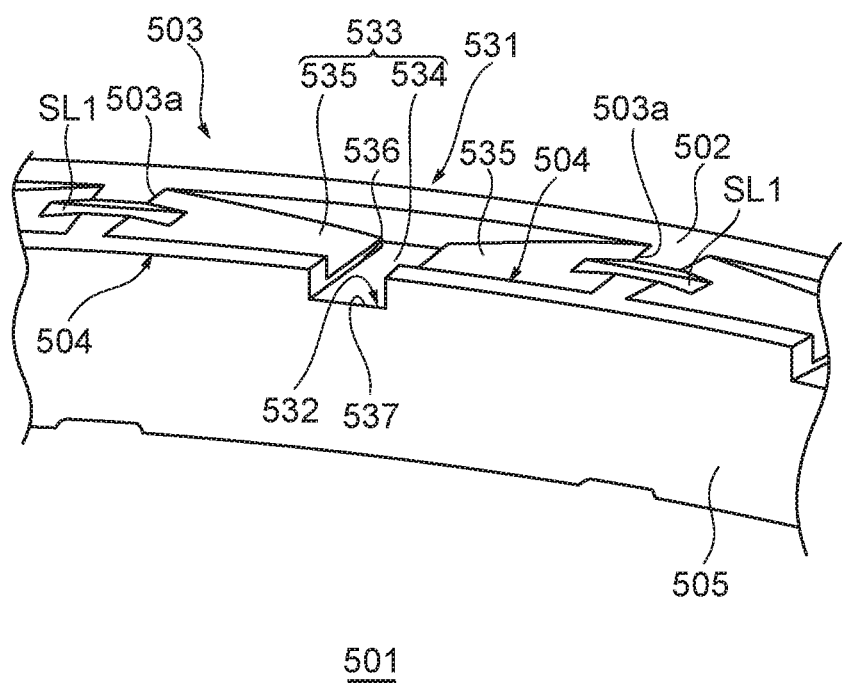
FIG. 47 is a partially enlarged perspective view illustrating a schematic configuration of the seal ring according to the ninth embodiment of the present disclosure.

Next, a seal ring 501 according to a ninth embodiment of the present disclosure will be described. FIG. 44 is a side view on one side illustrating a schematic configuration of the seal ring 501 according to the ninth embodiment of the present disclosure, FIG. 45 is a front view illustrating a schematic configuration of the seal ring 501, and FIG. 46 is a side view on another side illustrating a schematic configuration of the seal ring 501. In addition, FIG. 47 is a partially enlarged perspective view illustrating a schematic configuration of the seal ring 501.

The seal ring 501 according to the ninth embodiment is a sealing apparatus for sealing an annular gap between a shaft and a shaft hole into which the shaft is inserted, and in a vehicle or a general-purpose machine, the seal ring 501 is used for sealing between a shaft and a shaft hole into which the shaft is inserted, the shaft hole being formed in a housing or the like, the shaft and the housing or the like rotating relatively to each other. The seal ring 501 that is attached to a groove formed in an outer peripheral surface of a shaft to maintain a hydraulic pressure of an operation oil is used in, for example, an automatic transmission or a continuously variable transmission. Note that targets to which the seal ring 501 according to the ninth embodiment of the present disclosure is applied are not limited to the above.

As illustrated in FIG. 44, the seal ring 501 has an annular shape around an axis x and includes at least one side surface 502 facing in a direction of the axis x, and a plurality of recessed parts 503 that are formed on the side surface 502 such that the plurality of recessed parts 503 are separated from one another in a circumferential direction of the side surface 502. The recessed part 503 includes a dynamic pressure part 531 that extends in the circumferential direction to converge on the side surface 502, and an introduction part 532 that extends toward an inner periphery side from the dynamic pressure part 531 to open the dynamic pressure part 531 toward the inner periphery side.

Specifically, the side surface 502 is a side surface formed as a sliding surface that is pressed against a groove side surface of a groove formed in a shaft in a usage state described later. The seal ring 501 according to the present embodiment includes only one side surface 502 serving as the sliding surface, as illustrated in FIGS. 44 and 46. The seal ring 501 may include two side surfaces 502 serving as the sliding surfaces, that is, may also include the side surface 502 serving as the sliding surface on another side surface of the seal ring 501. In this case, the attachment direction of the seal ring 501 to the groove formed in the shaft is removed, and therefore the seal ring 501 can be easily attached.

As illustrated in FIGS. 44 to 46, in the seal ring 501, a cross-sectional shape in a surface along the axis x is a rectangular shape or a substantially rectangular shape. The seal ring 501 includes an inner peripheral surface 505 that is a surface facing toward the inner periphery side, an outer peripheral surface 506 facing toward the outer periphery side, a side surface 502, and a side surface 507 that is another side surface. The inner peripheral surface 505 is, for example, a cylindrical surface or a substantially cylindrical surface centered or substantially centered about the axis x. The outer peripheral surface 506 is a surface facing away from the inner peripheral surface 505, and is, for example, a cylindrical surface or a substantially cylindrical surface centered or substantially centered about the axis x. The side surface 502 is an annular surface along a plane or a substantial plane perpendicular or substantially perpendicular to the axis x, and expands between the inner peripheral surface 505 and the outer peripheral surface 506. The side surface 507 is a surface facing away from the side surface 502, is an annular surface along a plane or a substantial plane perpendicular or substantially perpendicular to the axis x, and expands between the inner peripheral surface 505 and the outer peripheral surface 506.

Figure 48:
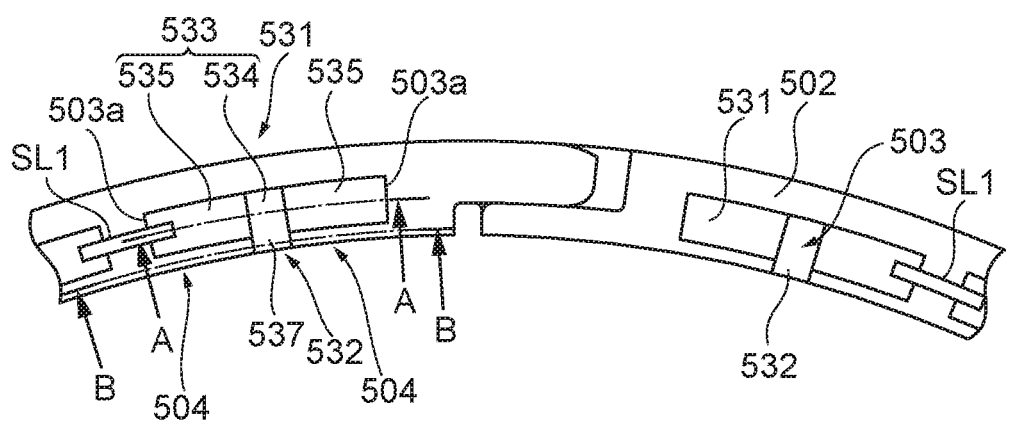
FIG. 48 is a partially enlarged view illustrating a configuration of the seal ring illustrated in FIG. 44.

As described above, the plurality of recessed parts 503 are formed on the side surface 502 serving as the sliding surface. The recessed parts 503 are formed at equal angular intervals or substantially equal angular intervals around the axis x. As illustrated in FIGS. 47 and 48, the recessed part 503 is a recessed part recessed from the side surface 502 toward the side surface 507 side, and is formed in a substantially T shape as viewed in the direction of the axis x. The recessed part 503 is provided on the inner peripheral surface 505 side in the side surface 502 such that the recessed part 503 does not appear on the outer periphery side from the side surface of the groove in the shaft in the usage state.

Specifically, as illustrated in FIGS. 47 and 48, the dynamic pressure part 531 of the recessed part 503 is separated in the radial direction from the outer peripheral surface 506 and the inner peripheral surface 505, and extends in the circumferential direction to have an arc shape or a substantially arc shape centered or substantially centered about the axis x. The dynamic pressure part 531 is provided on the inner peripheral surface 505 side in the radial direction. Specifically, the dynamic pressure part 531 includes a bottom surface 533 that is a surface facing toward a side toward which the side surface 502 faces. The bottom surface 533 includes an introduction surface 534 connected to the introduction part 532, and one or two dynamic pressure surfaces 535 each extending between the introduction surface 534 and the side surface 502. In the seal ring 501 according to the present embodiment, the bottom surface 533 includes two dynamic pressure surfaces 535.

Figure 49:
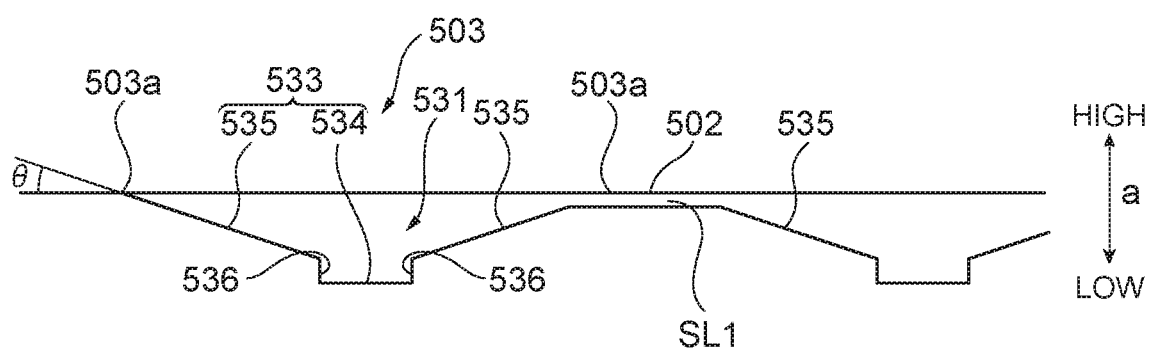
FIG. 49 is a partially enlarged cross-sectional view of a cross-section taken along line A-A in FIG. 48.

As illustrated in FIGS. 47 and 49, the introduction surface 534 is positioned on the lowest side in the dynamic pressure part 531, is formed in a plane or a substantial plane, and expands into a rectangular shape or a substantially rectangular shape. Note that in the recessed part 503, the direction of the axis x is also referred to as a height direction. In the height direction (a direction of an arrow a in FIG. 49), an inner side of the seal ring 501 is assumed as a lower side, and the side surface 502 side is assumed as a higher side. The introduction surface 534 may be formed in a curved surface, and may not have to expand into the rectangular shape. In addition, the dynamic pressure surface 535 is inclined with respect to the side surface 502 upwardly from the introduction surface 534 and extends toward the side surface 502 in the circumferential direction. The dynamic pressure surface 535 is formed in a plane or a substantial plane and extends into a rectangular shape or a substantially rectangular shape. The dynamic pressure surface 535 extends between the introduction surface 534 and the side surface 502, and is smoothly connected to the side surface 502. The dynamic pressure surface 535 may be formed in a curved surface, and may not have to expand into the rectangular shape. For example, the dynamic pressure surface 535 may be formed in a trapezoidal shape widening or narrowing toward the side surface 502 side. In addition, the dynamic pressure surface 535 is connected to the introduction surface 534 through a stepped surface 536 forming a step depressed toward the side surface 507 side in the direction of the axis x. The recessed part 503 may not have to include the stepped surface 536 so that the dynamic pressure surface 535 is directly connected to the introduction surface 534.

As described above, the two dynamic pressure surfaces 535 are formed in the recessed part 503, and are formed to be symmetrical in the circumferential direction about the introduction surface 534 in the bottom surface 533. That is, one of the dynamic pressure surfaces 535 extends from one end in the circumferential direction of the introduction surface 534 to the side surface 502 in the one direction of the circumferential direction. Another dynamic pressure surface 535 extends from another end in the circumferential direction of the introduction surface 534 to the side surface 502 in the other direction of the circumferential direction. The dynamic pressure part 531 is formed to be positioned not to appear on the outer periphery side from the side surface, which the dynamic pressure part 531 contacts, of the groove in the shaft, in the usage state described later.

As illustrated in FIGS. 47 and 48, in the introduction part 532 of the recessed part 503, a substantially U shape recess is formed in the inner peripheral surface 505, the recess opening toward the side surface 507 side, and the introduction part 532 is connected to the dynamic pressure part 531 between the end portions (end portions 503a) in the circumferential direction of the dynamic pressure part 531. Specifically, the introduction part 532 includes a bottom surface 537 that is connected to the introduction surface 534 and the stepped surfaces 536 of the dynamic pressure part 531, and is continued to the introduction surface 534. The bottom surface 537 is smoothly connected to the introduction surface 534 of the dynamic pressure part 531, and the bottom surface 537 is, for example, a surface that is positioned at the same height as the introduction surface 534. In the seal ring 501, a passage communicating from the inner peripheral surface 505 to the dynamic pressure part 531 is formed by the introduction part 532.

As described later, in the usage state in which the side surface 502 of the seal ring 501 contacts the side surface of the groove in the shaft, the recessed part 503 communicates with a space which the inner peripheral surface 505 contacts. More specifically, the dynamic pressure part 531 communicates, through the introduction part 532, with the space which the inner peripheral surface 505 contacts. In the usage state, the dynamic pressure part 531 forms a space extending in the circumferential direction between the dynamic pressure part 531 and the side surface of the groove in the shaft, and the dynamic pressure surface 535 forms a space in which a height (a width in the height direction) is gradually decreased from the introduction surface 534 side toward the side surface 502 side, the space extending in the circumferential direction between the dynamic pressure surface 535 and the side surface of the groove in the shaft.

In a plurality of recessed parts 503, a communicating groove SL1 that connects the recessed part 503 and the recessed part 503 being adjacent to each other is formed. The communicating groove SL1 is a slit having a substantially curved shape in a plan view, the slit being comprised of a recessed part having a rectangular cross section that connects the dynamic pressure part 531 of the recessed part 503 and the dynamic pressure part 531 of the recessed part 503 being adjacent to each other. The communicating groove SL1 is also a channel that connects spaces of the dynamic pressure parts 531 being adjacent to each other, and a depth of the communicating groove SL1 can be arbitrarily set. A width of the communicating groove SL1 is shorter than the width of the dynamic pressure surface 535 but the width of the communicating groove SL1 may be substantially the same as the width of the dynamic pressure surface 535.

Note that a cross sectional shape of the communicating groove SL1 is not limited to a rectangular shape, and the communicating groove SL1 may be comprised of a recessed part having a cross section formed in a substantially U shape, or may have other various cross-sectional shape. Furthermore, the communicating groove SL1 has a curved shape in a plan view along the circumferential direction of the side surface 502, but may have a linear shape. In short, a cross-sectional shape, a plan-view shape and the like of the communicating groove SL1 may be arbitrary shapes capable of connecting the dynamic pressure part 531 of the recessed part 503 and the dynamic pressure part 531 of the recessed part 503.

In this case, the communicating grooves SL1 are provided for all of the plurality of recessed parts 503, but are not limited thereto. For example, a configuration may be adopted in which the plurality of recessed parts 503 are divided by every three recessed parts 503 so that the divided three recessed parts 503 are connected by the communicating groove SL1 therebetween and the communicating groove SL1 is not provided between the three recessed parts 503 and the three recessed parts 503 that are adjacent to each other. Furthermore, the plurality of recessed parts 503 may be divided not only by every three recessed parts 503 but also by every four, eight or n recessed parts 503 so that the divided recessed parts 503 are connected by the communicating groove SL1 therebetween.

The seal ring 501 is formed of a resin material such as polyether ether ketone (PEEK), polyphenylene sulfide (PPS), and polytetrafluoroethylene (PTFE). A circumferential length of the outer peripheral surface 506 of the seal ring 1 is shorter than the circumferential length of the inner peripheral surface of the shaft hole into which the shaft is inserted, not to have an interference with respect to the shaft hole. Therefore, in a state in which the fluid pressure does not act on the seal ring 501 in the usage state, the outer peripheral surface 506 of the seal ring 501 is separated from the inner peripheral surface of the shaft hole.

The seal ring 501 is not endless, and as illustrated in FIGS. 44 to 46, the seal ring 501 includes an abutment joint 508 at one portion in the circumferential direction of the seal ring 501. The abutment joint 508 has a well-known structure capable of maintaining a stable sealing performance even when the circumferential length of the seal ring 501 varies due to thermal expansion or thermal contraction of the seal ring 501. Examples of the structure of the abutment joint 508 include a so-called special step cut structure in which the abutment joint 508 is cut off in a stepwise manner when seen from any of the side of the outer peripheral surface 506, and the sides of the both side surfaces 502 and 507, a straight cut structure, a bias cut structure, and a step cut structure. When a material (such as PTFE) having low elasticity is employed as the material of the seal ring 501, the seal ring 501 may be endless without having the abutment joint 508.

Next, action of the seal ring 501 having the above-described configuration will be described.

Figure 50:
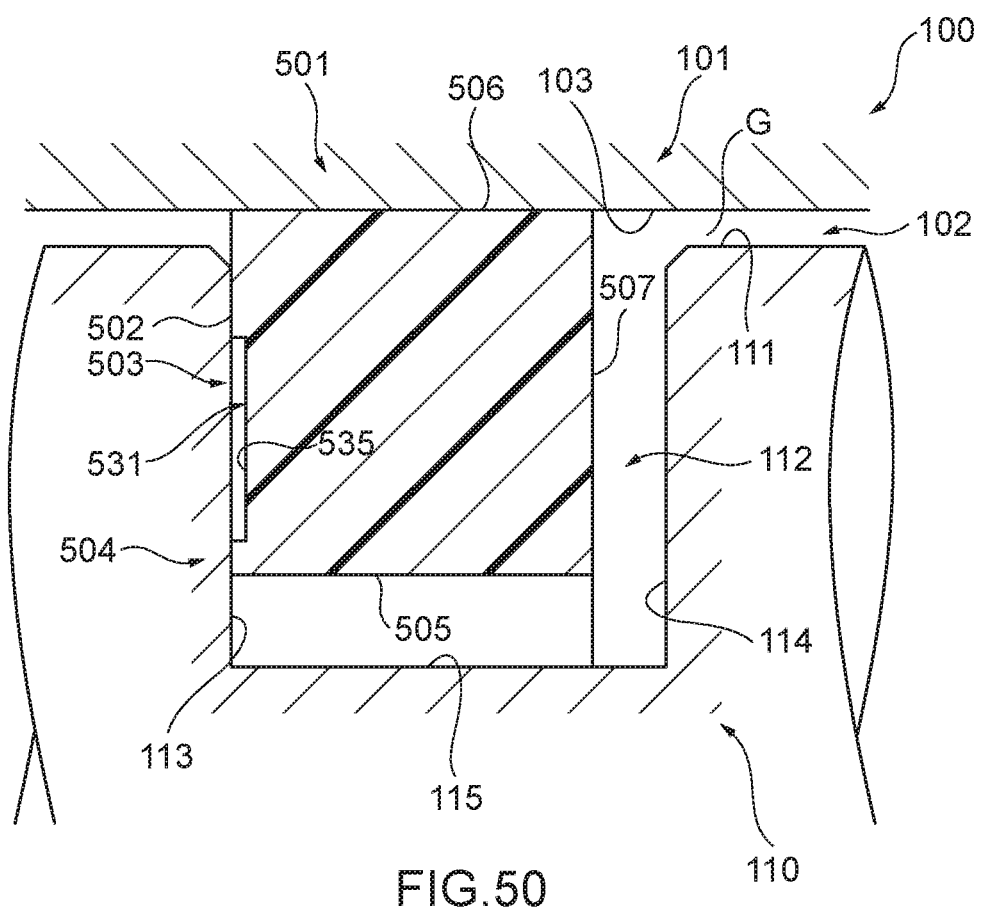
FIG. 50 is a partially enlarged cross-sectional view of the seal ring according to the ninth embodiment of the present disclosure in a usage state in which the seal ring is attached to a housing and a shaft inserted into a shaft hole that is a through-hole formed at the housing in a hydraulic apparatus as an attachment target.

FIG. 50 is a partially enlarged cross-sectional view of the seal ring 501 in a usage state in which the seal ring 501 is attached to a housing 101 and a shaft 110 inserted into a shaft hole 102 that is a through-hole formed at the housing 101 in a hydraulic apparatus 100 as an attachment target. The shaft 110 is relatively rotatable with respect to the housing 101, and an annular groove 112 recessed toward a center side is formed in an outer peripheral surface 111 of the shaft 110. The groove 112 has a cross section formed in a rectangular shape or a substantially rectangular shape, and is defined by side surfaces 113 and 114 having a planar shape and a bottom surface 115. In the hydraulic apparatus 100, an annular space is formed between an inner peripheral surface 103 of the shaft hole 102 and an outer peripheral surface 111 of the shaft 110, and a hydraulic channel in which operation oil (not illustrated) is to be filled is formed in the shaft 110 and the housing 101. The seal ring 501 is attached to the groove 112, and seals a gap G between the shaft 110 and the shaft hole 102 to prevent loss of hydraulic pressure of the operation oil in the hydraulic channel. In FIG. 50, a part of the groove 112 on the right forms the hydraulic channel, and a side surface 113 on the left side of the groove 112 serves as a sliding side surface against which the seal ring 501 is pressed, whereby pressure on the right side of the groove 112 becomes high and pressure on the left side of the groove 112 becomes low. The seal ring 501 is attached to the groove 112 such that the side surface 2 faces the sliding side surface 113 of the groove 112.

When the operation oil is introduced into the hydraulic channel, the pressure in the hydraulic channel becomes high, whereby the outer peripheral surface 506 and the side surface 502 of the seal ring 501 are pressed against the inner peripheral surface 103 of the shaft hole 102 and the sliding side surface 113 of the groove 112, respectively. Thus, in the annular gap G, the hydraulic channel is sealed, to thereby maintain the hydraulic pressure. When the shaft 110 rotates, the shaft 110 rotates with respect to the seal ring 501, and the sliding side surface 113 of the groove 112 slides with respect to the side surface 502 of the seal ring 501. At this time, the operation oil intrudes into the recessed part 503 from the introduction part 532 of the seal ring 501, and is introduced to the dynamic pressure part 531, and the hydraulic pressure of the operation oil causes the operation oil to move to the end portion 503a in the circumferential direction along the dynamic pressure surface 535 in the dynamic pressure part 531. While the side surface 502 of the seal ring 501 contacts the sliding side surface 113 of the groove 112, the pressure on the end portion 503a side of the dynamic pressure part 531 is increased by this movement of the operation oil in the dynamic pressure part 531, and finally the pressure of the operation oil on the end portion 503a side is increased until the side surface 502 of the seal ring 501 is separated from the sliding side surface 113, resulting that the operation oil leaks out to the side surface 502 from the end portion 503a of the dynamic pressure part 531. This causes a thin lubricating film of the operation oil to be formed between the side surface 502 of the seal ring 501 and the sliding side surface 113 of the groove 112, thereby reducing a sliding resistance of the groove 112 with respect to the seal ring 501. Thus, in the usage state, the recessed part 503 uses the dynamic pressure effect to reduce the sliding resistance of the groove 112 with respect to the seal ring 501.

The seal ring 501 can reduce the sliding resistance of the groove 112 with respect to the seal ring 501 as described above. Therefore, heat generated in the sliding portion in use can be suppressed, and the seal ring 501 can be used under a higher P (pressure) and V (velocity) condition, the PV condition being used as an index for confirming the durability. In addition, the seal ring 501 can be also used for the shaft 110 which is soft.

Figure 51:
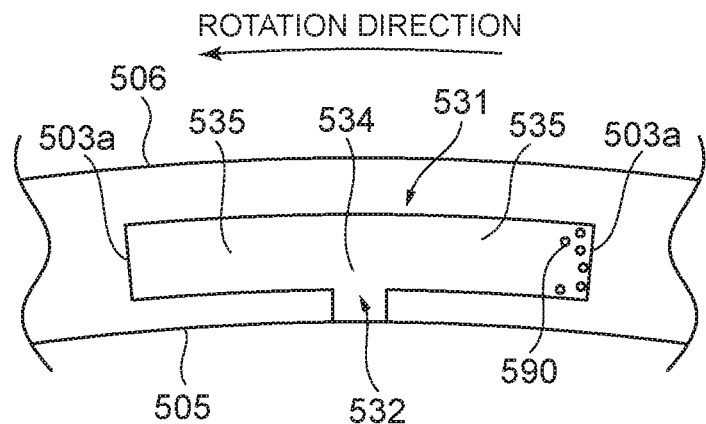
FIG. 51 is a partially enlarged view illustrating a configuration of a conventional seal ring.

The communicating groove SL1 comprised of a recessed part having a rectangular cross section that connects the dynamic pressure part 531 of the recessed part 503 and the dynamic pressure part 531 of the recessed part 503 being adjacent to each other is provided in the side surface 502 of the seal ring 501, but as illustrated in FIG. 51, when the communicating groove SL1 is not provided, foreign matter 590 existing in the space of the dynamic pressure part 531 stay in the vicinity of the end portion 503a, which causes the sliding side surface 113 of the groove 112 in the shaft 110 to be damaged.

However, in the seal ring 501 of the present disclosure, the presence of the communicating groove SL1 that connects the recessed part 503 and the recessed part 503 being adjacent to each other enables the foreign matter 590 to flow to the adjacent recessed part 503 that is present in the direction opposite to the rotation direction without staying in the vicinity of the end portion 503a of the recessed part 503, which can prevent the sliding side surface 113 of the groove 112 in the shaft 110 from being damaged. In addition, since the foreign matter 590 flows between the recessed part 503 and the recessed part 503, the foreign matter 590 can be naturally discharged from the introduction part 532 of the introduction part 532.

As described above, according to the seal ring 501 according to the ninth embodiment of the present disclosure, the sliding resistance can be further reduced, and the durability can be improved.

Figure 53:
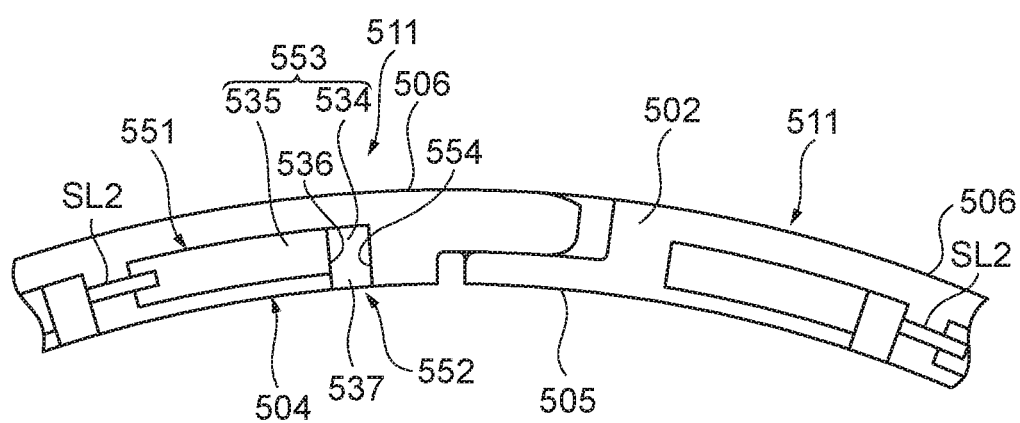
FIG. 53 is a partially enlarged side view enlargedly illustrating a portion of a side surface on one side of a seal ring according to a tenth embodiment of the present disclosure, the view illustrating a schematic configuration of the seal ring.
Figure 54:
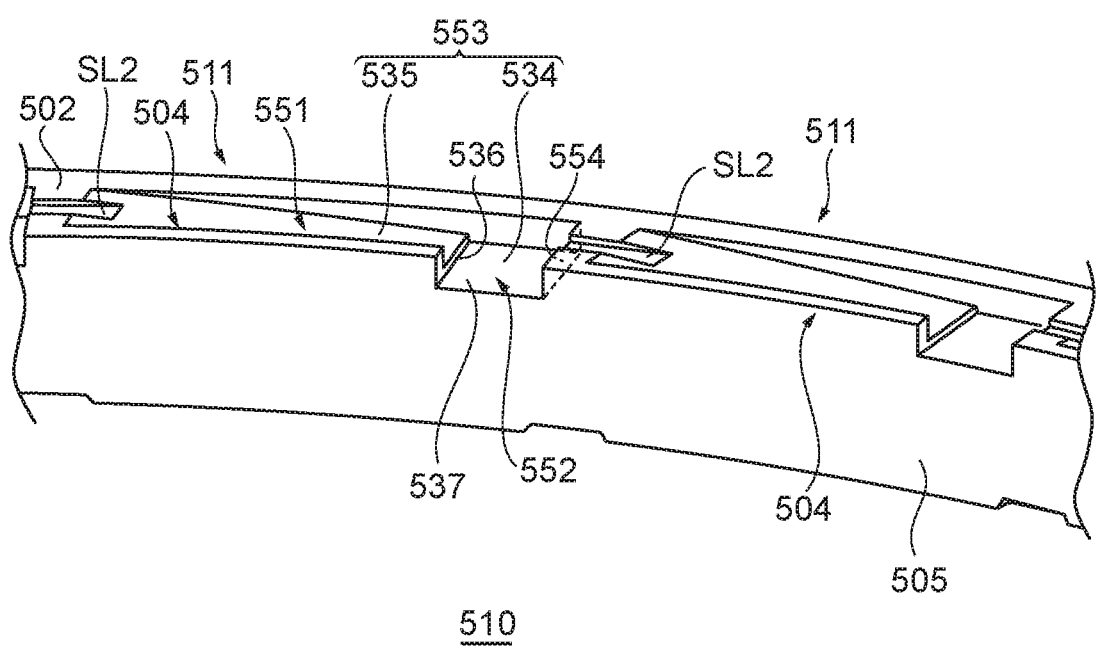
FIG. 54 is a partially enlarged perspective view illustrating a schematic configuration of the seal ring according to the tenth embodiment of the present disclosure.

Next, a seal ring 510 according to a tenth embodiment of the present disclosure will be described. FIG. 53 is a partially enlarged side view enlargedly illustrating a portion of a side surface on one side of the seal ring 510, the view illustrating a schematic configuration of the seal ring 510, and FIG. 54 is a partially enlarged perspective view illustrating a schematic configuration of the seal ring 510. The seal ring 510 according to the tenth embodiment of the present disclosure is different from the above-described seal ring 501 according to the ninth embodiment of the present disclosure in configurations of the recessed part and the inner peripheral wall part. Hereinafter, components of the seal ring 510 according to the tenth embodiment of the present disclosure that are the same or have similar functions to those of the seal ring 501 according to the ninth embodiment of the present disclosure will be denoted by the same reference characters, the description thereof will be omitted, and different configurations will be described.

The seal ring 510 includes a recessed part 511 different from the recessed part 503 of the seal ring 501. As illustrated in FIGS. 53 and 54, the recessed part 511 includes a dynamic pressure part 551 and an introduction part 552, and the dynamic pressure part 551 includes only one dynamic pressure surface 535. Hereinafter, the description will be specifically made.

The dynamic pressure part 551 of the recessed part 511 is separated in the radial direction from the outer peripheral surface 506 and the inner peripheral surface 505, and extends in the circumferential direction to have an arc shape or a substantially arc shape centered or substantially centered about the axis x. The dynamic pressure part 551 is provided on the inner peripheral surface 505 side in the radial direction. Specifically, the dynamic pressure part 551 includes a bottom surface 553 that is a surface facing toward a side toward which the side surface 502 faces. The bottom surface 553 includes an introduction surface 534 connected to the introduction part 552, and one dynamic pressure surface 535 extending between the introduction surface 534 and the side surface 502.

The dynamic pressure surface 535 is connected to the introduction surface 534 through the stepped surface 536. In addition, the dynamic pressure part 551 includes an end surface 554 that is a planar or a substantial planar surface extending along the axis x, on the opposite side of the dynamic pressure surface 535 in the circumferential direction with respect to the introduction surface 534. The end surface 554 extends up to the side surface 502 from an end portion on the opposite side in the circumferential direction of the end portion connected to the dynamic pressure surface 535 of the introduction surface 534. The dynamic pressure part 551 is formed to be positioned such that the dynamic pressure part 51 does not appear on the outer periphery side from the sliding side surface 113 of the groove 112 in the shaft 110 which the dynamic pressure part 551 contacts in the usage state.

As illustrated in FIGS. 53 and 54, the introduction part 552 of the recessed part 511 forms a substantially U shape recess in the inner peripheral surface 505, the recess opening toward the side surface 502 side, and the introduction part 552 is connected to the dynamic pressure part 551 at one end portion in the circumferential direction of the dynamic pressure part 551. Specifically, the introduction part 552 is connected to the introduction surface 534 of the dynamic pressure part 551, the stepped surfaces 536, and the end surface 554, and includes a bottom surface 537 continued to the introduction surface 534. In the seal ring 510, by the introduction part 552, a passage communicating from the inner peripheral surface 505 to the dynamic pressure part 551 is formed. Thus, the recessed part 511 of the seal ring 510 is formed in an L-shape.

In the seal ring 510, a communicating groove SL2 that connects a recessed space of the introduction part 552 in the recessed part 511 and a recessed space of the dynamic pressure part 551 in the adjacent recessed part 511 is formed. The structure of the communicating groove SL2 is different from the communicating groove SL1 in the ninth embodiment in the length in the circumferential direction, and the other configuration thereof is the same as that of the communicating groove SL1.

Similar to the above-described seal ring 501, also in the seal ring 510 according to the present embodiment, a space having a wedge shape is also formed between the sliding side surface 113 of the groove 112 in the shaft 110 and the dynamic pressure surface 535 in the usage state. The height of this space having a wedge shape is gradually decreased from the introduction surface 534 side toward the side surface 502 side. Therefore, the seal ring 510 can provide effects similar to those provided by the above-described seal ring 501.

Figure 52:
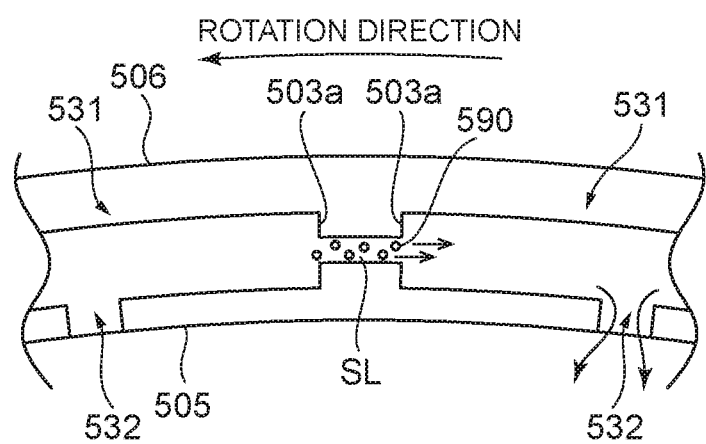
FIG. 52 is a partially enlarged view for explaining an operational effect by a slit of the seal ring of the present disclosure.

Also in the seal ring 510, the communicating groove SL2 that connects the introduction part 552 of the recessed part 511 and the dynamic pressure part 551 of the recessed part 511 is provided, and therefore the foreign matter 590 (FIG. 52) flows to the adjacent recessed part 511 without staying in the vicinity of the introduction part 552 of the recessed part 511, which can prevent the sliding side surface 113 of the groove 112 in the shaft 110 from being damaged. In addition, since the foreign matter 590 flow between the recessed part 511 and the recessed part 511, the foreign substances 590 can be naturally discharged from the introduction part 552.

Figure 55:
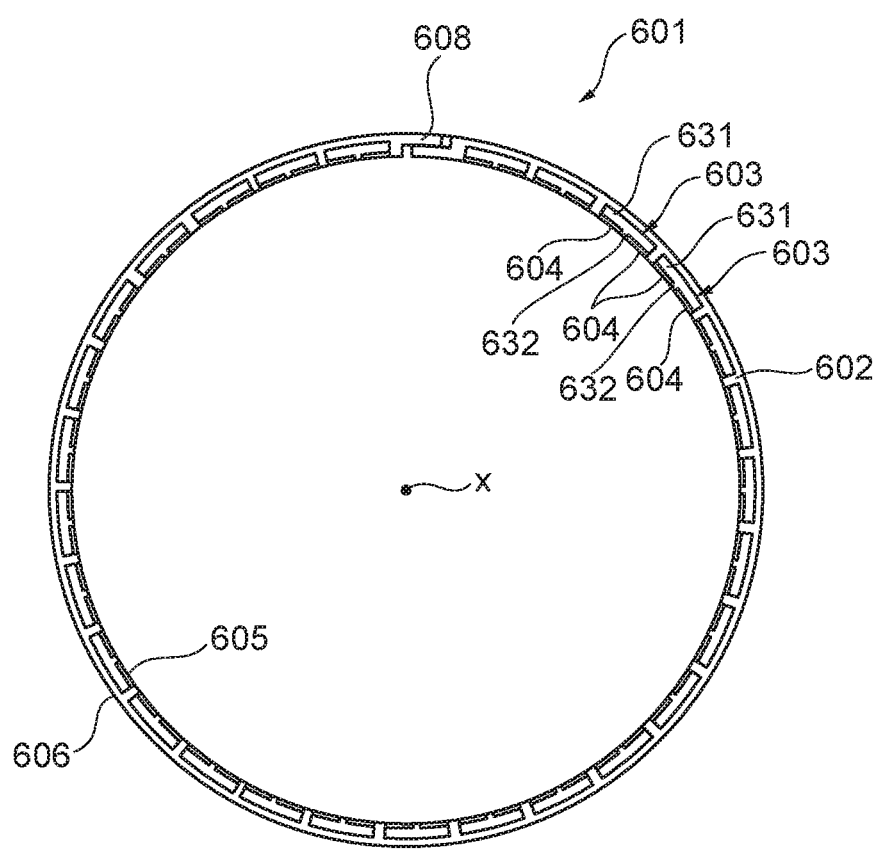
FIG. 55 is a side view on one side illustrating a schematic configuration of a seal ring according to an eleventh embodiment of the present disclosure.
Figure 56:
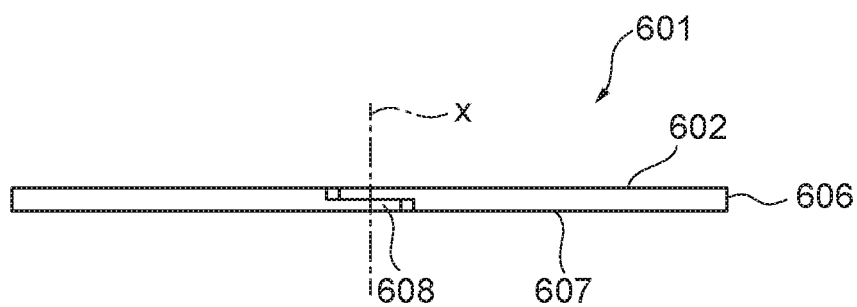
FIG. 56 is a front view illustrating a schematic configuration of the seal ring according to the eleventh embodiment of the present disclosure.
Figure 57:
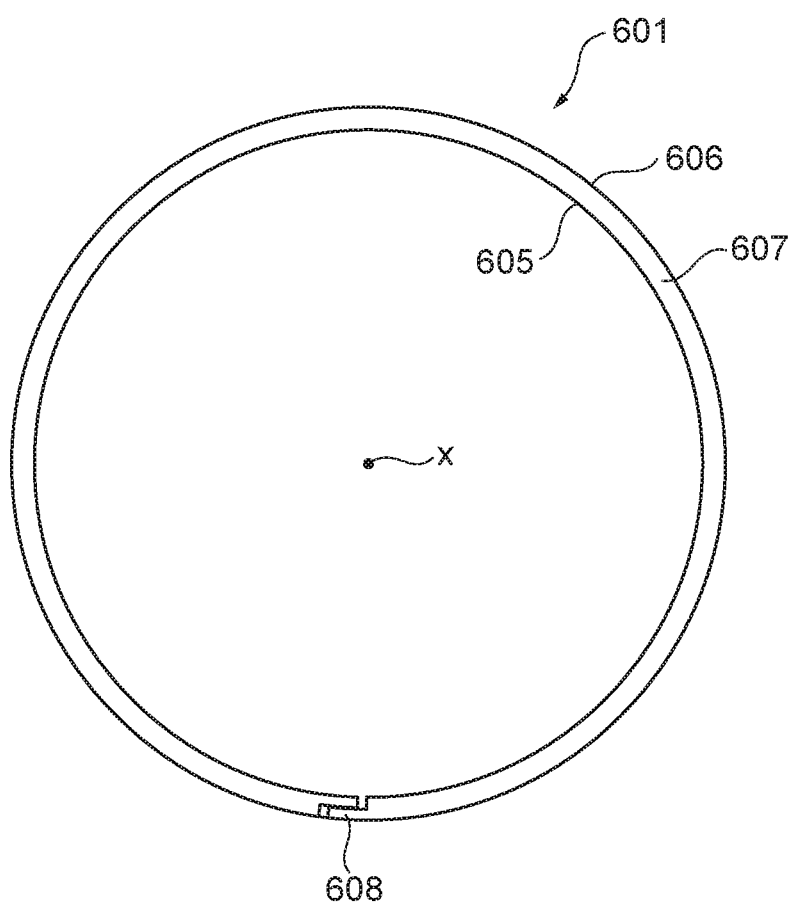
FIG. 57 is a side view on another side illustrating a schematic configuration of the seal ring according to the eleventh embodiment of the present disclosure.
Figure 58:
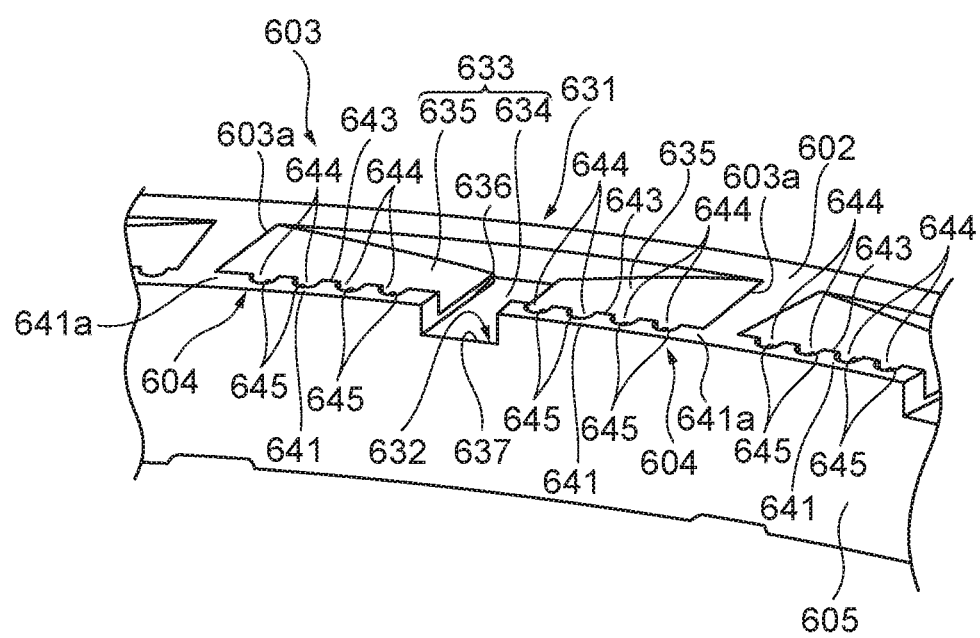
FIG. 58 is a partially enlarged perspective view illustrating a schematic configuration of the seal ring according to the eleventh embodiment of the present disclosure.

Next, a seal ring 601 according to an eleventh embodiment of the present disclosure will be described. FIG. 55 is a side view on one side illustrating a schematic configuration of the seal ring 601, FIG. 56 is a front view illustrating a schematic configuration of the seal ring 601, and FIG. 57 is a side view on another side illustrating a schematic configuration of the seal ring 601. In addition, FIG. 58 is a partially enlarged perspective view illustrating a schematic configuration of the seal ring 601.

The seal ring 601 according to the present embodiment is a sealing apparatus for sealing an annular gap between a shaft and a shaft hole into which the shaft is inserted, and in a vehicle or a general-purpose machine, the seal ring 601 is used for sealing between a shaft and a shaft hole into which the shaft is inserted, the shaft hole being formed in a housing or the like, the shaft and the housing or the like rotating relatively to each other. The seal ring 601 that is attached to a groove formed in an outer peripheral surface of a shaft to maintain a hydraulic pressure of an operation oil is used in, for example, an automatic transmission or a continuously variable transmission. Note that targets to which the seal ring 601 according to the present disclosure is applied are not limited to the above.

As illustrated in FIGS. 55 to 58, the seal ring 601 has an annular shape around an axis x and includes at least one side surface 602 facing in a direction of the axis x, a plurality of recessed parts 603 that are formed on the side surface 602 such that the plurality of recessed parts 603 are separated from one another in a circumferential direction, and a plurality of inner peripheral wall parts 604 that are formed corresponding to the plurality of recessed parts 603, respectively. The recessed part 603 includes a dynamic pressure part 631 that extends in the circumferential direction to converge on the side surface 602, and an introduction part 632 that extends toward an inner periphery side from the dynamic pressure part 631 to open the dynamic pressure part 631 toward the inner periphery side. The number of inner peripheral wall parts 604 provided for each of the recessed parts 603 is one or two. Each of the inner peripheral wall parts 604 is a portion defined on the inner periphery side of the corresponding recessed part 603 by the dynamic pressure part 631 and the introduction part 632 of the corresponding recessed part 603, and includes an inner peripheral wall surface 641 which is a surface continuing from the side surface 602. The inner peripheral wall surface 641 has one or more dent parts 644 formed to be separated from one another in the circumferential direction.

Specifically, the side surface 602 is a side surface formed as a sliding surface that is pressed against a groove side surface of a groove formed in a shaft in a usage state described later. The seal ring 601 according to the present embodiment includes only one side surface 602 serving as the sliding surface, as illustrated in FIGS. 55 and 57. The seal ring 601 may include two side surfaces 602 serving as the sliding surfaces, that is, may also include the side surface 602 serving as the sliding surface on another side surface of the seal ring 601. In this case, the attachment direction of the seal ring 601 to the groove formed in the shaft is removed, and therefore the seal ring 601 can be easily attached.

As illustrated in FIGS. 55 to 57, in the seal ring 601, a cross-sectional shape in a surface along the axis x is a rectangular shape or a substantially rectangular shape. The seal ring 601 includes an inner peripheral surface 605 that is a surface facing toward the inner periphery side, an outer peripheral surface 606 facing toward the outer periphery side, a side surface 602, and a side surface 607 that is another side surface. The inner peripheral surface 605 is, for example, a cylindrical surface or a substantially cylindrical surface centered or substantially centered about the axis x. The outer peripheral surface 606 is a surface facing away from the inner peripheral surface 605, and is, for example, a cylindrical surface or a substantially cylindrical surface centered or substantially centered about the axis x. The side surface 602 is an annular surface along a plane or a substantial plane perpendicular or substantially perpendicular to the axis x, and expands between the inner peripheral surface 605 and the outer peripheral surface 606. The side surface 607 is a surface facing away from the side surface 602, is an annular surface along a plane or a substantial plane perpendicular or substantially perpendicular to the axis x, and expands between the inner peripheral surface 605 and the outer peripheral surface 606.

Figure 59:
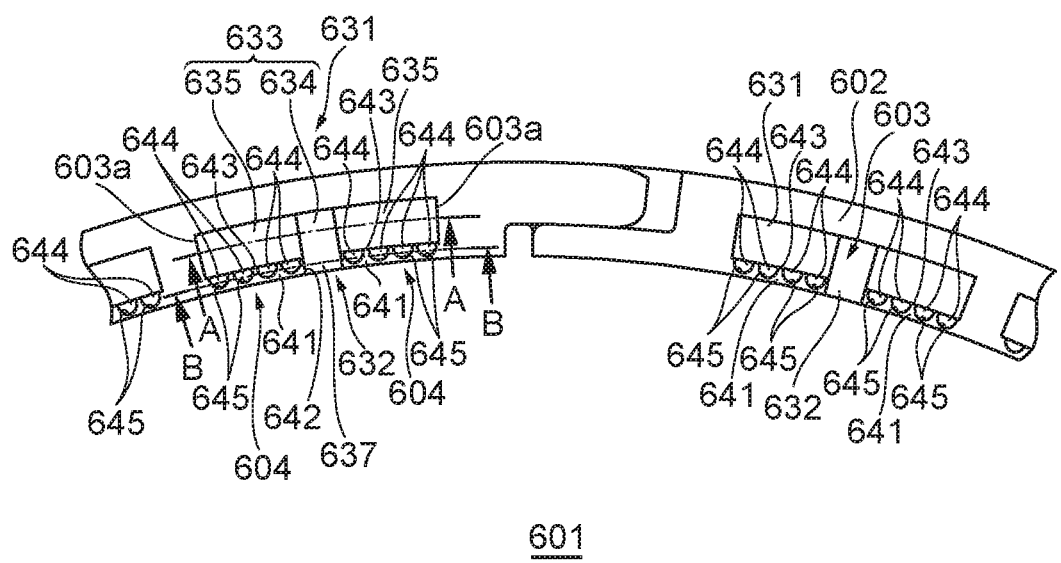
FIG. 59 is a partially enlarged view of the seal ring illustrated in FIG. 55.

As described above, the plurality of recessed parts 603 are formed on the side surface 602 serving as the sliding surface. The recessed parts 603 are formed at equal angular intervals or substantially equal angular intervals around the axis x. As illustrated in FIGS. 58 and 59, the recessed part 603 is a recessed part recessed from the side surface 602 toward the side surface 607 side, and is formed in a substantially T shape as viewed in the direction of the axis x. The recessed part 603 is provided on the inner peripheral surface 605 side in the side surface 602 such that the recessed part 603 does not appear on the outer periphery side from the side surface of the groove in the shaft in the usage state.

Specifically, as illustrated in FIGS. 58 and 59, the dynamic pressure part 631 of the recessed part 603 is separated in the radial direction from the outer peripheral surface 606 and the inner peripheral surface 605, and extends in the circumferential direction to have an arc shape or a substantially arc shape centered or substantially centered about the axis x. The dynamic pressure part 631 is provided on the inner peripheral surface 605 side in the radial direction. Specifically, the dynamic pressure part 631 includes a bottom surface 633 that is a surface facing toward a side toward which the side surface 602 faces. The bottom surface 633 includes an introduction surface 634 connected to the introduction part 632, and one or two dynamic pressure surfaces 635 each extending between the introduction surface 634 and the side surface 602. In the seal ring 601 according to the present embodiment, the bottom surface 633 includes two dynamic pressure surfaces 635.

Figure 60:
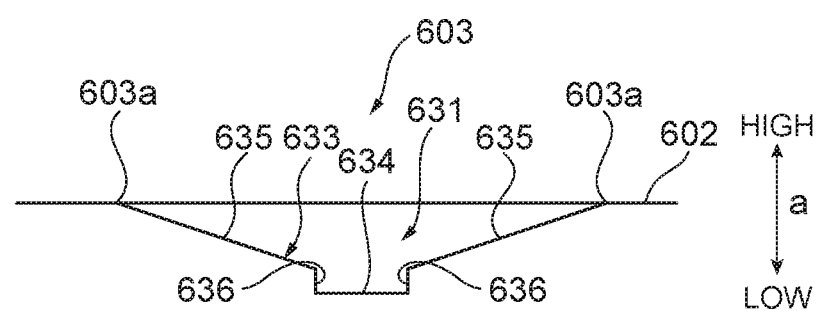
FIG. 60 is a partially enlarged cross-sectional view of a cross-section taken along line A-A in FIG. 59.

As illustrated in FIGS. 58 and 60, the introduction surface 634 is positioned on the lowest side in the dynamic pressure part 631, is formed in a plane or a substantial plane, and expands into a rectangular shape or a substantially rectangular shape. Note that in the recessed part 603, the direction of the axis x is also referred to as a height direction. In the height direction (a direction of an arrow a in FIGS. 60 and 61), an inner side of the seal ring 601 is assumed as a lower side, and the side surface 602 side is assumed as a higher side. The introduction surface 634 may be formed in a curved surface, and may not have to expand into the rectangular shape. In addition, the dynamic pressure surface 635 is inclined with respect to the side surface 602 upwardly from the introduction surface 634 and extends toward the side surface 602 in the circumferential direction. The dynamic pressure surface 635 is formed in a plane or a substantial plane and extends into a rectangular shape or a substantially rectangular shape. The dynamic pressure surface 635 extends between the introduction surface 634 and the side surface 602, and is smoothly connected to the side surface 602. The dynamic pressure surface 635 may be formed in a curved surface, and may not have to expand into the rectangular shape. For example, the dynamic pressure surface 635 may be formed in a trapezoidal shape widening or narrowing toward the side surface 602 side. In addition, the dynamic pressure surface 635 is connected to the introduction surface 634 through a stepped surface 636 forming a step depressed toward the side surface 607 side in the direction of the axis x. The recessed part 603 may not have to include the stepped surface 636 so that the dynamic pressure surface 635 is directly connected to the introduction surface 634.

As described above, the two dynamic pressure surfaces 635 are formed in the recessed part 603, and are formed to be symmetrical in the circumferential direction about the introduction surface 634 in the bottom surface 633. That is, one of the dynamic pressure surfaces 635 extends from one end in the circumferential direction of the introduction surface 634 to the side surface 602 in one direction of the circumferential direction. Another dynamic pressure surface 635 extends from another end in the circumferential direction of the introduction surface 634 to the side surface 602 in another direction of the circumferential direction. The dynamic pressure part 631 is formed to be positioned not to appear on the outer periphery side from the side surface, which the dynamic pressure part 631 contacts, of the groove in the shaft, in the usage state described later.

As illustrated in FIGS. 58 and 59, the introduction part 632 of the recessed part 603 forms a recess on the inner peripheral surface 605, the recess opening toward the side surface 602 side, and the introduction part 632 is connected to the dynamic pressure part 631 between the end portions (end portions 603a) in the circumferential direction of the dynamic pressure part 631. Specifically, the introduction part 632 includes a bottom surface 637 that is connected to the introduction surface 634 and the stepped surfaces 636 of the dynamic pressure part 631, and is continued to the introduction surface 634. The bottom surface 637 is smoothly connected to the introduction surface 634 of the dynamic pressure part 631, and the bottom surface 637 is, for example, a surface that is positioned at the same height as the introduction surface 634. In the seal ring 601, a passage communicating from the inner peripheral surface 605 to the dynamic pressure part 631 is formed by the introduction part 632.

As described later, in the usage state in which the side surface 602 of the seal ring 601 contacts the side surface of the groove in the shaft, the recessed part 603 communicates with a space which the inner peripheral surface 605 contacts. More specifically, the dynamic pressure part 631 communicates, through the introduction part 632, with the space which the inner peripheral surface 605 contacts. In the usage state, the dynamic pressure part 631 forms a space extending in the circumferential direction between the dynamic pressure part 631 and the side surface of the groove in the shaft, and the dynamic pressure surface 365 forms a space in which a height (a width in the height direction) is gradually decreased from the introduction surface 634 side toward the side surface 602 side, the space extending in the circumferential direction between the dynamic pressure surface 365 and the side surface of the groove in the shaft.

As described above, the plurality of inner peripheral wall parts 604 are formed corresponding to the plurality of recessed parts 603, respectively. Specifically, as illustrated in FIGS. 58 and 59, the two inner peripheral wall parts 604 are formed with respect to each of the recessed parts 603. The inner peripheral wall part 604 is a portion defined by a portion in the circumferential direction in which one dynamic pressure surface 635 of the dynamic pressure part 631 extends, the introduction part 632, and the inner peripheral surface 605. The inner peripheral wall part 604 is adjacent to the dynamic pressure surface 635 of the dynamic pressure part 631 on the inner periphery side, and protrudes to a side higher than the dynamic pressure surface 635. The inner peripheral wall part 604 includes an inner peripheral wall surface 641, an end surface 642 that is a surface formed by the introduction part 632 and extending along the axis x, and an outer peripheral surface 643 that is a surface formed by the dynamic pressure part 631, extending in the circumferential direction, and facing toward the outer periphery side.

Figure 61:
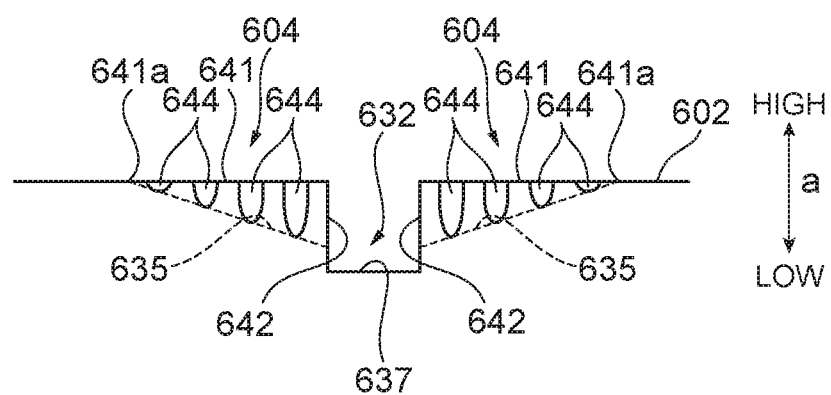
FIG. 61 is a partially enlarged cross-sectional view of a cross-section taken along line B-B in FIG. 59.

As illustrated in FIGS. 58 and 61, the inner peripheral wall surface 641 is flush or substantially flush with the side surface 602, and is smoothly connected to the side surface 602. The inner peripheral wall surface 641 is a plane or a substantial plane that is positioned at the same height as the side surface 602, and extends into a rectangular shape or a substantially rectangular shape. The inner peripheral wall surface 641 may be formed in a curved surface, and may not have to expand into the rectangular shape. For example, the inner peripheral wall surface 641 may be formed in a trapezoidal shape widening or narrowing toward the side surface 602 side.

As described above, the two inner peripheral wall parts 604 are formed to each of the recessed parts 603, and are formed to be symmetrical in the circumferential direction about the introduction part 632. That is, one of the inner peripheral wall parts 604 extends from one end in the circumferential direction of the introduction part 632 to the side surface 602 in the one direction of the circumferential direction. Another inner peripheral wall part 604 extends from another end in the circumferential direction of the introduction part 632 to the side surface 602 in the other direction of the circumferential direction.

As illustrated in FIGS. 58 and 59, the dent parts 644 extend, between the outer periphery side and the inner periphery side of the inner peripheral wall surface 641, from the outer periphery side to a portion therebetween. That is, the dent parts 644 extend, on the inner peripheral wall surface 641, from the outer peripheral surface 643 to a portion in the radial direction of the inner peripheral wall part 604, and are opened from the outer peripheral surface 643 toward the dynamic pressure part 631, and do not reach the inner peripheral surface 605. Each of the dent parts 644 is a dent having a ship bottom shape such that the contour on the inner peripheral wall surface 641 has a protruding curved line 645 toward the inner periphery side, and the depths (widths in the arrow a in FIG. 61) of the dents are gradually shallower from the outer periphery side toward the inner periphery side in the radial direction. The dent parts 644 have the same or substantially the same contour as one another. The dent part 644 may have a straight contour portion on the inner peripheral wall surface 641. For example, a portion on the outer periphery side of the dent part 644 may extend in the radial direction with an equal width in the circumferential direction. Each of the dent parts 644 extends in the depth direction (the direction of the arrow a) from the inner peripheral wall surface 641 to the same depth or nearly the same depth as the dynamic pressure surface 635 of the dynamic pressure part 631. It is preferable that the depth of the each of the dent parts 644 is shallower than the dynamic pressure surface 635. That is, the depth of the dent parts 644 become gradually shallower from the end surface 642 side to the end portion 641a side. Note that the dent part 644 may be formed in a wedge shape to be shallower from the outer peripheral surface 643 to the inner peripheral surface 605 side. In addition, all of the dent parts 644 may be formed to have the same depth. Each of the dent parts 644 may have a rectangular space to have the same depth. In the present embodiment, the four dent parts 644 are formed on one of the inner peripheral wall parts 604 and the four dent parts 644 are formed on another inner peripheral wall part 604, so that the eight dent parts 644 in total are formed. It is only required that at least one dent part 644 is formed in the inner peripheral wall part 604.

As described later, in the usage state in which the side surface 602 of the seal ring 601 contacts the side surface of the groove in the shaft, the inner peripheral wall surface 641 of the inner peripheral wall part 604 faces the side surface of the groove in the shaft. The inner peripheral wall surface 641 has at least one dent part 644, and therefore a part of the inner peripheral wall surface 641 does not contact the side surface of the groove, and then, a space is formed between the inner peripheral wall surface 641 and the side surface of the groove. In the present embodiment, this space has a ship bottom shape so that the depth of the space is gradually shallower from the end surface 642 side toward the end portion 641a side.

The seal ring 601 is formed of a resin material such as polyether ether ketone (PEEK), polyphenylene sulfide (PPS), and polytetrafluoroethylene (PTFE). A circumferential length of the outer peripheral surface 606 of the seal ring 601 is shorter than the circumferential length of the inner peripheral surface of the shaft hole into which the shaft is inserted, not to have an interference with respect to the shaft hole. Therefore, in a state in which the fluid pressure does not act on the seal ring 601 in the usage state, the outer peripheral surface 606 of the seal ring 601 is separated from the inner peripheral surface of the shaft hole.

The seal ring 601 is not endless, and as illustrated in FIGS. 55 to 57, the seal ring 601 includes an abutment joint 608 at one portion in the circumferential direction of the seal ring 601. The abutment joint 608 has a well-known structure capable of maintaining a stable sealing performance even when the circumferential length of the seal ring 601 varies due to thermal expansion or thermal contraction of the seal ring 601. Examples of the structure of the abutment joint 608 include a so-called special step cut structure in which the abutment joint 608 is cut off in a stepwise manner when seen from any of the side of the outer peripheral surface 606, and the sides of the both side surfaces 602 and 607, a straight cut structure, a bias cut structure, and a step cut structure. When a material (such as PTFE) having low elasticity is employed as the material of the seal ring 601, the seal ring 601 may be endless without having the abutment joint 608.

Next, action of the seal ring 601 having the above-described configuration will be described.

Figure 62:
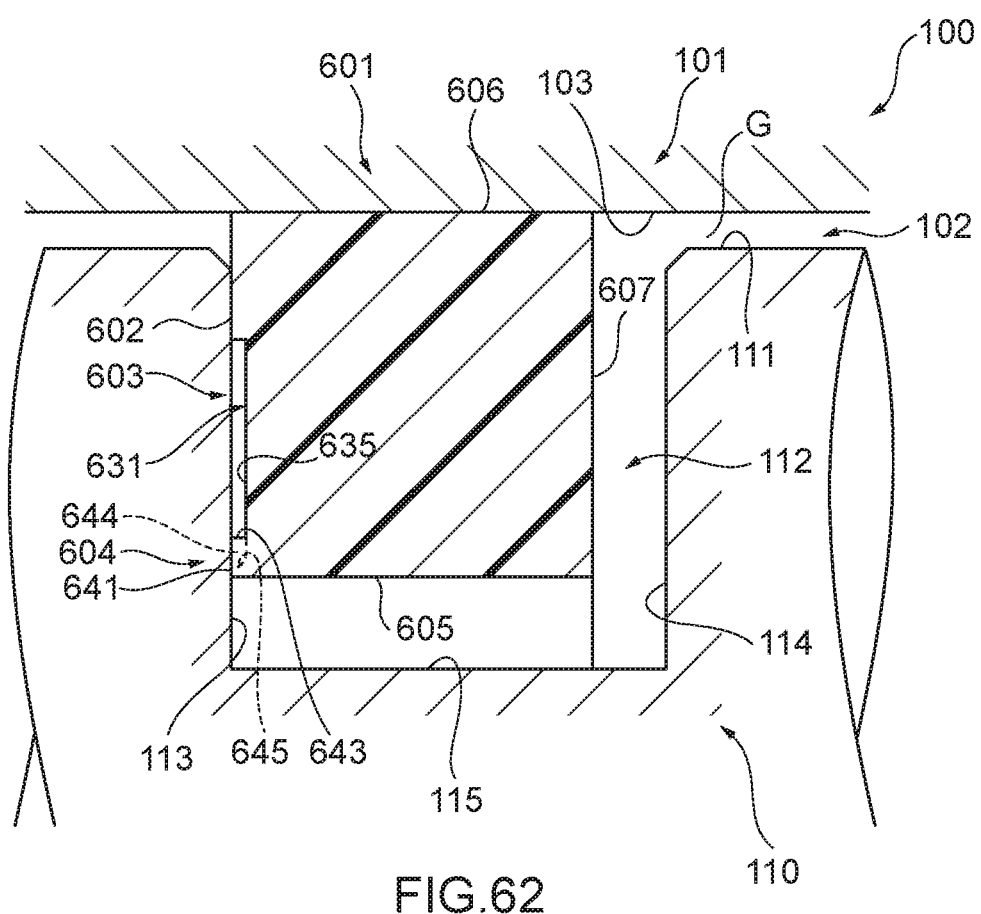
FIG. 62 is a partially enlarged cross-sectional view of the seal ring according to the eleventh embodiment of the present disclosure in a usage state in which the seal ring is attached to a housing and a shaft inserted into a shaft hole that is a through-hole formed at the housing in a hydraulic apparatus as an attachment target.

FIG. 62 is a partially enlarged cross-sectional view of the seal ring 601 in a usage state in which the seal ring 601 is attached to a housing 101 and a shaft 110 inserted into a shaft hole 102 that is a through-hole formed at the housing 101 in a hydraulic apparatus 100 as an attachment target. The shaft 110 is relatively rotatable with respect to the housing 101, and an annular groove 112 recessed toward a center side is formed in an outer peripheral surface 111 of the shaft 110. The groove 112 has a cross section formed in a rectangular shape or a substantially rectangular shape, and is defined by side surfaces 113 and 114 having a planar shape and a bottom surface 115. In the hydraulic apparatus 100, an annular space is formed between an inner peripheral surface 103 of the shaft hole 102 and an outer peripheral surface 111 of the shaft 110, and a hydraulic channel in which operation oil (not illustrated) is to be filled is formed in the shaft 110 and the housing 101. The seal ring 601 is attached to the groove 112, and seals a gap G between the shaft 110 and the shaft hole 102 to prevent loss of hydraulic pressure of the operation oil in the hydraulic channel. In FIG. 62, a part of the groove 112 on the right side forms the hydraulic channel, and a side surface 113 on the left side of the groove 112 serves as a sliding side surface against which the seal ring 601 is pressed, whereby pressure on the right side of the groove 112 becomes high and pressure on the left side of the groove 112 becomes low. The seal ring 601 is attached to the groove 112 such that the side surface 2 faces the sliding side surface 113 of the groove 112.

When the operation oil is introduced into the hydraulic channel, the pressure in the hydraulic channel becomes high, whereby the outer peripheral surface 606 and the side surface 602 of the seal ring 601 are pressed against the inner peripheral surface 103 of the shaft hole 102 and the sliding side surface 113 of the groove 112, respectively. Thus, in the annular gap G, the hydraulic channel is sealed, to thereby maintain the hydraulic pressure. When the shaft 110 rotates, the shaft 110 rotates with respect to the seal ring 601, and the sliding side surface 113 of the groove 112 slides with respect to the side surface 602 of the seal ring 601. At this time, the operation oil intrudes into the recessed part 603 from the introduction part 632 of the seal ring 601, and is introduced to the dynamic pressure part 631, and the hydraulic pressure of the operation oil causes the operation oil to move to the end portion 603a in the circumferential direction along the dynamic pressure surface 635 in the dynamic pressure part 631. While the side surface 602 of the seal ring 601 contacts the sliding side surface 113 of the groove 112, the pressure on the end portion 603a side of the dynamic pressure part 631 is increased by this movement of the operation oil in the dynamic pressure part 631, and finally the pressure of the operation oil on the end portion 603a side is increased until the side surface 602 of the seal ring 601 is separated from the sliding side surface 113, resulting that the operation oil leaks out to the side surface 602 from the end portion 603a of the dynamic pressure part 631. This causes a thin lubricating film of the operation oil to be formed between the side surface 602 of the seal ring 601 and the sliding side surface 113 of the groove 112, thereby reducing a sliding resistance of the groove 112 with respect to the seal ring 601. Thus, in the usage state, the recessed part 603 uses the dynamic pressure effect to reduce the sliding resistance of the groove 112 with respect to the seal ring 601.

The inner peripheral wall surface 641 of the inner peripheral wall part 604 has the dent part 644, and a space is formed between the inner peripheral wall surface 641 and the sliding side surface 113 of the groove 112. Therefore, the operation oil can be stored in the dent part 644, thereby reducing the sliding resistance of the groove 112 with respect to the seal ring 601 in the inner peripheral wall surface 641. In addition, the dent part 644 is opened to the dynamic pressure part 631, and therefore the inner peripheral wall surface 641 can obtain the dynamic pressure effect by the dent part 644 similar to the above-described dynamic pressure effect of the recessed part 603, and the sliding resistance of the groove 112 with respect to the seal ring 601 can be also reduced in the inner peripheral wall surface 641. The inner peripheral wall surface 641 has the dent part 644, which enables an abrasion amount of the inner peripheral wall surface 641 to be reduced, thereby suppressing a reduction in dynamic pressure effect.

The contact area of the seal ring 601 with respect to the sliding side surface 113 of the groove 112 can be reduced by the space that is formed, by the dent part 644, between the inner peripheral wall surface 641 and the sliding side surface 113 of the groove 112, also by this, the sliding resistance of the groove 112 with respect to the seal ring 601 can be also reduced.

The seal ring 601 can be used to reduce the sliding resistance of the groove 112 with respect to the seal ring 601 as described above. Therefore, the heat generated in the sliding portion in use can be suppressed, and the seal ring 601 can be used under a higher PV condition. In addition, the seal ring 601 can be also used for the shaft 110 which is soft.

As described above, according to the seal ring 601 according to the eleventh embodiment of the present disclosure, the sliding resistance can be further reduced.

Figure 63:
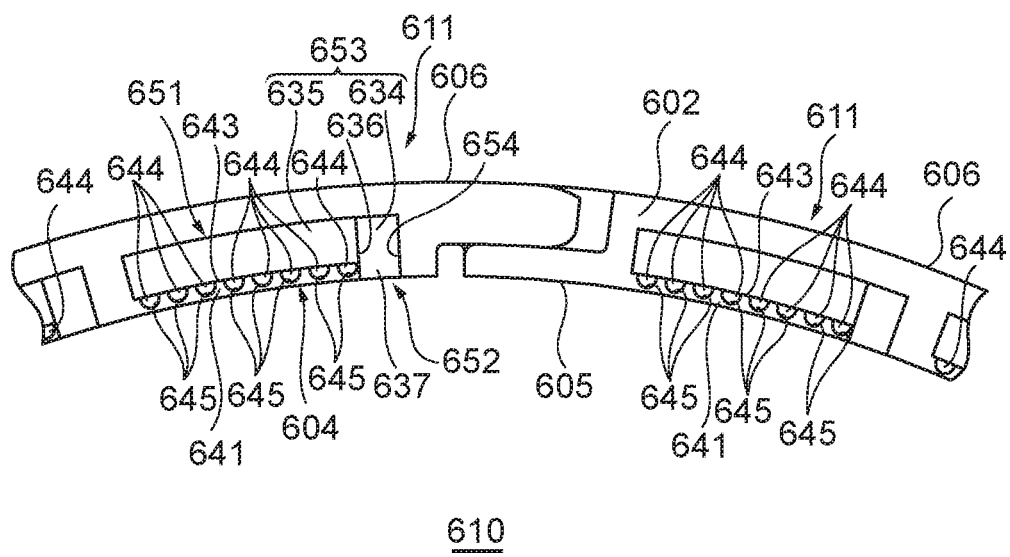
FIG. 63 is a partially enlarged side view enlargedly illustrating a portion of a side surface on one side of a seal ring according to a twelfth embodiment of the present disclosure, the view illustrating a schematic configuration of the seal ring.
Figure 64:
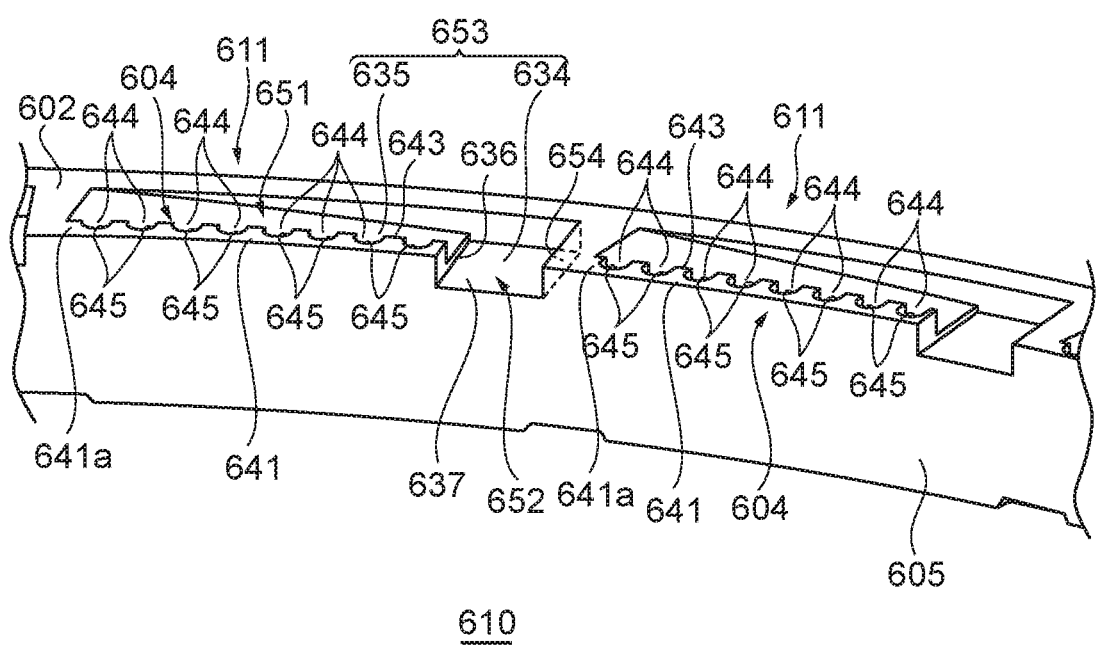
FIG. 64 is a partially enlarged perspective view illustrating a schematic configuration of the seal ring according to the twelfth embodiment of the present disclosure.

Next, a seal ring 610 according to a twelfth embodiment of the present disclosure will be described. FIG. 63 is a partially enlarged side view enlargedly illustrating a portion of a side surface on one side of the seal ring 610, the view illustrating a schematic configuration of the seal ring 610, and FIG. 64 is a partially enlarged perspective view illustrating a schematic configuration of the seal ring 610. The seal ring 610 according to the twelfth embodiment of the present disclosure is different from the above-described seal ring 601 according to the eleventh embodiment of the present disclosure in configurations of the recessed part and the inner peripheral wall part. Hereinafter, components of the seal ring 610 according to the twelfth embodiment of the present disclosure that are the same as or have similar functions to those of the seal ring 601 according to the eleventh embodiment of the present disclosure will be denoted by the same reference characters, the description thereof will be omitted, and different configurations will be described.

The seal ring 610 includes a recessed part 611 different from the recessed part 603 of the seal ring 61. As illustrated in FIGS. 63 and 64, the recessed part 611 includes a dynamic pressure part 651 and an introduction part 652, and the dynamic pressure part 651 includes only one dynamic pressure surface 635. Hereinafter, the description will be specifically made.

The dynamic pressure part 651 of the recessed part 611 is separated in the radial direction from the outer peripheral surface 606 and the inner peripheral surface 605, and extends in the circumferential direction to have an arc shape or a substantially arc shape centered or substantially centered about the axis x. The dynamic pressure part 651 is provided on the inner peripheral surface 605 side in the radial direction. Specifically, the dynamic pressure part 651 includes a bottom surface 653 that is a surface facing toward a side toward which the side surface 602 faces. The bottom surface 653 includes an introduction surface 634 connected to the introduction part 652, and one dynamic pressure surface 635 extending between the introduction surface 634 and the side surface 602. The dynamic pressure surface 635 is connected to the introduction surface 634 through the stepped surface 636. In addition, the dynamic pressure part 651 includes an end surface 654 that is a planar or a substantial planar surface extending along the axis x, on the opposite side of the dynamic pressure surface 635 in the circumferential direction with respect to the introduction surface 634. The end surface 654 extends up to the side surface 602 from an end portion on the opposite side in the circumferential direction of the end portion connected to the dynamic pressure surface 635 (the stepped surface 636) of the introduction surface 634. The dynamic pressure part 651 is formed to be positioned such that the dynamic pressure part 651 does not appear on the outer periphery side from the sliding side surface 113 of the groove 112 in the shaft 110 which the dynamic pressure part 651 contacts in the usage state.

As illustrated in FIGS. 63 and 64, the introduction part 652 of the recessed part 603 has a recess formed on the inner peripheral surface 605, the recess opening toward the side surface 62 side, and the introduction part 652 is connected to the dynamic pressure part 651 at one end portion in the circumferential direction of the dynamic pressure part 651. Specifically, the introduction part 652 is connected to the introduction surface 634 of the dynamic pressure part 651, the stepped surfaces 636, and the end surface 654, and includes a bottom surface 637 continued to the introduction surface 634. In the seal ring 610, by the introduction part 652, a passage communicating from the inner peripheral surface 605 to the dynamic pressure part 651 is formed. Thus, the recessed part 611 of the seal ring 610 is formed in an L-shape.

The seal ring 610 includes only one inner peripheral wall part 604 for each of the recessed parts 611. As illustrated in FIGS. 63 and 64, the inner peripheral wall part 604 is not formed on the end surface 654 side in the circumferential direction with respect to the introduction part 652, and the inner peripheral wall part 604 is formed only on the dynamic pressure surface 635 side in the circumferential direction with respect to the introduction part 652. In this case, the dent parts 644 in a larger number than those formed in the above-described seal ring 601 can be formed in the inner peripheral wall part 604, and, for example, the eight dent parts 644 are formed in the inner peripheral wall part 604. It is required that at least one dent part 644 is formed in the inner peripheral wall part 604.

Similar to the above-described seal ring 601, also in the seal ring 610 according to the present embodiment, the inner peripheral wall surface 641 of the inner peripheral wall part 604 has the dent part 644, and a space is formed between the inner peripheral wall surface 641 and the sliding side surface 113 of the groove 112. Therefore, the seal ring 610 can provide effects similar to those provided by the above-described seal ring 601. In the seal ring 601, the two dynamic pressure surfaces 635 are provided in both directions of the circumferential direction with respect to the introduction surface 634 (the introduction part 632), respectively. Therefore, the seal ring 601 can provide the above-described effects in rotations in both rotation directions of the shaft 110. On the other hand, in the seal ring 610, the one dynamic pressure surface 635 is provided in one direction of the circumferential direction with respect to the introduction surface 634 (the introduction part 652). Therefore, the seal ring 610 can provide the above-described effects in rotation in one rotation direction of the shaft 110.

Figure 65:
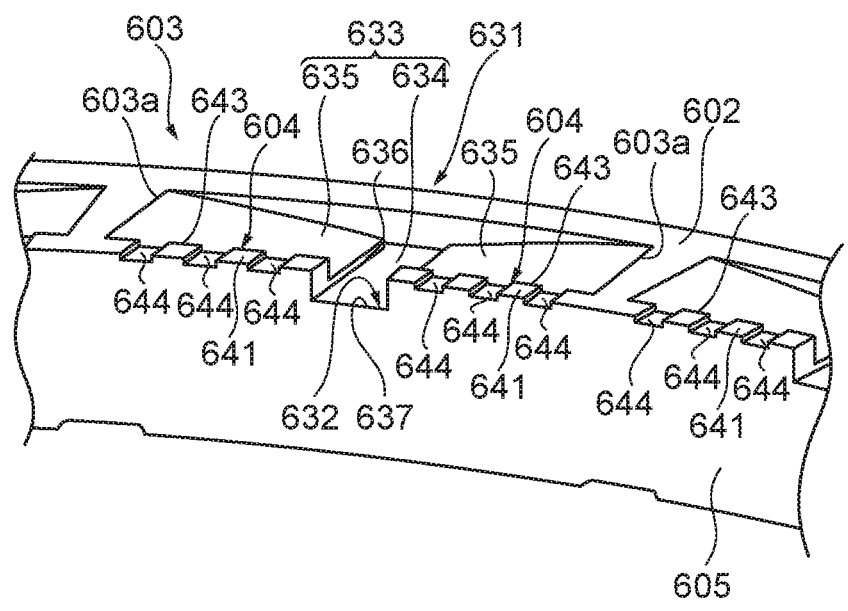
FIG. 65 is a partially enlarged perspective view of a seal ring for illustrating a variant of a dent part in the seal ring according to the eleventh embodiment of the present disclosure.
Figure 66:
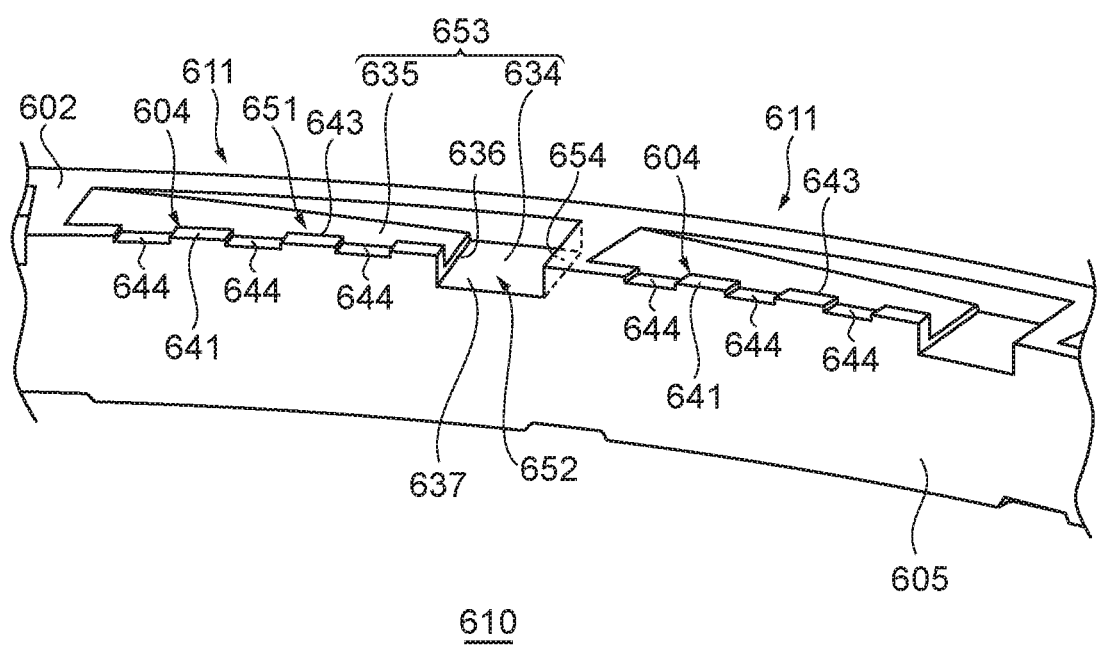
FIG. 66 is a partially enlarged perspective view of a seal ring for illustrating a variant of a dent part in the seal ring according to the twelfth embodiment of the present disclosure.
Figure 67:
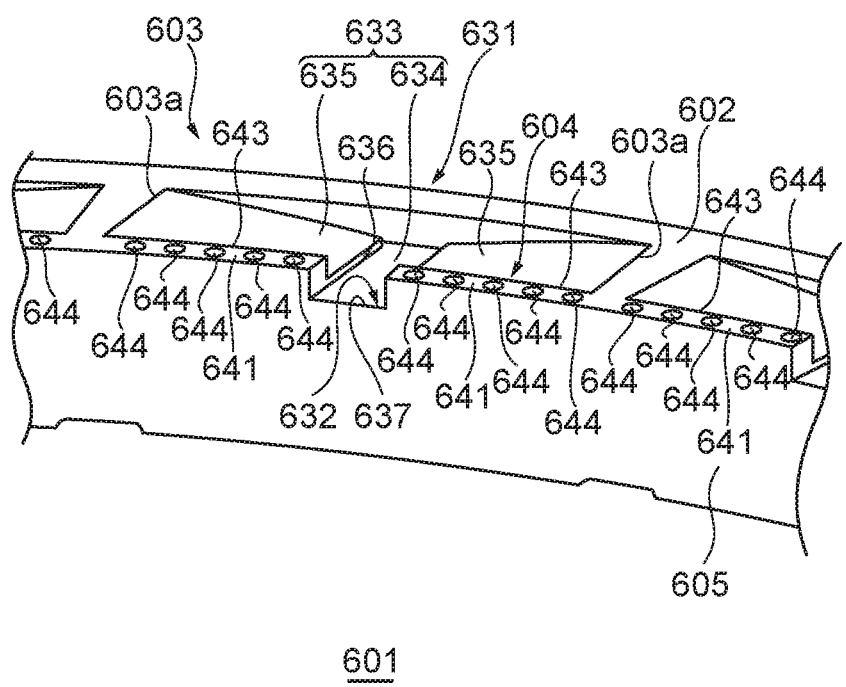
FIG. 67 is a partially enlarged perspective view of a seal ring for illustrating a variant of a dent part in the seal ring according to the eleventh embodiment of the present disclosure.
Figure 68:
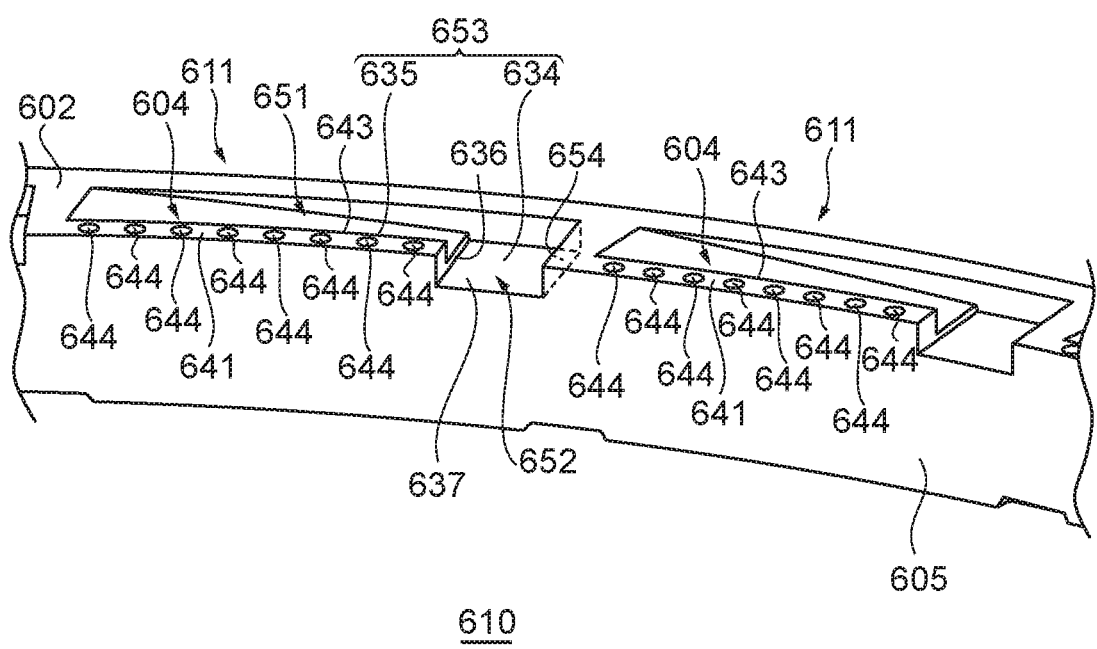
FIG. 68 is a partially enlarged perspective view of a seal ring for illustrating a variant of a dent part in the seal ring according to the twelfth embodiment of the present disclosure.

As the seal rings 601 and 610, although there has been described the case where the contour of the dent part 644 on the inner peripheral surface 605 side on the inner peripheral wall surface 641 have the ship bottom shape, the present disclosure is not limited thereto, and as illustrated in FIGS. 65 and 66, the dent part 644 may extend over the entire width between the outer periphery side and the inner periphery side of the inner peripheral wall surface 641. Specifically, the dent part 644 extends in the radial direction from the outer peripheral surface 643 to the inner peripheral surface 605. That is, the dent part 644 may be formed in a slit shape to penetrate the inner peripheral wall part 604 between the outer peripheral surface 643 and the inner peripheral surface 605. In addition, as illustrated in FIGS. 67 and 68, the dent part 644 may be formed at a portion between the outer peripheral surface 643 and the inner peripheral surface 605 of the inner peripheral wall surface 641. The dent part 644 may be a dent having a contour formed in a circular shape or a substantially circular shape on the inner peripheral wall surface 641. In this case, the dent part 644 may not be formed in a circular shape or a substantially circular shape, and the contour is not limited thereto. Even in such a case, the similar effects to the above-described seal rings 601 and 610 can be provided. In addition, the relationship between the dent parts 644 is not limited to the description above, and may be analogous to one another.

Although the preferred embodiments of the present disclosure have been described above, the present disclosure is not limited to the seal rings 1, 10, 201, 210, 301, 310, 401, 410, 501, 510, 601 and 610 according to the above-described embodiments, and incorporates any aspect included in the concept of the present disclosure and the scope of the claims. Furthermore, the configurations may be selectively combined as appropriate so that at least part of the above-described problems or effects can be solved or provided. Moreover, for example, the shapes, materials, arrangement, sizes, or the like of the components in the above-described embodiments can be changed as appropriate in accordance with specific usage aspect of the present disclosure.

What is claimed is:

1. A seal ring for sealing an annular gap between a shaft and a shaft hole into which the shaft is inserted, the seal ring having an annular shape around an axis and the seal ring comprising:
    at least one side surface that is a surface facing in a direction of the axis;
    a plurality of recessed parts that are formed on the side surface such that the plurality of recessed parts are separated from one another in a circumferential direction; and
    a plurality of inner peripheral wall parts that are formed corresponding to the plurality of recessed parts, respectively,
    wherein the recessed part includes a dynamic pressure part that extends in the circumferential direction to converge on the side surface, and an introduction part that extends from the dynamic pressure part toward an inner periphery side to open the dynamic pressure part toward the inner periphery side,
    the number of the inner peripheral wall parts provided for each of the recessed parts is one or two, each of the inner peripheral wall parts is a raised portion defined on the inner periphery side of a corresponding one of the recessed parts by the dynamic pressure part and the introduction part of the corresponding recessed part, and includes an inner peripheral wall surface which is a surface continuing from the side surface so as to at least partly define an innermost circumferential edge of the seal ring, and
    the inner peripheral wall surface extends toward the introduction part in the circumferential direction while inclining with respect to the side surface such that the inner peripheral wall surface is recessed from the side surface in the direction of the axis.

2. The seal ring according to claim 1, wherein
    the inner peripheral wall surface is formed of at least one plane.

3. The seal ring according to claim 1, wherein
    the inner peripheral wall surface is a curved surface.

4. The seal ring according to claim 1, wherein
    the dynamic pressure part includes a bottom surface that is a surface facing toward a side toward which the side surface faces, the bottom surface includes an introduction surface connecting to the introduction part, and one or two dynamic pressure surfaces each extending between the introduction surface and the side surface, and the dynamic pressure surface extends toward the side surface in the circumferential direction while inclining with respect to the side surface such that the dynamic pressure surface rises from the introduction surface.

5. The seal ring according to claim 4, wherein
    the dynamic pressure surface is inclined with respect to the side surface more largely than the inner peripheral wall surface.

6. A seal ring for sealing an annular gap between a shaft and a shaft hole into which the shaft is inserted, the seal ring comprising:
    at least one side surface that is a surface formed in an annular shape around an axis and facing in a direction of the axis;
    a plurality of recessed parts that are formed on the side surface such that the plurality of recessed parts are separated from one another in a circumferential direction; and
    a plurality of inner peripheral wall parts that are formed corresponding to the plurality of recessed parts, respectively,
    wherein the recessed part includes a dynamic pressure part that extends in the circumferential direction to converge on the side surface, and an introduction part that extends from the dynamic pressure part toward an inner periphery side to open the dynamic pressure part toward the inner periphery side,
    the number of the inner peripheral wall parts provided for each of the recessed parts is one or two, each of the inner peripheral wall parts is a raised portion defined on the inner periphery side of a corresponding one of the recessed parts by the dynamic pressure part and the introduction part of the corresponding recessed part, and includes an inner peripheral wall surface which is a surface continuing from the side surface so as to at least partly define an innermost circumferential edge of the seal ring, and
    the inner peripheral wall surface is recessed in the direction of the axis by a predetermined depth from the side surface, and extends toward the introduction part in the circumferential direction in a state parallel to the side surface.

7. The seal ring according to claim 6, wherein
    the inner peripheral wall surface is a flat surface that is recessed by a predetermined depth from the side surface through a vertical surface.

8. The seal ring according to claim 6, wherein
    the inner peripheral wall surface is a curved surface.

9. The seal ring according to claim 6, wherein
    the dynamic pressure part includes a bottom surface that is a surface facing toward a side toward which the side surface faces, the bottom surface includes an introduction surface connecting to the introduction part, and one or two dynamic pressure surfaces each extending between the introduction surface and the side surface, and the dynamic pressure surface extends toward the side surface in the circumferential direction while inclining with respect to the side surface such that the dynamic pressure surface rises from the introduction surface.

10. A seal ring for sealing an annular gap between a shaft and a shaft hole into which the shaft is inserted, the seal ring having an annular shape around an axis and the seal ring comprising:
    at least one side surface that is a surface facing in a direction of the axis;
    a plurality of recessed parts that are formed on the side surface such that the plurality of recessed parts are separated from one another in a circumferential direction; and a plurality of inner peripheral wall parts that are formed corresponding to the plurality of recessed parts, respectively, wherein the recessed part includes a dynamic pressure part that extends in the circumferential direction to converge on the side surface, and an introduction part that extends from the dynamic pressure part toward an inner periphery side to open the dynamic pressure part toward the inner periphery side, the number of the inner peripheral wall parts provided for each of the recessed parts is one or two, each of the inner peripheral wall parts is a raised portion defined on the inner periphery side of a corresponding one of the recessed parts by the dynamic pressure part and the introduction part of the corresponding recessed part, and includes an inner peripheral wall surface which is a surface continuing from the side surface so as to at least partly define an innermost circumferential edge of the seal ring, and one or more dent parts are formed in the inner peripheral wall surface such that the dent parts are separated from one another in the circumferential direction.

11. The seal ring according to claim 10, wherein between an outer periphery side and the inner periphery side of the inner peripheral wall surface, the dent parts extend from the outer periphery side to a position located between the outer periphery side and the inner periphery side.

12. The seal ring according to claim 10, wherein the dent part extends over an entire width between an outer periphery side and the inner periphery side of the inner peripheral wall surface.

13. The seal ring according to claim 10, wherein the dent part is formed at a position located between an outer periphery side and the inner periphery side of the inner peripheral wall surface.

14. The seal ring according to claim 10, wherein the inner peripheral wall surface is flush with the side surface.

15. The seal ring according to claim 10, wherein the dynamic pressure part includes a bottom surface that is a surface facing toward a side toward which the side surface faces, the bottom surface includes an introduction surface connecting to the introduction part, and one or two dynamic pressure surfaces each extending between the introduction surface and the side surface, and the dynamic pressure surface extends toward the side surface in the circumferential direction while inclining with respect to the side surface such that the dynamic pressure surface rises from the introduction surface.

* * * * *